United States Patent
Lietzau et al.

(10) Patent No.: US 7,517,471 B2
(45) Date of Patent: Apr. 14, 2009

(54) AS-INDACEN DERIVATIVES

(75) Inventors: Lars Lietzau, Darmstadt (DE); Matthias Bremer, Darmstadt (DE); Melanie Klasen-Memmer, Heuchelheim (DE)

(73) Assignee: Merck Patent GmbH, Darmstadt (DE)

(*) Notice: Subject to any disclaimer, the term of this patent is extended or adjusted under 35 U.S.C. 154(b) by 24 days.

(21) Appl. No.: 11/587,433

(22) PCT Filed: Apr. 12, 2005

(86) PCT No.: PCT/EP2005/003840
§ 371 (c)(1), (2), (4) Date: Oct. 25, 2006

(87) PCT Pub. No.: WO2005/103799
PCT Pub. Date: Nov. 3, 2005

(65) Prior Publication Data
US 2007/0228328 A1  Oct. 4, 2007

(30) Foreign Application Priority Data
Apr. 26, 2004  (DE) .................. 10 2004 020 249

(51) Int. Cl.
C09K 19/32 (2006.01)
C09K 19/34 (2006.01)
C07D 493/04 (2006.01)
C07D 307/77 (2006.01)
C07D 307/93 (2006.01)
C07C 25/22 (2006.01)

(52) U.S. Cl. .................. 252/299.62; 252/299.01; 252/299.61; 428/1.1; 549/458; 549/472; 570/183; 570/187; 570/188

(58) Field of Classification Search ............ 252/299.01, 252/299.61, 299.62; 428/1.1; 570/127, 131, 570/183, 187, 188; 549/239, 458, 472; 585/26
See application file for complete search history.

(56) References Cited

U.S. PATENT DOCUMENTS

| | | | |
|---|---|---|---|
| 3,931,239 A * | 1/1976 | Cragoe et al. ............ | 549/330 |
| 4,970,021 A | 11/1990 | Nakatsuka et al. | |
| 2003/0222243 A1 | 12/2003 | Lietzau et al. | |
| 2004/0171866 A1 | 9/2004 | Reiffenrath et al. | |

FOREIGN PATENT DOCUMENTS

| | | | |
|---|---|---|---|
| EP | 0305938 A | 3/1989 | |
| EP | 1350780 A | 10/2003 | |
| GB | 1170672 A | 11/1969 | |
| WO | WO 03/010120 A | 10/2003 | |

OTHER PUBLICATIONS

Zhang et al., "Selective Remote Functionalization of Alkyl Side Chains in the Coupling of Fischer Carbene Complexes with Conjugated Enediynes", Tetrahedron 56, 2000 pp. 2175-2182.*

Kociolek et al., "Intramolecular Thermal Cyclotrimerization of an Acyclic Triyne: An Uncatalyzed Process", Tetrahedron Letters 40, 1999, pp. 4141-4144.*

Bell et al., "Synthesis and characterization of as- and s-indacene bridging ligands and their trimethyltin and manganese tricarbonyl derivatives", Organometallics (1987), 6(2), 266-73.*

Sepiol, J. ; Mirek, J. : << Elimination of the nitrile group from carbocyclic o-hydroxynitriles >> Synthesis, 1979, Seiten 290-292, XP002338226 Seite 291 ; Beispiele 3a, 4a ; Tabellen 2, 3.

Katz, T.J. et al. : << Synthesis of Bis (as-indacenyliron) >> J. AM. Chem. Soc., Bd. 90, Nr. 3, 1968, Seiten 734-739, XP002338227 Seite 736, Spalte 1, Ietzter Absatz ; Beispiel XV.

Eisenbraun E J et al : << Polyalkyl Aromatic Hydrocarbons. II. Cyclialkylation of Benzoid Hydrocarbons with Isoprene >> Journal of Organic Chemistry, American Chemical Society. Easton, US, Bd. 33, 1968, Seiten 2000-2008, XP 002242443 ISSN : 0022-3263 Scheme II Seite 2002 ; Beispiel 16.

Bisello A et al : << Synthesis, properties and reactivity of mononuclear Rh (I) and Ir (I) complexes of s- and as-hydroindacenide ligands >> Journal of Organometallic Chemistry, Elsevier-Sequoia S.A. Lausanne, CH, Bd. 593-594, 2000, Seiten 315-324, XP004185713 ISSN : 0022-328X Seite 316, Spalte 1, Beispiel 3 Seite 317, Spalte2 ; Beispiel 3,3', 3".

Wisniewski Grissom, J. et al. : << High temperature radical cyclization anomalies in the tandem enediyne-Bis-radical cyclization >> Tetrahedron, Bd. 50, Nr. 16, 1994, Seiten 4635-4650, XP002338228 Seite 4638 ; Beispiel 20a Scheme 5 Seite 4646, Absatz 2.

Bao, J. et al. : << Three-component intramolecular two-alkyne annulations of Fischer carbene complexes : New strategies for steroid synthesis >> J. AM. Chem. Soc., Bd. 116, Nr. 17, 1994, Seiten 7616-7630, XP002338229 Seite 7618, Spalte 1 ; Beispiel 58 ; Tabelle 3.

Arnold, r.T. et al. : << Steric effect of methylene groups. II >> J. AM. Chem. Soc., Bd. 68, Nr. 11, 1946, Seiten 2176-2178, XP 002338230 Seite 2177, Spalte 1 ; Beispiel IX.

Sepiol, J. ; Cyclization of ethyl ylidenecyanoacetates to carbocyclic o- aminoesters. An efficient synthesis of 1, 2, 3, 6, 7, 8-hexahydro-as-indacene derivatives >> Tetrahedron, Bd. 42 Nr. 2, 1986, Seiten 609-616, XP002338231 Seite 612 ; Beispiele 8-11.

Kelly, T.R. et al. : << A chiral catechol with C2 symmetry >> J. Org. Chem., Bd. 54, Nr. 4, 1989, Seiten 980-983, XP002338232 Scheme 1 Seite 980, Spalte 2, Absatz 1 ; Beispiel 10.

(Continued)

*Primary Examiner*—Shean C Wu
(74) *Attorney, Agent, or Firm*—Millen, White, Zelano, Branigan, P.C.

(57) ABSTRACT

The present invention relates to compounds of the formula I

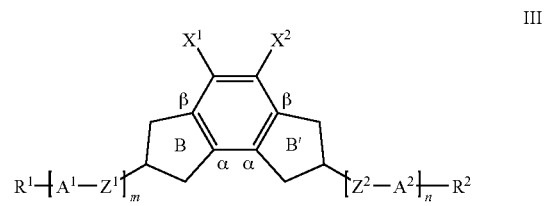

where $X^1, X^2, R^1, R^2, A^1, A^2, Z^1, Z^2$, m, n and rings B and B' are as defined in claim 1.

33 Claims, No Drawings

OTHER PUBLICATIONS

Vejdelek, Z. J. et al. : << 4-(Aminomethyl)-s-hydrindacenes and 4, 8-Bis(aminomethyl)-s-hydrinacenes ; synthesis and pharmacological screening >> Collect. Czech. Chem. Commun., Bd. 42, 1977, Seiten 3094-3103, XP009051401 Seite 3096 ; Beispiel XV Seite 3101 ; Beispiel XV.

Courtot, P. et al. : << N° 363.—Synthese et etude de quelques proprietes chimiques de derives de l'octahydro-as-indacene et du decahydrophenanthrene >> Bull. Soc. Chim. Fr., 1973, Seiten 2121-2125, XP009051402 Seite 2121, Spalte 1 ; Beispiel 1 Seite 2122, Spalte 2 ; Beispiel 23.

Le Guillanton, G. ; << N° 120.—Utilisation de la cyclopentylidene-2 cyclopentanone a la preparation de derives decahydro as-indaceniques et hexahydro as-indaceniques >> Bull. Soc. Chim. Fr., 1963, Seiten 630-638, XP009051403 Seiten 631-636.

Melmer, M. et al. : << Aromatische Spirane, 22. Mitt. : Darstellung von Cyclopenteno-4, 5-indan-1-on und 2-Carboxymethyl-bzw. 4-Chloromethyl-indanals Synthone fur Sythesen von anellierten 2, 2 '- Spirobiindanonen >> Monatshefte fur Chemie, Bd. 127, Nr. 3, 1996, Seiten 275-290, XP009051348 Schema 1 Seite 276 ; Beispiel 9 Schema 3 Seite 279 ; Beispiele 9, 29, 30 Seiten 289-290.

Rene, L. et al. : << Analogues difurobenzeniques et furochromeniques de l'angelicine et autres furocoumarines angulaires >> Eur. J. Med. Chem.M, Bd. 13, Nr. 5, 1978, Seiten 435-439, XP009051347 Seite 436, Spalte 1 ; Beispiele 10a-g, 13.

Sepiol, J. ; Mirek, J. : "Elimination of the nitrile group from carbocyclic o-hydroxynitriles" Synthesis, 1979, Seiten 290-292, XP002338226 Seite 291 ; Beispiele 3a, 4a ; Tabellen 2, 3.

Katz, T.J. et al. : "Synthesis of Bis (as-indacenyliron)" J. Am. Chem. Soc., Bd. 90, Nr. 3, 1968, Seiten 734-739, XP002338227 Seite 736, Spalte 1, letzter Absatz ; Beispiel XV.

Eisenbraun E J et al : "Polyalkyl Aromatic Hydrocarbons. II. Cyclialkylation of Benzoid Hydrocarbons with Isoprene" Journal of Organic Chemistry, American Chemical Society. Easton, US, Bd. 33, 1968, Seiten 2000-2008, XP 002242443 ISSN : 0022-3263 Scheme II Seite 2002 ; Beispiel 16.

Bisello A et al : "Synthesis, properties and reactivity of mononuclear Rh (I) and Ir (I) complexes of s- and as- hydroindacenide ligands" Journal of Organometallic Chemistry, Elsevier-Sequoia S.A. Lausanne, Ch, Bd. 593-594, 2000, Seiten 315-324, XP004185713 ISSN : 0022-328X Seite 316, Spalte 1, Beispiel 3 Seite 317, Spalte 2 ; Beispiel 3,3', 3".

Wisniewski Grissom, J. et al. : "High temperature radical cyclization anomalies in the tandem enediyne-Bis-radical cyclization" Tetrahedron, Bd. 50, Nr. 16, 1994, Seiten 4635-4650, XP002338228 Seite 4638 ; Beispiel 20a Scheme 5 Seite 4646, Absatz 2.

Bao, J. et al. : "Three-component intramolecular two-alkyne annulations of Fischer carbene complexes : New strategies for steroid synthesis" J. Am. Chem. Soc., Bd. 116, Nr. 17, 1994, Seiten 7616-7630, XP002338229 Seite 7618, Spalte 1 ; Beispiel 58 ; Tabelle 3.

Arnold, R.T. et al. : "Steric effect of methylene groups. II" J. Am. Chem. Soc., Bd. 68, Nr. 11, 1946, Seiten 2176-2178, XP 002338230 Seite 2177, Spalte 1 ; Beispiel IX.

Sepiol, J. : "Cyclization of ethyl ylidenecyanoacetates to carbocyclic o- aminoesters. An efficient synthesis of 1, 2, 3, 6, 7, 8-hexahydro-as-indacene derivatives" Tetrahedron, Bd. 42 Nr. 2, 1986, Seiten 609-616, XP002338231 Seite 612 ; Beispiele 8-11.

Kelly, T.R. et al. : "A chiral catechol with C2 symmetry" J. Org. Chem., Bd. 54, Nr. 4, 1989, Seiten 980-983, XP002338232 Scheme 1 Seite 980, Spalte 2, Absatz 1 ; Beispiel 10.

Vejdelek, Z. J. et al. : "4-(Aminomethyl)-s-hydrindacenes and 4, 8-Bis(aminomethyl)-s-hydrinacenes ; synthesis and pharmacological screening" Collect. Czech. Chem. Commun., Bd. 42, 1977, Seiten 3094-3103, XP009051401 Seite 3096 ; Beispiel XV Seite 3101 ; Beispiel XV.

Courtot, P. et al. : "N° 363.—Synthese et etude de quelques proprietes chimiques de derives de l'octahydro-as-indacene et du decahydrophenanthrene" Bull. Soc. Chim. FR. , 1973, Seiten 2121-2125, XP009051402 Seite 2121, Spalte 1 ; Beispiel 1 Seite 2122, Spalte 2 ; Beispiel 23.

Le Guillanton, G. : "N° 120.—Utilisation de la cyclopentylidene-2 cyclopentanone a la preparation de derives decahydro as-indaceniques et hexahydro as-indaceniques"Bull. Soc. Chim. Fr., 1963, Seiten 630-638, XP009051403 Seiten 631-636.

Melmer, M. et al. : "Aromatische Spirane, 22. Mitt. : Darstellung von Cyclopenteno-4, 5- indan-1-on und 2-Carboxymethyl-bzw. 4-Chloromethyl-indanals Synthone fur Synthesen von anellierten 2, 2 '- Spirobiindanonen" Monatshefte fur Chemie, Bd. 127, Nr. 3, 1996, Seiten 275-290, XP009051348 Schema 1 Seite 276 ; Beispiel 9 Schema 3 Seite 279 ; Beispiele 9, 29, 30 Seiten 289-290.

Rene, L. et al. : "Analogues difurobenzeniques et furochromeniques de l'angelicine et autres furocoumarines angulaires" Eur. J. Med. Chem.M, Bd. 13, Nr. 5, 1978, Seiten 435-439, XP009051347 Seite 436, Spalte 1 ; Beispiele 10a-g, 13.

\* cited by examiner

AS-INDACEN DERIVATIVES

The present invention relates to as-indacene derivatives, to liquid-crystalline media comprising these derivatives, and to electro-optical display elements containing these liquid-crystalline media. In particular, the invention relates to as-indacene derivatives of negative dielectric anisotropy.

Liquid crystals have found widespread use since the first commercially usable liquid-crystalline compounds were found about 30 years ago. Known areas of application are, in particular, displays for watches and pocket calculators, and large display panels as used in railway stations, airports and sports arenas. Further areas of application are displays of portable computers and navigation systems and video applications. For the last-mentioned applications in particular, high demands are made of the response times and contrast of the images.

The spatial arrangement of the molecules in a liquid crystal has the effect that many of its properties are direction-dependent. Of particular importance for use in liquid-crystal displays are the optical, dielectric and elasto-mechanical anisotropies. Depending on whether the molecules are oriented with their longitudinal axes perpendicular or parallel to the two plates of a capacitor, the latter has a different capacitance; in other words, the dielectric constant $\epsilon$ of the liquid-crystalline medium has different values for the two orientations. Substances whose dielectric constant is greater when the longitudinal axes of the molecules are oriented perpendicular to the capacitor plates than when they are oriented parallel are referred to as dielectrically positive. In other words, if the dielectric constant $\epsilon_{\parallel}$ parallel to the longitudinal axes of the molecules is greater than the dielectric constant $\epsilon_{\perp}$ perpendicular to the longitudinal axes of the molecules, the dielectric anisotropy $\Delta\epsilon=\epsilon_{\parallel}-\epsilon_{\perp}$ is greater than zero. Most liquid crystals used in conventional displays fall into this group.

Both the polarisability of the molecule and the permanent dipole moment play a role for the dielectric anisotropy. On application of a voltage to the display, the longitudinal axis of the molecules orients itself in such a way that the larger of the dielectric constants becomes effective. The strength of the interaction with the electric field depends on the difference between the two constants. In the case of small differences, higher switching voltages are necessary than in the case of large differences. The introduction of suitable polar groups, such as, for example, nitrile groups or fluorine, into the liquid-crystal molecules enables a broad range of working voltages to be achieved.

In the case of the liquid-crystalline molecules used in conventional liquid-crystal displays, the dipole moment oriented along the longitudinal axis of the molecules is larger than the dipole moment oriented perpendicular to the longitudinal axis of the molecules. In the most widespread TN ("twisted nematic") cells, a liquid-crystalline layer with a thickness of only from about 5 to 10 µm is arranged between two plane-parallel glass plates, onto each of which an electrically conductive, transparent layer of tin oxide or indium tin oxide (ITO) has been vapour-deposited as electrode. A likewise transparent alignment layer, usually consisting of a plastic (for example polyimides), is located between these films and the liquid-crystalline layer. This alignment layer serves to bring the longitudinal axes of the adjacent liquid-crystalline molecules into a preferential direction through surface forces in such a way that, in the voltage-free state, they lie uniformly with the same orientation, flat or with the same small tilt angle, on the inside of the display surface. Two polarisation films which only enable linear-polarised light to enter and escape are applied to the outside of the display in a certain arrangement.

By means of liquid crystals in which the larger dipole moment is oriented parallel to the longitudinal axis of the molecule, very high-performance displays have already been developed. In most cases here, mixtures of from 5 to 20 components are used in order to achieve a sufficiently broad temperature range of the mesophase and short response times and low threshold voltages. However, difficulties are still caused by the strong viewing-angle dependence in liquid-crystal displays as are used, for example, for laptops. The best imaging quality can be achieved if the surface of the display is perpendicular to the viewing direction of the observer.

If the display is tilted relative to the observation direction, the imaging quality deteriorates drastically under certain circumstances. For greater comfort, attempts are being made to maximise the angle through which the display can be tilted from the viewing direction of an observer without significantly reducing the imaging quality. Attempts have recently been made to improve the viewing-angle dependence using liquid-crystalline compounds whose dipole moment perpendicular to the longitudinal axis of the molecule is larger than that parallel to the longitudinal axis of the molecule. The dielectric anisotropy $\Delta\epsilon$ is negative. In the field-free state, these molecules are oriented with their longitudinal axes perpendicular to the glass surface of the display. Application of an electric field causes them to orient themselves more or less parallel to the glass surfaces. By achieving a plurality of domains, it has been possible to achieve an improvement in the viewing-angle dependence using liquid-crystalline media of negative dielectric anisotropy. This technology can also be used to achieve shorter response times in displays and better contrast values. Displays of this type are known as VA-TFT ("vertically aligned") displays.

Development in the area of liquid-crystalline materials is still far from complete. In order to improve the properties of liquid-crystalline display elements, attempts are constantly being made to develop novel compounds which enable optimisation of such displays.

DE 25 14 389 A discloses, inter alia, 7-substituted 6-oxo-6H-indeno[5,4-b]furancarboxylic acids and the use thereof as medicaments; neither mesogenic properties nor the use of these compounds in liquid-crystalline media are described.

J. Heterocycl. Chem., 15 (1978) 43-48, discloses 2,7-dimethylbenzo[1,2-b:4,3-b']difuran and 4-chloro-2,7-dimethyl-benzo[1,2-b:4,3-b']difuran; neither mesogenic properties nor the use of these compounds in liquid-crystalline media are described.

EP 1 350 780 A1 describes in general 1,7-dihydroindacene derivatives of negative dielectric anisotropy, without the physical or electro-optical properties being specified in detail.

An object of the present invention is to provide compounds having advantageous properties for use in liquid-crystalline media. In particular, they should have negative dielectric anisotropy, which makes them particularly suitable for use in liquid-crystalline media for VA displays.

This object is achieved in accordance with the invention by compounds of the general formula I

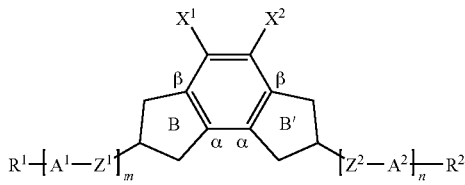

in which:

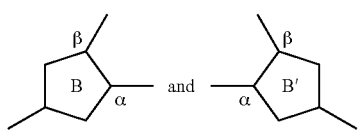

independently of one another, stand for a 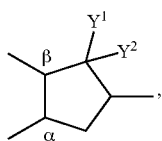

b 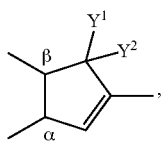

c 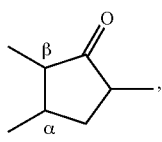

d 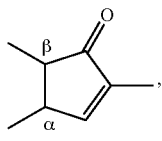

e 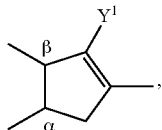

f 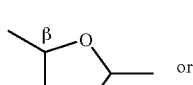

g 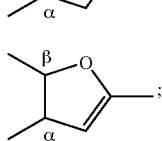

$A^1$ and $A^2$ each, independently of one another, denote 1,4-phenylene, in which =CH— may be replaced once or twice by =N— and which may be unsubstituted or mono- to tetrasubstituted, independently of one another, by —CN, F, Cl, Br and/or I, $C_1$-$C_6$-alkanyl which is unsubstituted or mono- or polysubstituted by fluorine and/or chlorine or by $C_1$-$C_6$-alkoxy which is unsubstituted or mono- or polysubstituted by fluorine and/or chlorine, 1,4-cyclohexylene, 1,4-cyclohexenylene or 1,4-cyclohexadienylene, in which —$CH_2$— may be replaced once or twice, independently of one another, by —O— or —S— in such a way that hetero atoms are not linked directly and which may be unsubstituted or mono- or polysubstituted by F, Cl, Br and/or I;

$Z^1$ and $Z^2$ each, independently of one another, denote a single bond, a double bond, —$CF_2O$—, —$OCF_2$—, —$CH_2CH_2$—, —$CF_2CF_2$—, —$CF_2CH_2$—, —$CH_2CF_2$—, —CHF—CHF—, —C(O)O—, —OC(O)—, —$CH_2O$—, —$OCH_2$—, —CF=CH—, —CH=CF—, —CF=CF—, —CH=CH— or —C≡C—;

$R^1$ and $R^2$ denote hydrogen, an alkanyl, alkoxy, alkenyl or alkynyl radical having 1 to 15 or 2 to 15 C atoms respectively, each of which is unsubstituted, monosubstituted by —CN or —$CF_3$ or monosubstituted or polysubstituted by F, Cl, Br and/or I, where, in addition, one or more $CH_2$ groups in these radicals may each be replaced, independently of one another, by —O—, —S—, —$SO_2$—, —CO—, —COO—, —OCO— or —OCO—O— in such a way that hetero atoms in the chain are not linked directly, F, Cl, Br, I, —CN, —SCN, —NCS or —$SF_5$;

m and n, independently of one another, are 0, 1, 2 or 3;

$X^1$, $X^2$ and $Y^2$ each, independently of one another, denote hydrogen, an alkanyl, alkoxy, alkenyl or alkynyl radical having 1 to 15 or 2 to 15 C atoms respectively, each of which is unsubstituted or monosubstituted or polysubstituted by F, Cl, Br and/or I, where, in addition, one or more $CH_2$ groups in these radicals may each be replaced, independently of one another, by —O—, —S—, —$SO_2$—, —CO—, —COO—, —OCO— or —OCO—O— in such a way that hetero atoms in the chain are not linked directly, F, Cl, Br, I, —CN, —$SF_5$, —SCN or —NCS;

$Y^1$ is as defined for $Y^2$ or stands for —[—$Z^3$-$A^3$-$]_p$-$R^3$, where $Z^3$ is as defined for $Z^1$ and $Z^2$, $A^3$ is as defined for $A^1$ and $A^2$, $R^3$ is as defined for $R^1$ and $R^2$, and p is as defined for n and m;

where $A^1$, $A^2$, $A^3$, $Z^1$, $Z^2$, $Z^3$, $R^1$, $R^2$ and $R^3$ may each have identical or different meanings if m, n and p respectively are greater than 1;

$Y^1$ and $Y^2$ may each have identical or different meanings for rings B and B';

and where (a) $R^1$ does not stand for —COOH if ring B stands for ring f or g and ring B' stands for ring d and at the same time m is zero and $X^2$ is not H, or $R^2$ does not stand for —COOH if ring B' stands for ring f or g and ring B stands for ring d and n is zero and $X^1$ is not H;

(b) $R^1$-[-$A^1$-$Z^1$—$]_m$— and —[—$Z^2$-$A^2$-]-$R^2$ are not simultaneously $CH_3$ if one of $X^1$ and $X^2$ is hydrogen and the other of $X^1$ and $X^2$ is hydrogen or Cl and at the same time both rings B and B' stand for ring g.

The compounds have negative Δε and are therefore suitable, in particular, for use in VA-TFT displays. The compounds according to the invention preferably have a Δε of <−2 and particularly preferably a Δε of <−5. They exhibit very good compatibility with the usual substances used in liquid-crystal mixtures for displays.

Furthermore, the compounds of the formula I according to the invention have values for the optical anisotropy Δn which are particularly suitable for use in VA-TFT displays. The compounds according to the invention preferably have a Δn of greater than 0.02 and less than 0.25.

The other physical, physicochemical or electro-optical parameters of the compounds according to the invention are also advantageous for use of the compounds in liquid-crystalline media. The compounds have, in particular, a sufficient breadth of the nematic phase and good low-temperature and long-term stability as well as sufficiently high clearing points and good viscosities and response times.

It is preferred for at least one of the radicals $X^1$ and $X^2$ on the central aromatic six-membered ring of the compound of the formula I to be other than hydrogen.

It is furthermore preferred for at least one of rings B and B' to have at least one electronegative radical (for example —F, —Cl or =O or halogen-substituted alkyl radicals). It is particularly preferred for both rings B and B' to have electronegative radicals.

The radicals $X^1$ and $X^2$, preferably —CF$_3$, —OCF$_3$, fluorine and/or chlorine substituents, in particular fluorine substituents, on the central aromatic six-membered ring and the preferably electronegative radicals on ring B or B' produce a dipole moment perpendicular to the longitudinal axis of the molecule, which can optionally be further strengthened by suitable substituents in the wing units —$(Z^1$-$A^1$-$)_m$-$R^1$ and —$(Z^2$-$A^2$-$)_n$-$R^2$. In the field-free state, the compounds of the formula I orient themselves with their longitudinal molecular axis perpendicular to the treated or coated glass surface of the display.

Preferred compounds of the formula I according to the invention are those in which rings B and B' are each, independently of one another, selected from

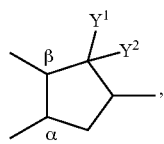

a

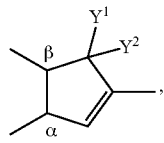

b

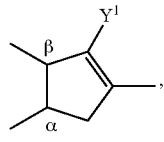

e

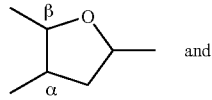

and f

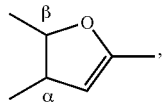

g where $Y^1$ and $Y^2$ are as defined above for the formula I. It is particularly preferred here for rings B and B' to be identical, where the radical $Y^1$ in the two rings may have identical or different meanings and the radical $Y^2$ in the two rings may have identical or different meanings.

$Y^1$ and $Y^2$ are particularly preferably, independently of one another, F, Cl or a (per)fluorinated alkanyl or alkoxy radical having up to 6 carbon atoms, in particular —CF$_3$ or —OCF$_3$. Furthermore, $Y^1$ is particularly preferably also —[—$Z^3$-$A^3$-$]_p$-$R^3$. $Y^1$ and $Y^2$ in at least one of the rings B and B' are very particularly preferably F, in particular in both rings.

It is furthermore preferred for the compounds of the formula I according to the invention to be selected from the group consisting of compounds of the following formulae:

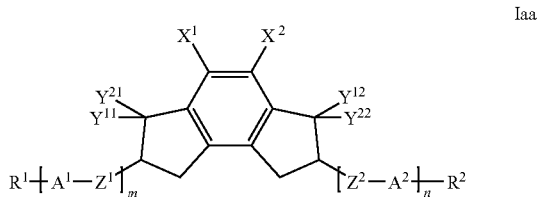

Iaa

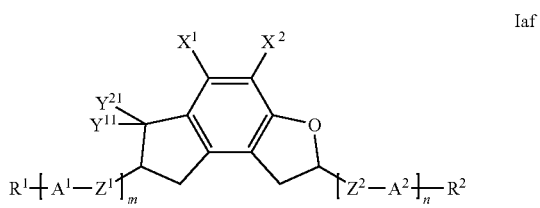

Iaf

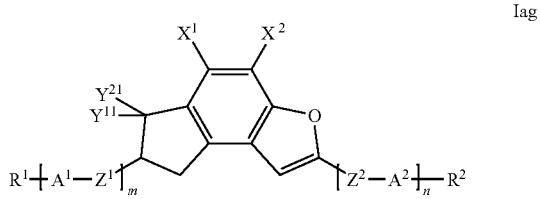

Iag

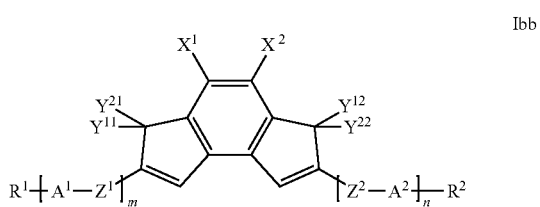

Ibb

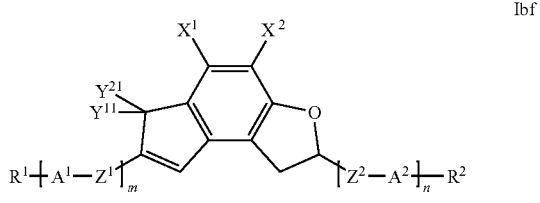

Ibf

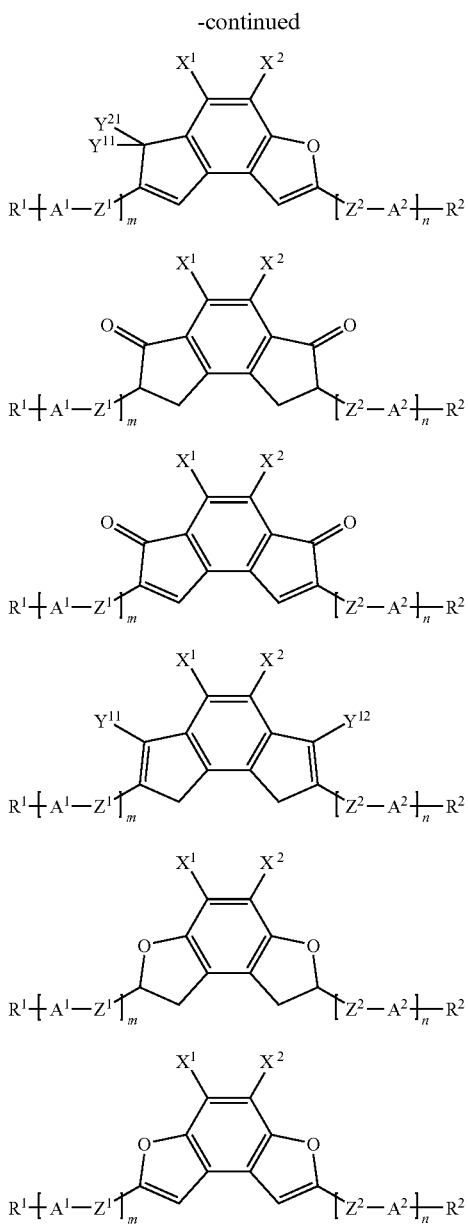

where $X^1, X^2, R^1, R^2, A^1, A^2, Z^1, Z^2$, m and n are as defined in claim 1 and as defined above for the formula I;

$Y^{11}$ and $Y^{12}$ are as defined for $Y^1$ in claim 1 and as defined above for the formula I and can have identical or different meanings; and $Y^{21}$ and $Y^{22}$ are as defined for $Y^2$ in claim 1 and as defined above for the formula I and can have identical or different meanings.

$Y^{11}, Y^{12}, Y^{21}$ and $Y^{22}$ are particularly preferably, independently of one another, H, F, Cl or a (per)fluorinated alkanyl or alkoxy radical having up to 6 carbon atoms, in particular —$CF_3$ or —$OCF_3$. Furthermore, $Y^{11}$ and $Y^{12}$ particularly preferably also stand for —$[—Z^3-A^3-]_p$-$R^3$. $Y^{11}$ and $Y^{21}$ or $Y^{12}$ and $Y^{22}$ are very particularly preferably identical and are in particular fluorine. In particular, $Y^{11}, Y^{21}, Y^{12}$ and $Y^{22}$ are all simultaneously fluorine.

Particular preference is given to compounds of the formulae Iaa, Ibb, Iee, Iff and Igg.

In the compounds of the general formula I and of the formulae Iaa, Iaf, Iag, Ibb, Ibf, Ibg, Icc, Idd, Iee, Iff and Igg according to the invention, $Z^1$ and $Z^2$ and—if present—$Z^3$ preferably, independently of one another, stand for a single bond, —$CF_2O$—, —$OCF_2$—, —$CF_2CF_2$—, —$CH=CH$—, —$CF=CH$—, —$CH=CF$— or —$CF=CF$—, particularly preferably a single bond, —$CF_2O$— or —$OCF_2$—, in particular a single bond.

In the compounds of the formula I and of the formulae Iaa, Iaf, Iag, Ibb, Ibf, Ibg, Icc, Idd, Iee, Iff and Igg according to the invention, $A^1, A^2$ and—if present—$A^3$ are preferably, independently of one another, optionally substituted 1,4-phenylene, optionally substituted 1,4-cyclohexylene, in which —$CH_2$— may be replaced once or twice by —O—, or optionally substituted 1,4-cyclohexenylene. In the case where m>1, the rings $A^1$ may adopt identical or different meanings. In the case where n>1, the rings $A^2$ may adopt identical or different meanings. In the case where p>1, the rings $A^3$ may adopt identical or different meanings.

$A^1, A^2$ and—if present—$A^3$ are particularly preferably, independently of one another,

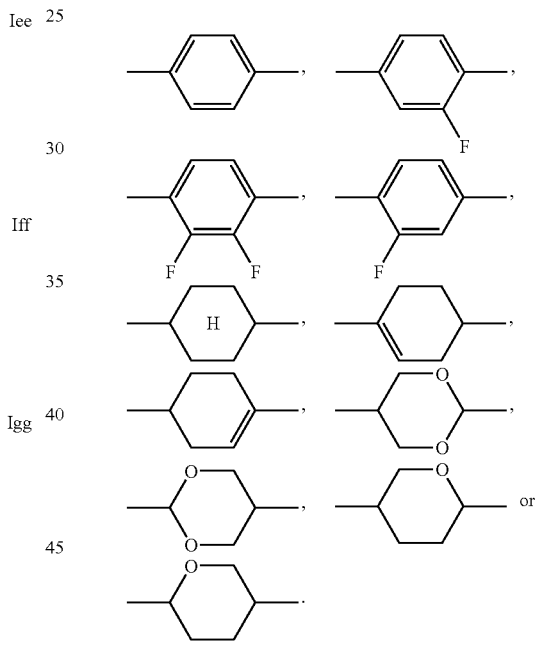

$A^1, A^2$ and—if present—$A^3$ are very particularly preferably 1,4-cyclohexylene rings and/or optionally fluorine-substituted 1,4-phenylene rings.

$R^1, R^2, R^3, X^1, X^2, Y^1$ and $Y^2$ in the formula I may each, independently of one another, be an alkanyl radical and/or an alkoxy radical (alkyloxy radical) having 1 to 15 C atoms which is straight-chain or branched. It is preferably straight-chain, has 1, 2, 3, 4, 5, 6 or 7 C atoms and is accordingly preferably methyl, ethyl, propyl, butyl, pentyl, hexyl, heptyl, methoxy, ethoxy, propoxy, butoxy, pentoxy, hexoxy or heptoxy.

$R^1, R^2, R^3, X^1, X^2, Y^1$ and $Y^2$ in the formula I may each, independently of one another, be oxaalkyl—i.e. one of the non-terminal $CH_2$ groups of the alkanyl radical has been replaced by —O—preferably straight-chain 2-oxapropyl (=methoxymethyl), 2-(=ethoxymethyl) or 3-oxabutyl (=methoxyethyl), 2-, 3- or 4-oxapentyl, 2-, 3-, 4- or 5-oxahexyl, or 2-, 3-, 4-, 5- or 6-oxaheptyl. In a corresponding manner, $R^1$, $R^2$, $R^3$, $X^1$, $X^2$, $Y^1$, and $Y^2$ in the formula I may also, independently of one another, be thioalkanyl or sulfonylalkanyl radicals, i.e. alkanyl radicals in which one $CH_2$ group has been replaced by —S— or —$SO_2$—.

$R^1$, $R^2$, $R^3$, $X^1$, $X^2$, $Y^1$ and $Y^2$ in the formula I may furthermore each, independently of one another, be an alkenyl radical having 2 to 15 C atoms which is straight-chain or branched and has at least one C—C double bond. It is preferably straight-chain and has 2 to 7 C atoms. Accordingly, it is preferably vinyl, prop-1- or -2-enyl, but-1-, -2- or -3-enyl, pent-1-, -2-, -3- or 4-enyl, hex-1-, -2-, -3-, -4- or -5-enyl, or hept-1-, -2-, -3-, 4-, -5- or -6-enyl. If the two C atoms of the C—C double bond are substituted, the alkenyl radical can be in the form of the E and/or Z isomer (trans/cis). In general, the respective E isomers are preferred.

$R^1$, $R^2$, $R^3$, $X^1$, $X^2$, $Y^1$ and $Y^2$ in the formula I may also, independently of one another, be an alkynyl radical having 2 to 15 C atoms which is straight-chain or branched and has at least one C—C triple bond.

$R^1$, $R^2$, $R^3$, $X^1$, $X^2$, $Y^1$ and $Y^2$ in the formula I may each, independently of one another, be an alkanyl radical having 1 to 15 C atoms in which one $CH_2$ group has been replaced by —O— and one has been replaced by —CO—, these preferably being adjacent. This thus contains an acyloxy group —CO—O— or an oxycarbonyl group —O—CO—. This radical is preferably straight-chain and has 2 to 6 C atoms. The following of these radicals are preferred here: acetoxy, propionyloxy, butyryloxy, pentanoyloxy, hexanoyloxy, acetoxymethyl, propionyloxymethyl, butyryloxymethyl, pentanoyloxymethyl, 2-acetoxyethyl, 2-propionyloxyethyl, 2-butyryloxyethyl, 2-acetoxypropyl, 3-propionyloxypropyl, 4-acetoxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl and 4-(methoxycarbonyl)butyl. Furthermore, an alkanyl radical can also have an —O—CO—O— unit. Replacement of a $CH_2$ group by only one —CO— group (carbonyl function) is also possible.

$R^1$, $R^2$, $R^3$, $X^1$, $X^2$, $Y^1$ and $Y^2$ in the formula I may each, independently of one another, be an alkenyl radical having 2 to 15 C atoms in which a $CH_2$ group in the vicinity of an unsubstituted or substituted —C≡C— unit has been replaced by —CO— or —CO—O— or —O—CO—, where this radical may be straight-chain or branched. The radical is preferably straight-chain and has 4 to 13 C atoms. Particular preference is given here to acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl and 8-methacryloyloxyoctyl. Correspondingly, a $CH_2$ group in the vicinity of a substituted —C≡C-unit in an alkynyl radical may also be replaced by —CO—, —CO—O—, —O—CO— or —O—CO—O—.

$R^1$, $R^2$ and $R^3$ in the formula I may each, independently of one another, be an alkanyl radical having 1 to 15 C atoms or alkenyl radical having 2 to 15 C atoms which is monosubstituted by —CN or —$CF_3$, where these are preferably straight-chain. The substitution by —CN or —$CF_3$ is possible in any desired position.

$R^1$, $R^2$, $R^3$, $X^1$, $X^2$, $Y^1$ and $Y^2$ in the formula I may each, independently of one another, be an alkanyl radical in which two or more $CH_2$ groups have been replaced by —O— and/or —CO—, where this may be straight-chain or branched. It is preferably branched and has 3 to 12 C atoms.

$R^1$, $R^2$, $R^3$, $X^1$, $X^2$, $Y^1$ and $Y^2$ in the formula I may each, independently of one another, be an alkanyl radical having 1 to 15 C atoms or an alkenyl radical having 2 to 15 C atoms which is monosubstituted or polysubstituted by F, Cl, Br and/or I, where these radicals are preferably straight-chain and halogen is preferably —F and/or —Cl. In the case of polysubstitution, halogen is preferably —F. The resultant radicals also include perfluorinated radicals, such as —$CF_3$. In the case of monosubstitution, the fluorine or chlorine substituent can be in any desired position, but is preferably in the ω position.

$R^1$, $R^2$, $R^3$, $X^1$, $X^2$, $Y^1$ and $Y^2$ in the formula I may also each, independently of one another, be —F, —Cl, —Br, —I, —CN, —SCN, —NCS or —$SF_5$.

$R^1$, $R^2$ and $R^3$ in the general formula I are particularly preferably, independently of one another, an alkanyl radical, alkoxy radical or alkenyl radical having 1 to 7 or 2 to 7 C atoms respectively.

$X^1$ and $X^2$ in the general formula I are preferably, independently of one another, hydrogen, an alkanyl radical, alkoxy radical or alkenyl radical having 1 to 7 or 2 to 7 C atoms respectively, each of which is at least monosubstituted by halogen, or a halogen. It is particularly preferred here for at least one of $X^1$ and $X^2$ to be —$CF_3$, —$OCF_3$, F or Cl. Very particularly preferably, both radicals $X^1$ and $X^2$ are —$CF_3$, —$OCF_3$, fluorine or chlorine, and in particular both are fluorine.

Preferred compounds of the general formula I have a total of zero, one, two or three wing units —$Z^1$-$A^1$- and —$Z^2$-$A^2$-, i.e. n+m=0, 1, 2 or 3, where n and m are each 0, 1, 2 or 3. If two or three wing units are present, they may be bonded to only one side of the molecule, i.e. to ring B or to ring B', or alternatively to both sides of the molecule. Particularly preferably, n+m=0 or 1.

In connection with the present invention, halogen denotes fluorine, chlorine, bromine and iodine.

In connection with the present invention, the term "alkyl"—unless defined otherwise elsewhere in this description or in the claims—denotes a straight-chain or branched aliphatic hydrocarbon radical having 1 to 15 (i.e. 1, 2, 3, 4, 5, 6, 7, 8, 9, 10, 11, 12, 13, 14 or 15) carbon atoms; this radical is unsubstituted or monosubstituted or polysubstituted by fluorine, chlorine, bromine, iodine, carboxyl, nitro, —$NH_2$, —N(alkanyl)$_2$ and/or cyano, where the polysubstitution can take place with identical or different substituents. If this alkyl radical is a saturated radical, it is also referred to as "alkanyl". Furthermore, the term "alkyl" also encompasses hydrocarbon radicals which are unsubstituted or correspondingly mono- or polysubstituted by identical or different substituents, in particular by F, Cl, Br, I and/or —CN, and in which one or more $CH_2$ groups may be replaced by —O— ("alkoxy", "oxaalkyl"), —S— ("thioalkyl"), —$SO_2$—, —CH=CH— ("alkenyl"), —C≡C— ("alkynyl"), —CO—, —CO—O—, —O—CO— or —O—CO—O— in such a way that hetero atoms (O or S) in the chain are not linked directly to one another. Alkyl is preferably a straight-chain or branched, unsubstituted or substituted alkanyl, alkenyl or alkoxy radical having 1, 2, 3, 4, 5, 6, 7 or 8 carbon atoms.

Since one or more $CH_2$ groups in an alkyl radical may be replaced by —O—, the term "alkyl" also encompasses "alkoxy" or "oxaalkyl" radicals. In connection with the present invention—if the term is not defined otherwise elsewhere in the description or in the claims—the term alkoxy is taken to mean an O-alkyl radical in which the oxygen atom is bonded directly to the alkoxy-substituted group or the substituted ring and alkyl is as defined above; alkyl is preferably then alkanyl or alkenyl. Preferred alkoxy radicals are methoxy, ethoxy, propoxy, butoxy, pentoxy, hexoxy, heptoxy and octoxy, where each of these radicals may also be substituted, preferably by one or more fluorine atoms. Alkoxy is particularly preferably —OCH$_3$, —OC$_2$H$_5$, —O-n-C$_3$H$_7$, —O-n-C$_4$H$_9$, —O-t-C$_4$H$_9$, —OCF$_3$, —OCHF$_2$, —OCHF or —OCHFCHF$_2$. In connection with the present invention, the term "oxaalkyl"—if the term is not defined otherwise elsewhere in the description or in the claims—denotes alkyl radicals in which at least one non-terminal CH$_2$ group has been replaced by —O— in such a way that there are no adjacent hetero atoms (O or S). Oxaalkyl preferably encompasses straight-chain radicals having 1, 2, 3, 4, 5, 6, 7, 8, 9 or 10 carbon atoms.

In connection with the present invention, the term "alkenyl"—unless defined otherwise in the claims or elsewhere in this description—denotes an alkyl radical as defined above in which one or more —CH=CH— groups are present. If two —CH=CH— groups are present in the radical, this may also be referred to as "alkadienyl". An alkenyl radical can contain 2 to 15 (i.e. 2, 3, 4, 5, 6, 7, 8, 9, 10, 11, 12, 13, 14 or 15) carbon atoms and is branched or preferably straight-chain. The radical is unsubstituted or mono- or polysubstituted by identical or different substituents, in particular by F, Cl, Br, I and/or CN. Furthermore, one or more CH$_2$ groups may each, independently of one another, be replaced by —O—, —S—, —C≡C—, —CO—, —CO—O—, —O—CO—, —O—CO—O— in such a way that hetero atoms (O or S) are not bonded directly to one another. If the CH=CH group carries a radical other than hydrogen on both carbon atoms, for example if it is a non-terminal group, the CH=CH group can exist in two configurations, namely as the E isomer and as the Z isomer. In general, the E isomer (trans) is preferred. The alkenyl radical preferably contains 2, 3, 4, 5, 6 or 7 carbon atoms and denotes vinyl, 1E-propenyl, 1E-butenyl, 1E-pentenyl, 1E-hexenyl, 1E-heptenyl, 2-propenyl, 2E-butenyl, 2E-pentenyl, 2E-hexenyl, 2E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl or 6-heptenyl.

If one or more CH$_2$ groups in an alkyl radical have been replaced by —C≡C—, an alkynyl radical is present. Replacement of one or more CH$_2$ groups by —CO—O— or —O—CO— is also possible. The following of these radicals are preferred here: acetoxy, propionyloxy, butyryloxy, pentanoyloxy, hexanoyloxy, acetoxymethyl, propionyloxymethyl, butyryloxymethyl, pentanoyloxymethyl, 2-acetoxyethyl, 2-propionyloxyethyl, 2-butyryloxyethyl, 2-acetoxypropyl, 3-propionyloxypropyl, 4-acetoxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl and 4-(methoxycarbonyl)butyl.

If one CH$_2$ group in an alkyl radical has been replaced by unsubstituted or substituted —CH=CH— and an adjacent CH$_2$ group has been replaced by CO, CO—O or O—CO, this radical may be straight-chain or branched. It is preferably straight-chain and has 4 to 12 C atoms. Accordingly, it particularly preferably denotes acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl or 8-methacryloyloxyoctyl.

If radicals or substituents of the compounds according to the invention or the compounds according to the invention themselves can exist as optically active or stereoisomeric radicals, substituents or compounds respectively since they have, for example, a centre of asymmetry, these are also encompassed by the present invention. It goes without saying here that the compounds of the general formula I according to the invention can exist in isomerically pure form, for example as pure enantiomers, diastereomers, E or Z isomers, trans or cis isomers, or as a mixture of a plurality of isomers in any desired ratio, for example as a racemate, E/Z isomer mixture or cis/trans isomer mixture.

The compounds of the general formula I are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can be made here of variants which are known per se, but are not mentioned here in greater detail.

If desired, the starting materials can also be formed in situ by not isolating them from the reaction mixture, but instead immediately converting them further into the compounds of the general formula I.

The syntheses of various polysubstituted phenyl derivatives which are used to build up the as-indacene derivatives according to the invention containing the fused five-membered rings B and B' are described by way of example in the examples. The starting substances are obtainable by generally accessible literature procedures or are commercially available. The reactions described should likewise be regarded as known from the literature.

An illustrative synthesis for building up the as-indacene skeleton is shown below. The synthesis can be adapted to the particular desired compounds of the general formula I through the choice of suitable starting materials.

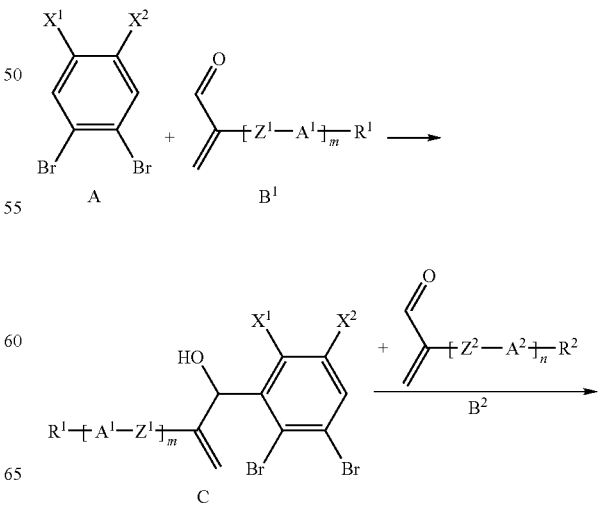

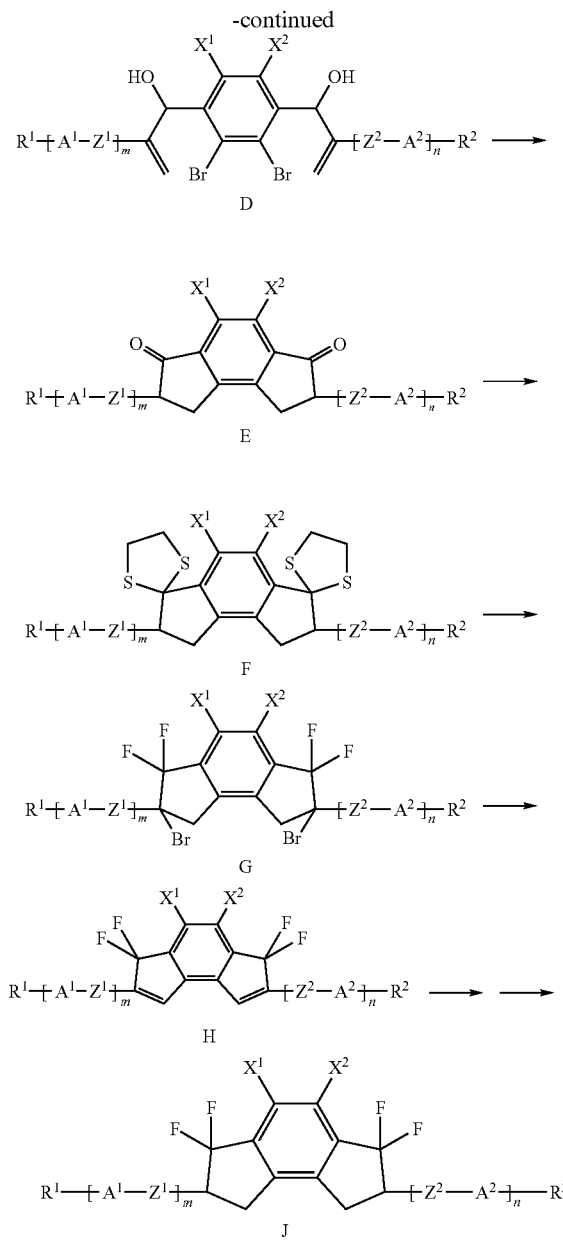

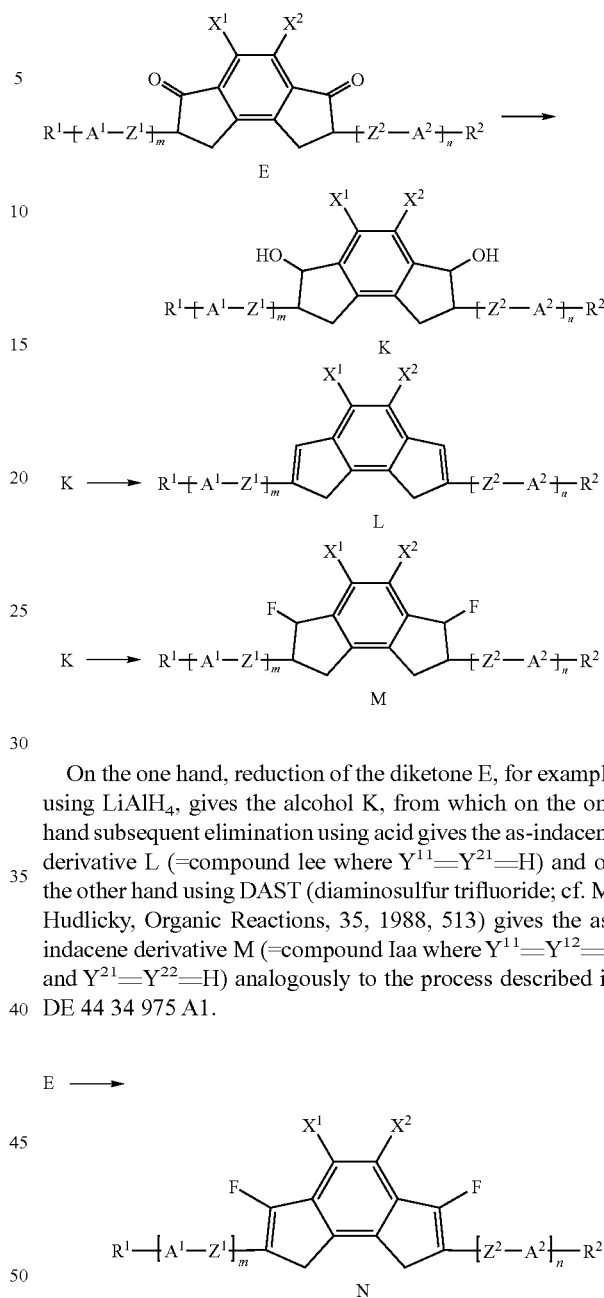

Starting from the 1,2-dibromophenol derivative A, reaction with the α,β-unsaturated aldehyde $B^1$ in the presence of lithium diisopropylamide (LDA) gives compound C. Repetition of this reaction with the aldehyde B gives D. D reacts with palladium catalysis in the presence of triethylamine with ring closure to give the diketone E (=compound Icc). The diketone E and 1,2-ethanedithiol in the presence of $BF_3$/diethyl ether give the corresponding bisdithiane F. This is reacted with 1,3-dibromo-5,5-dimethylhydantoin (DBH) and HF in pyridine to give G. Elimination of HBr in the presence of diazabicycloundecene (DBU) gives the as-indacene derivative H (=compound Ibb where $Y^{11}=Y^{12}=Y^{21}=Y^{22}=F$). The as-indacene derivative H is hydrogenated on palladium/carbon catalyst in a hydrogen atmosphere to give the as-indacene derivative J (=compound Iaa where $Y^{11}=Y^{12}=Y^{21}=Y^{22}=F$).

On the one hand, reduction of the diketone E, for example using $LiAlH_4$, gives the alcohol K, from which on the one hand subsequent elimination using acid gives the as-indacene derivative L (=compound Iee where $Y^{11}=Y^{21}=H$) and on the other hand using DAST (diaminosulfur trifluoride; cf. M. Hudlicky, Organic Reactions, 35, 1988, 513) gives the as-indacene derivative M (=compound Iaa where $Y^{11}=Y^{12}=F$ and $Y^{21}=Y^{22}=H$) analogously to the process described in DE 44 34 975 A1.

Furthermore, reaction of the diketone E with DAST analogously to the process disclosed in DE 44 34 975 A1 gives the as-indacene derivative N (=compound Iee where $Y^1=Y^2=F$).

The introduction of chlorine atoms (instead of fluorine atoms) is also possible starting from the diketone E with phosphoryl chloride with warming in dimethylformamide. Trifluoromethyl radicals are introduced analogously to the process disclosed in DE 10135499 A1 starting from the diketone E.

A further illustrative synthesis of compounds of the formula I according to the invention is shown by the following scheme:

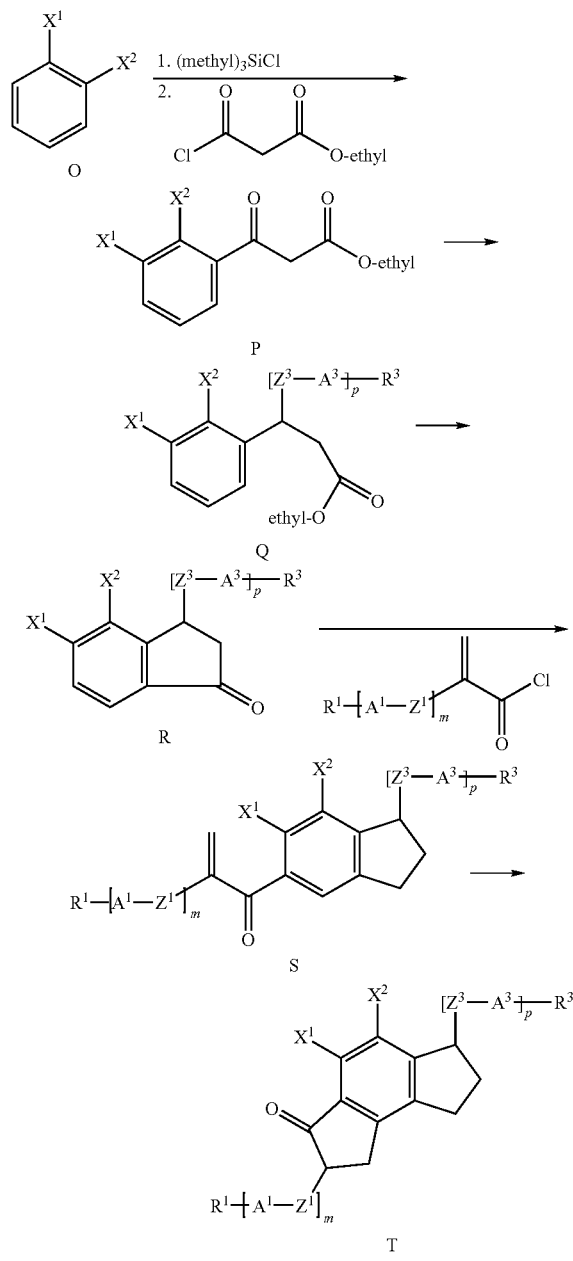

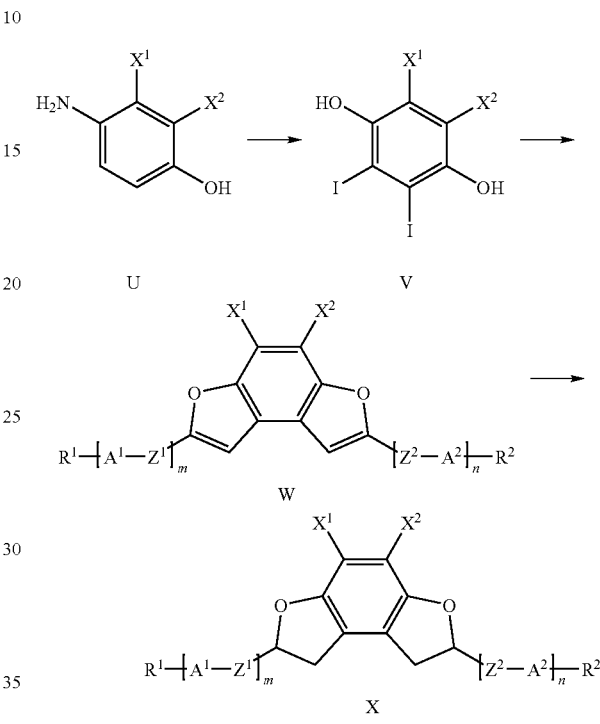

Starting from O, a trimethylsilyl group can be introduced into the phenyl ring using n-butyllithium and trimethylsilyl chloride; subsequent reaction with the acid chloride shown with Lewis acid catalysis gives P. Depending on the meaning of the radical —[—$Z^3$-$A^3$-]$_p$-$R^3$, it is introduced with formation of Q by a Wittig reaction and subsequent catalytic hydrogenation (p=0, $R^3$=alkyl) or by reaction with a suitable organometallic compound containing —[—$Z^3$-$A^3$-]$_p$-$R^3$ as structural unit, subsequent elimination of the OH group formed and final catalytic reduction. Cyclisation to give R is carried out after saponification of the ester function and conversion into an acid chloride with Lewis acid catalysis. The resultant keto function of R can be reduced by means of a Wolff-Kishner reduction, followed by silylation using trimethylsilyl chloride and reaction with the acid chloride shown to give S. Cyclisation to give T is carried out with acid cataly-sis. Starting from T, further compounds of the formula I according to the invention are then accessible in the manner described above.

Compounds according to the invention containing one or two oxygen-containing five-membered rings can be prepared in accordance with the following scheme or with adaptation thereof and of the syntheses described for the formation of the carbocyclic five-membered rings:

After diazotisation and introduction of the second OH group using iodine/potassium carbonate, the aromatic compound U is converted into the diiodinated aromatic compound V. With catalysis using bistriphenylphosphinepalladium(II) chloride and copper(I) iodide, the alkyne $R^1$-[-$A^1$-$Z^1$—]$_m$≡ or $R^2$-[-$A^2$-$Z^2$—]$_n$-≡ gives the benzodifuran W, from which X is also accessible by means of catalytic hydrogenation.

The following synthesis sequence illustrates the preparation of compounds according to the invention having an oxygen-containing five-membered ring, where recourse can be made to the preparation methods explained for the above schemes for the individual synthesis steps.

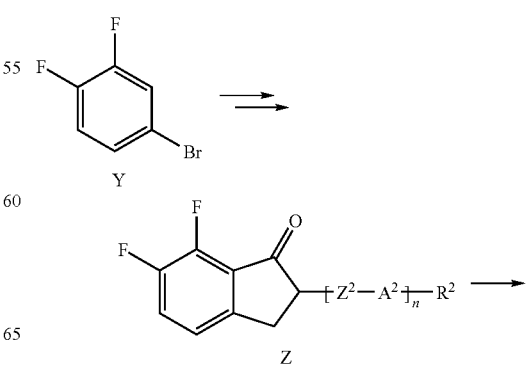

-continued

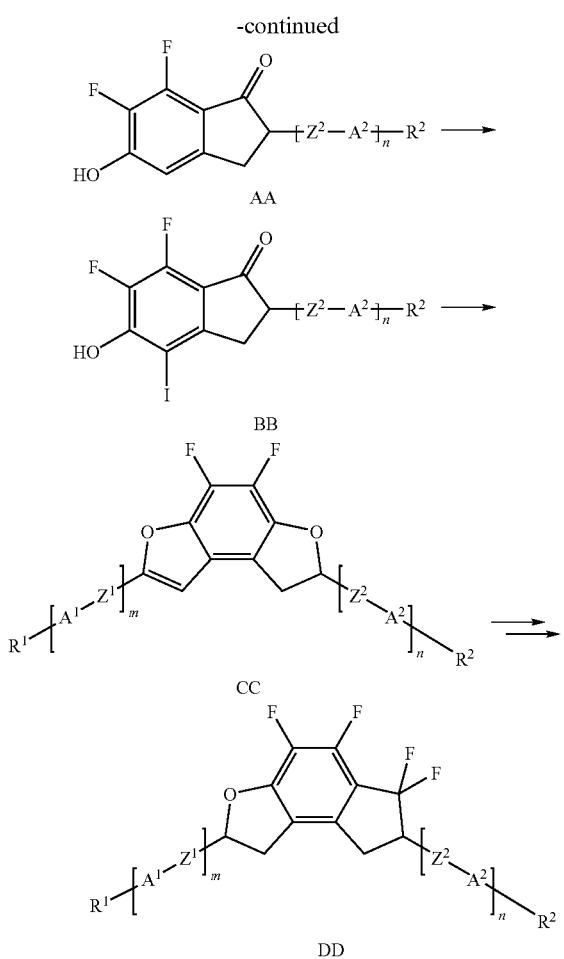

The reactions described should only be regarded as illustrative. The person skilled in the art can carry out corresponding variations of the syntheses described and also follow other suitable synthetic routes in order to obtain compounds of the formula I.

As already mentioned, the compounds of the general formula I can be used in liquid-crystalline media.

The present invention therefore also relates to a liquid-crystalline medium comprising at least two liquid-crystalline compounds, comprising at least one compound of the general formula I.

The present invention also relates to liquid-crystalline media comprising 2 to 40, preferably 4 to 30, components as further constituents besides one or more compounds of the formula I according to the invention. These media particularly preferably comprise 7 to 25 components besides one or more compounds according to the invention. These further constituents are preferably selected from nematic or nematogenic (monotropic or isotropic) substances, in particular substances from the classes of the azoxybenzenes, benzylideneanilines, biphenyls, terphenyls, 1,3-dioxanes, 2,5-tetrahydropyrans, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid or of cyclohexylcyclohexanecarboxylic acid, phenylcyclohexanes, cyclohexylbiphenyls, phenylcyclohexylcyclohexanes, cyclohexylcyclohexanes, cyclohexylcyclohexylcyclohexenes, 1,4-biscyclohexylbenzenes, 4',4'-biscyclohexylbiphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylethanes, 1-phenyl-2-cyclohexylphenylethanes, optionally halogenated stilbenes, benzyl phenyl ethers, tolans and substituted cinnamic acids. The 1,4-phenylene groups in these compounds may also be mono- or polyfluorinated.

The most important compounds suitable as further constituents of media according to the invention can be characterised by the formulae (II), (III), (IV), (V) and (VI):

In the formulae (II), (III), (IV), (V) and (VI), L and E, which may be identical or different, each, independently of one another, denote a divalent radical from the group formed by -Phe-, -Cyc-, -Phe-Phe-, -Phe-Cyc-, -Cyc-Cyc-, -Pyr-, -Dio-, -Thp-, -G-Phe- and -G-Cyc- and their mirror images, where Phe denotes unsubstituted or fluorine-substituted 1,4-phenylene, Cyc denotes trans-1,4-cyclohexylene or 1,4-cyclohexylene, Pyr denotes pyrimidine-2,5-diyl or pyridine-2,5-diyl, Dio denotes 1,3-dioxane-2,5-diyl, Thp denotes tetrahydropyran-2,5-diyl and G denotes 2-(trans-1,4-cyclohexyl)ethyl, pyrimidine-2,5-diyl, pyridine-2,5-diyl, 1,3-dioxane-2,5-diyl or tetrahydropyran-2,5-diyl.

One of the radicals L and E is preferably Cyc or Phe. E is preferably Cyc, Phe or Phe-Cyc. The media according to the invention preferably comprise one or more components selected from the compounds of the formulae (II), (III), (IV), (V) and (VI) in which L and E are selected from the group consisting of Cyc and Phe and simultaneously one or more components selected from the compounds of the formulae (II), (III), (IV), (V) and (VI) in which one of the radicals L and E is selected from the group consisting of Cyc and Phe and the other radical is selected from the group consisting of -Phe-Phe-, -Phe-Cyc-, -Cyc-Cyc-, -G-Phe- and -G-Cyc-, and optionally one or more components selected from the compounds of the formulae (II), (III), (IV), (V) and (VI) in which the radicals L and E are selected from the group consisting of -Phe-Cyc-, -Cyc-Cyc-, -G-Phe- and -G-Cyc-.

In a smaller sub-group of the compounds of the formulae (II), (III), (IV), (V) and (VI), R' and R'' each, independently of one another, denote alkyl, alkenyl, alkoxy, alkoxyalkyl (oxaalkyl), alkenyloxy or alkanoyloxy having up to 8 C atoms. This smaller sub-group is called group A below, and the compounds are referred to by the sub-formulae (IIa), (IIIa), (IVa), (Va) and (VIa). In most of these compounds, R' and R'' are different from one another, one of these radicals usually being alkyl, alkenyl, alkoxy or alkoxyalkyl (oxaalkyl).

In another smaller sub-group of the compounds of the formulae (II), (III), (IV), (V) and (VI), which is known as group B, E denotes

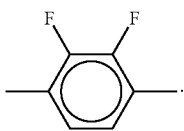

In the compounds of group B, which are referred to by the sub-formulae (IIb), (IIIb), (IVb), (Vb) and (VIb), R' and R" have the meaning indicated for the compounds of the sub-formulae (IIa) to (VIa) and are preferably alkyl, alkenyl, alkoxy or alkoxyalkyl (oxaalkyl).

In a further smaller sub-group of the compounds of the formulae (II), (III), (IV), (V) and (VI), R" denotes —CN. This sub-group is referred to below as group C, and the compounds of this sub-group are correspondingly described by the sub-formulae (IIc), (IIIc), (IVc), (Vc) and (VIc). In the compounds of the sub-formulae (IIc), (IIIc), (IVc), (Vc) and (VIc), R' has the meaning indicated for the compounds of the sub-formulae (IIa) to (VIa) and is preferably alkyl, alkenyl, alkoxy or alkoxyalkyl (oxaalkyl).

Besides the preferred compounds of groups A, B and C, other compounds of the formulae (II), (III), (IV), (V) and (VI) having other variants of the proposed substituents are also customary. All these substances are obtainable by methods which are known from the literature or analogously thereto.

Besides the compounds of the general formula I according to the invention, the media according to the invention preferably comprise one or more compounds from groups A, B and/or C. The proportions by weight of the compounds from these groups in the media according to the invention are:

group A: 0 to 90%, preferably 20 to 90%, in particular 30 to 90%
group B: 0 to 80%, preferably 10 to 80%, in particular 10 to 70%
group C: 0 to 80%, preferably 5 to 80%, in particular 5 to 50%.

The media according to the invention preferably comprise 1 to 40%, particularly preferably 5 to 30%, of the compounds of the formula I according to the invention. Preference is furthermore given to media comprising more than 40%, in particular 45 to 90%, of compounds of the formula I according to the invention. The media preferably comprise one, two, three, four or five compounds of the formula I according to the invention.

Examples of the compounds of the formulae (II), (III), (IV), (V) and (VI) are the compounds listed below:

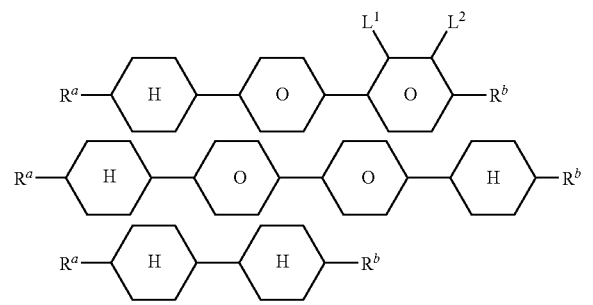

-continued

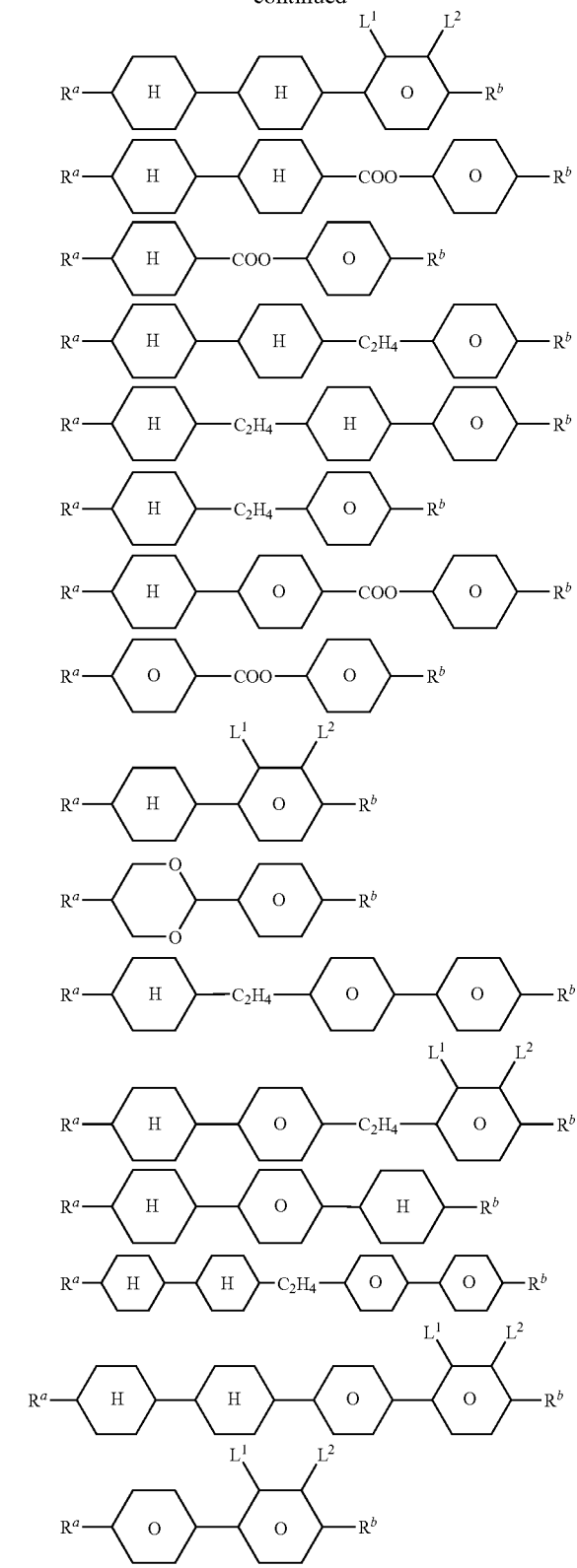

where $R^a$ and $R^b$, independently of one another, are —$C_nH_{2n+1}$ or —$OC_nH_{2n+1}$, and n=1, 2, 3, 4, 5, 6, 7 or 8, and $L^1$ and $L^2$, independently of one another, are —H or —F,

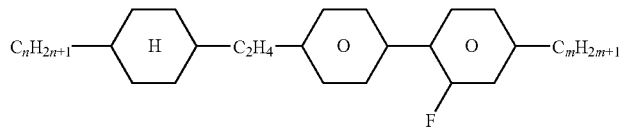
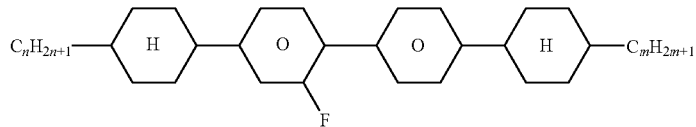
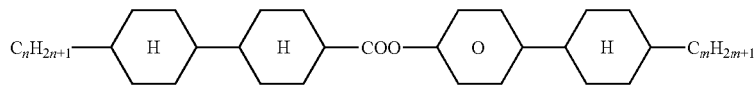
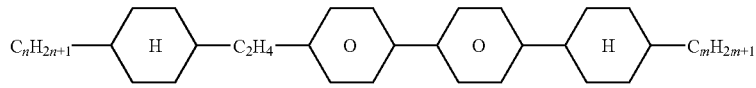
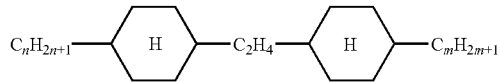
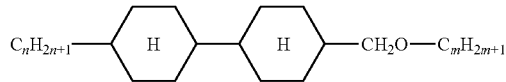
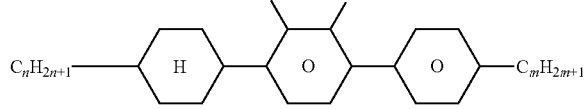
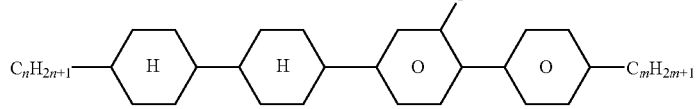
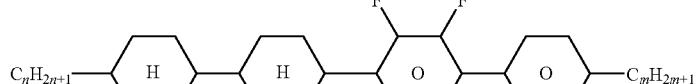
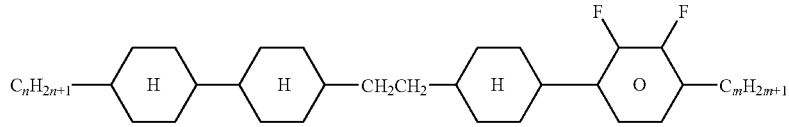
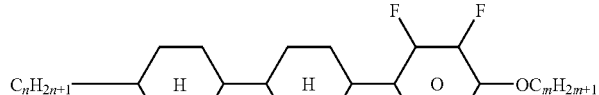
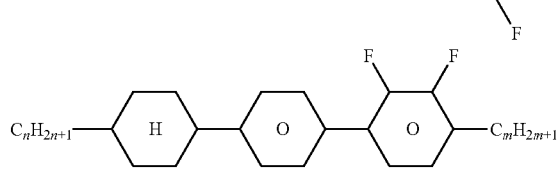

where m and n, independently of one another, are 1, 2, 3, 4, 5, 6, 7 or 8.

The media according to the invention are prepared in a manner conventional per se. In general, the components are dissolved in one another, advantageously at elevated temperature. By means of suitable additives, the liquid-crystalline phases of the present invention can be modified in such a way that they can be used in all types of liquid-crystal display element that have been disclosed hitherto. Additives of this type are known to the person skilled in the art and are described in detail in the literature (H. Kelker/R. Hatz, Handbook of Liquid Crystals, Verlag Chemie, Weinheim, 1980). For example, pleochroic dyes can be used for the production of coloured guest-host systems or substances can be added in order to modify the dielectric anisotropy, the viscosity and/or the alignment of the nematic phases.

Owing to their negative $\Delta\epsilon$, the compounds of the formula I are particularly suitable for use in VA-TFT displays.

The present invention therefore also relates to electro-optical liquid-crystal display elements containing a liquid-crystalline medium according to the invention.

The invention is explained in greater detail below with reference to working examples, but without being restricted thereby.

EXAMPLES

The starting substances can be obtained by generally accessible literature procedures or are commercially available. The reactions described are known from the literature.

Physical, physicochemical or electro-optical parameters are determined by generally known methods, as described, inter alia, in the brochure "Merck Liquid Crystals—Licristal®—Physical Properties of Liquid Crystals—Description of the Measurement Methods", 1998, Merck KGaA, Darmstadt.

Example A

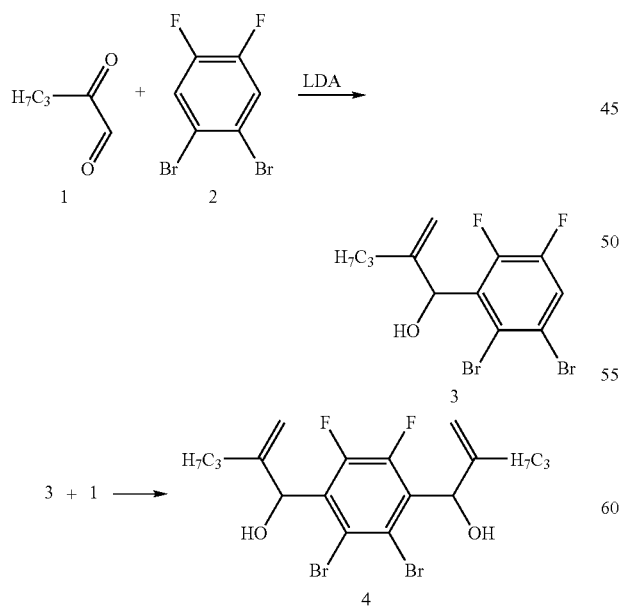

At −75° C., a solution of 13.5 g (50.0 mmol) of 1,2-dibromo-4,5-difluorobenzene 2 in 10 ml of THF is added to 27.0 ml of a solution, diluted with 100 ml, of 2N lithium diisopropylamide (LDA) in cyclohexane/ethylbenzene/THF (54.0 mmol). After 2 hours at the low temperature, 4.6 g (47.0 mmol) of the aldehyde 1 in 10 ml of THF are added. After 30 minutes, the cooling is removed, and 100 ml of 1N HCl are added to the batch at 20° C. Extraction of the aqueous phase, drying of the organic phase, evaporation and chromatography gives the allyl alcohol 3. Repetition of this reaction starting from 3 gives the bisallyl alcohol 4.

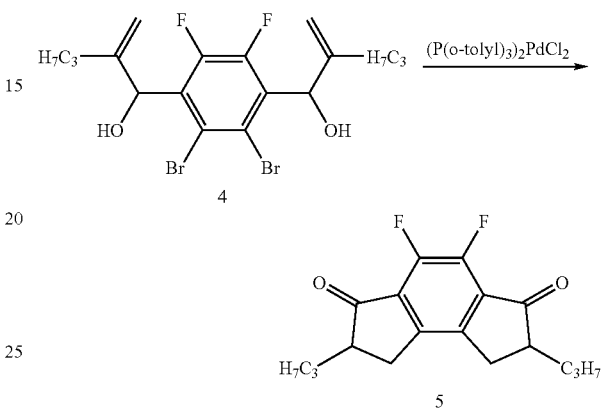

35.0 g (74.8 mmol) of the bisallyl alcohol 4, 5.5 g of bis(tri-o-tolylphosphine)palladium dichloride and 50 ml of triethylamine are dissolved in 390 ml of acetonitrile and warmed at 90° C. until the allyl alcohol has reacted completely. The cooled batch is introduced into water. Extraction, drying, evaporation and chromatography gives the diketone 5.

Example B

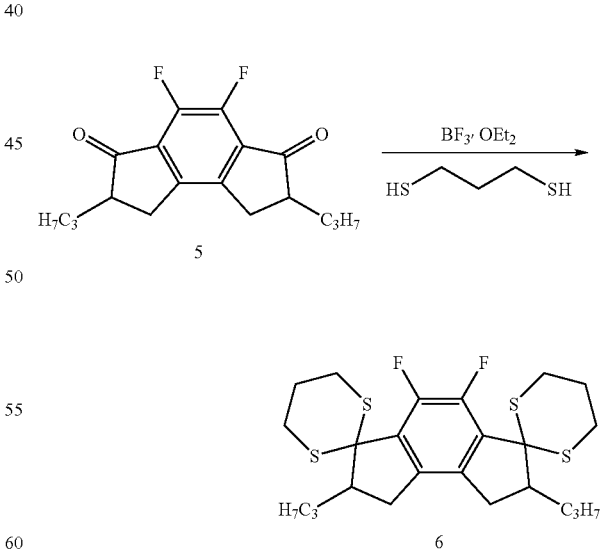

10.0 g (32.6 mmol) of the diketone 5 and 7.0 ml (69.9 mmol) of propane-dithiol are dissolved in 50 ml of dichloromethane, and 7.0 ml of boron trifluoride/diethyl ether complex are added at 6 to 7° C., and the mixture is subsequently stirred overnight at room temperature. The batch is added to 10 ml of saturated sodium hydrogencarbonate solution, and the mixture is stirred until the evolution of gas is complete. After extraction of the aqueous phase, drying of the organic phase, evaporation and filtration through silica gel, the residue obtained is employed in the next step without further purification.

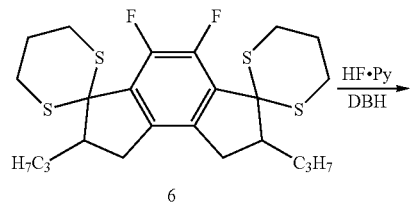

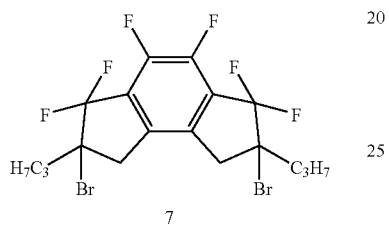

10.0 g of the crude thioketal 6, dissolved in 30 ml of dichloromethane, are slowly added at −75° C. to a mixture of 45.8 g (160 mmol) of 1,3-dibromo-5,5-dimethylhydantoin (DBH), 80 ml of a 65% solution of hydrogen fluoride in pyridine and 50 ml of dichloromethane. The batch is subsequently stirred overnight at room temperature. The reaction mixture is added to ice-cooled hydrogen sulfite solution and deacidified using saturated sodium hydrogencarbonate solution and sodium hydroxide solution. Extraction, drying, evaporation, re-washing with water, chromatography and crystallisation from hexane gives the as-indacene derivative 7.

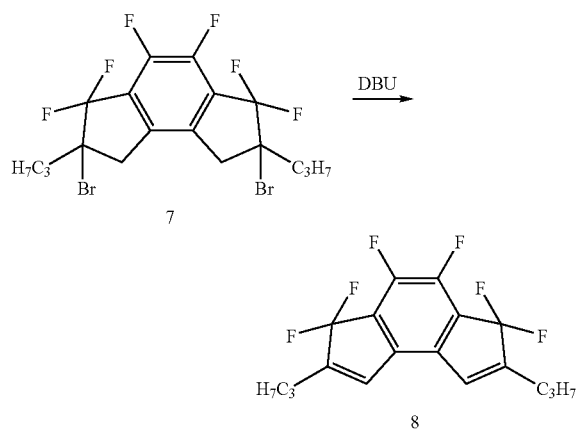

6.0 g (11.8 mmol) of the as-indacene derivative 7 are dissolved in 50 ml of dichloromethane, 4.5 ml (30.0 mmol) of 1,8-diazabicyclo[5.4.0]undec-7-ene (DBU) are added, and the mixture is stirred at room temperature until the starting material has reacted completely. The batch is washed with water and saturated sodium chloride solution, evaporated and chromatographed, and the as-indacene derivative 8 is isolated.

Example C

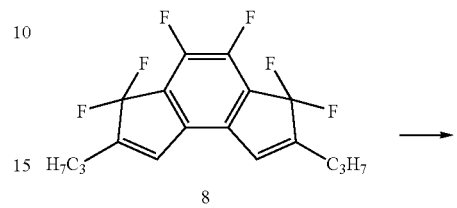

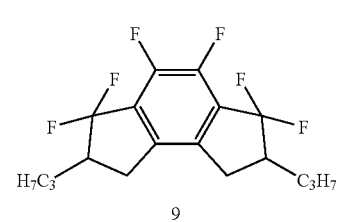

4.0 g (11.6 mmol) of the as-indacene derivative 8 are dissolved in 50 ml of THF and hydrogenated at room temperature and atmospheric pressure on a palladium catalyst. Evaporation, chromatography on silica gel and crystallisation gives the as-indacene derivative 9.

Example D

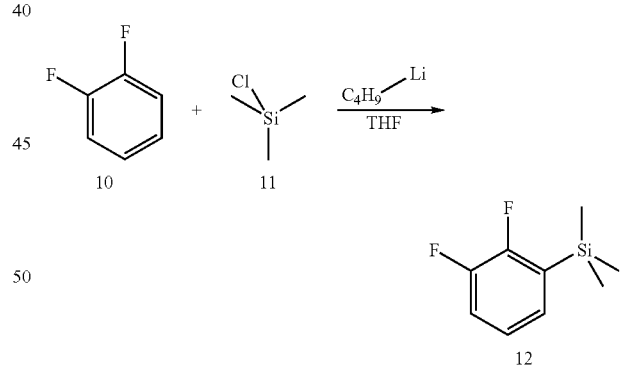

Under nitrogen, 116.5 g (1.00 mol) of 1,2-difluorobenzene (10) are dissolved in 600 ml of tetrahydrofuran, and 656 ml of a 15% solution of butyllithium in n-hexane (1.05 mol) are added at −70° C. After 1 h at this temperature, a solution of 132.6 ml (1.05 mol) of trimethylsilyl chloride (11) in 100 ml of tetrahydrofuran is slowly added to the reaction mixture. The batch thaws overnight and is added to 1.5 l of sat. ammonium chloride solution. The organic phase is dried over sodium sulfate and evaporated: the residue obtained is distilled at 8 mbar, giving 152 g (81%, b.p. 88° C.) of the silyl compound 12.

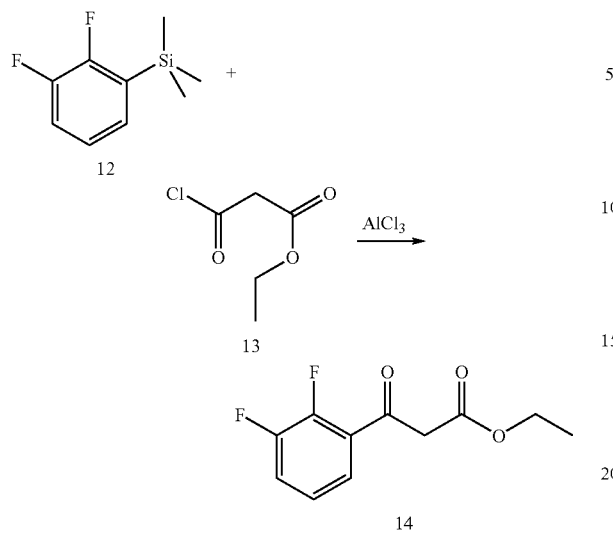

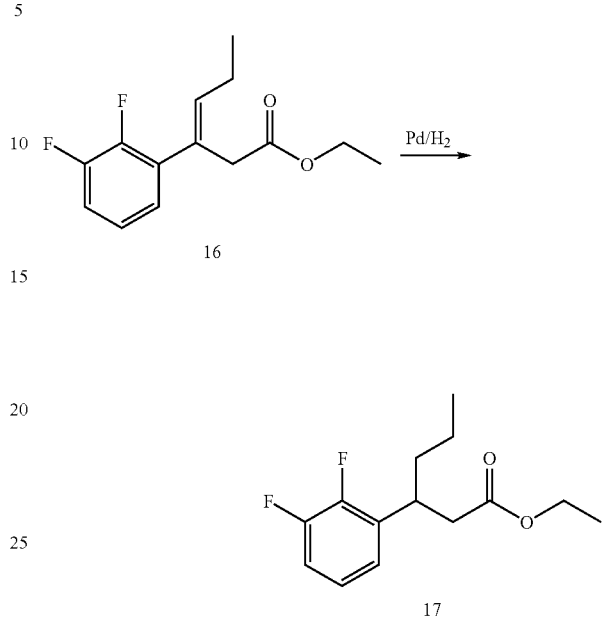

Under nitrogen, 37.6 g (250 mmol) of the acid chloride 13 are dissolved in 200 ml of cyclohexane. 46.6 g (250 mmol) of the silyl compound 12 are added to the solution at 0-2° C. 37.3 g (280 mmol) of aluminum chloride are subsequently added in portions to the reaction mixture, during which the temperature is held between −2° C. and 2° C. After 1 h at low temperature, the cooling is removed. The batch warms to room temperature and is transferred onto ice. The aqueous phase is extracted with methyl tert-butyl ether, and the organic phase is dried over sodium sulfate and evaporated. The residue is purified on silica gel, giving 31.4 g (55%) of the keto ester 14.

sulfate and evaporated. The residue is passed through silica gel (MTB ether/n-hexane 1:10), giving 29.4 g (88%) of the ester 16.

29.0 g (21.6 mmol) of the ester 16 are dissolved in 500 ml of tetrahydrofuran and hydrogenated on a palladium catalyst. The hydrogenation solution is evaporated, and the residue is chromatographed on silica gel, giving 27.8 g (95%) of substance 17.

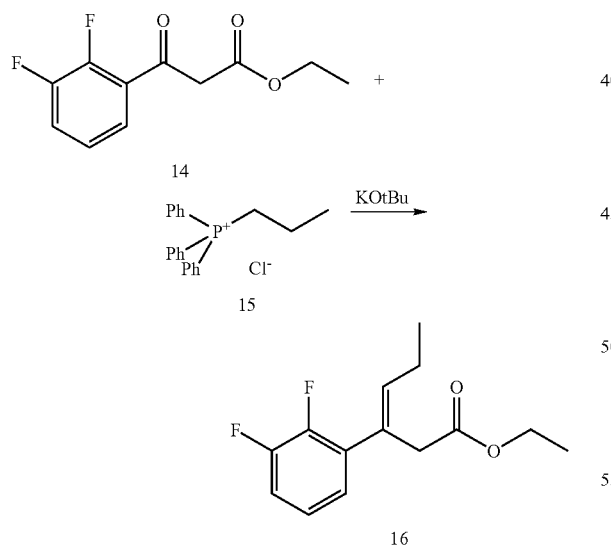

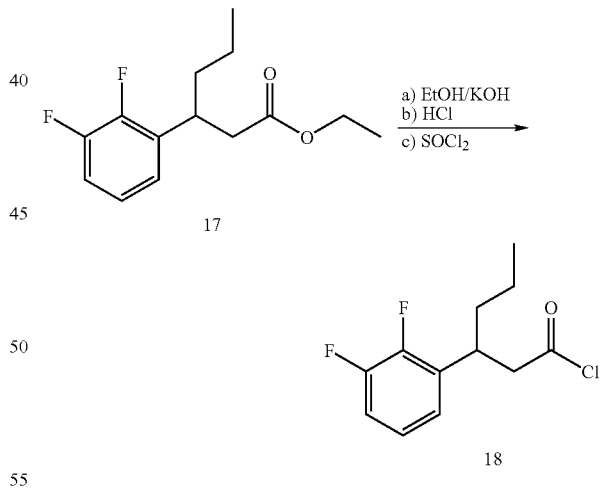

Under nitrogen, 51.1 g (150 mmol) of the Wittig salt 15 are suspended in 200 ml of THF, and a solution of 15.7 g (140 mmol) of potassium tertbutoxide in 75 ml of THF is added at 5-10° C. After one hour, the keto ester 14 dissolved in 75 ml of THF is added. The cooling is subsequently removed. After 20 h at room temp., water is added to the batch. The aqueous phase is extracted with MTB ether. The organic phase is washed with sat. sodium chloride solution, dried over sodium 27.0 g (105 mmol) of the ester 17 are refluxed for 5 h in ethanolic potassium hydroxide solution. The alcohol is subsequently distilled off, and the residue is taken up in water, acidified using hydrochloric acid and extracted with MTB ether. The organic phase is dried over sodium sulfate and evaporated. 50 ml of thionyl chloride and one drop of DMF are added to the residue obtained, and the mixture is refluxed until the evolution of gas is complete. Excess thionyl chloride is distilled off. The residue (25 g) is employed in the next step without further purification.

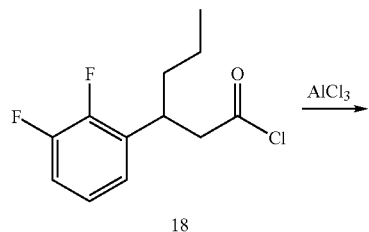

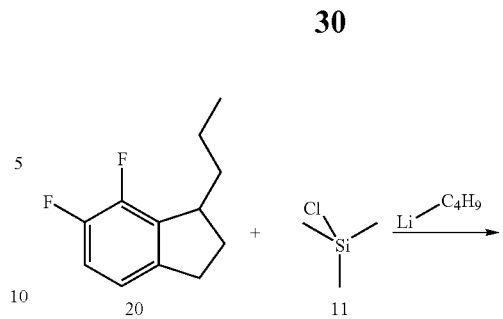

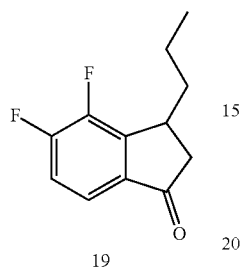

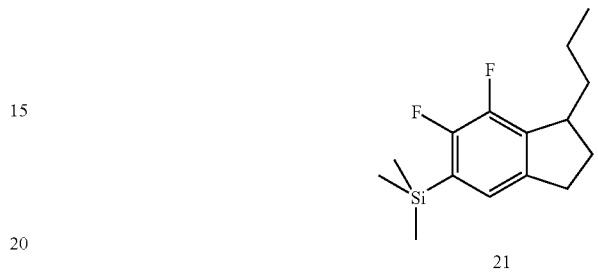

A solution of 25 g (about 105 mmol) of the crude acid chloride 18 in 120 ml of dichloromethane is added under nitrogen and at −20 to −15° C. to a suspension of 16.4 g (119 mmol) of aluminium chloride in 80 ml of dichloromethane. After 4.5 h, the reaction is terminated by addition of ice, and the mixture is acidified using hydrochloric acid. The aqueous phase is extracted with methylene chloride. The organic phase is dried over sodium sulfate and evaporated. The residue is chromatographed on silica gel (MTB/n-heptane 1:5), giving 18.5 g (84%) of the indanone 19.

The silylation of the indane 20 is carried out in accordance with the above procedure. The purification is carried out by chromatography on silica gel (n-pentane). 11.0 g (56.5 mmol) of the indane 20 give 12.6 g (84%) of the silyl compound 21.

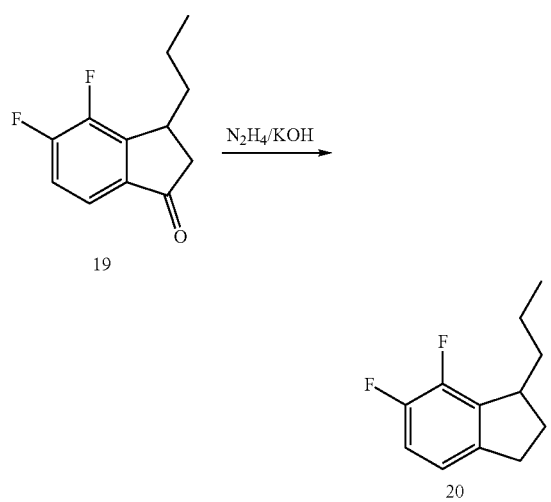

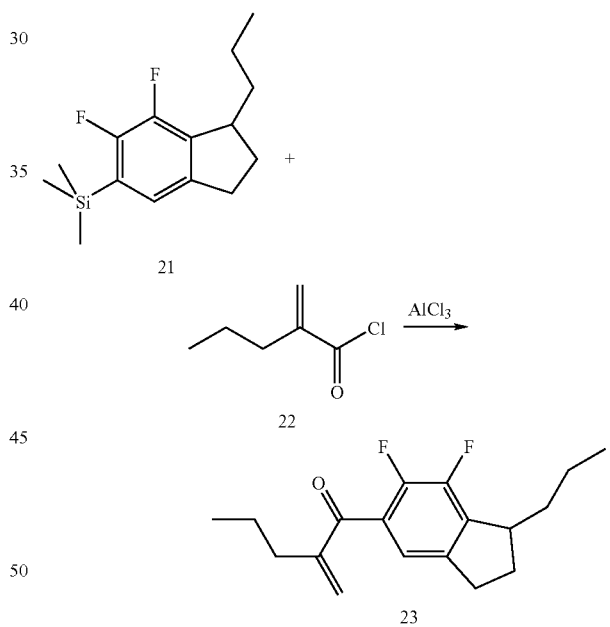

23.9 g (361 mmol) of potassium hydroxide are dissolved in 90 ml of diethylene glycol. 13.0 ml (268 mmol) of hydrazinium hydroxide and 18.0 g (85.6 mmol) of the indanone 19 are added to the solution, and the mixture is refluxed for 2 h. The temperature of the heating bath is subsequently raised to 200° C. and maintained until the evolution of gas is complete. The cooled reaction mixture is poured into water and acidified. The aqueous phase is extracted with n-pentane. The organic phase is dried over sodium sulfate and evaporated. The residue is purified by chromatography on silica gel (n-pentane), giving 11.4 g (68%) of the indane 20.

The acylation of the silyl compound 21 is carried out in accordance with the above procedure. 12.0 g (44.7 mmol) of 21 give 6.8 g (52%) of the ketone 23.

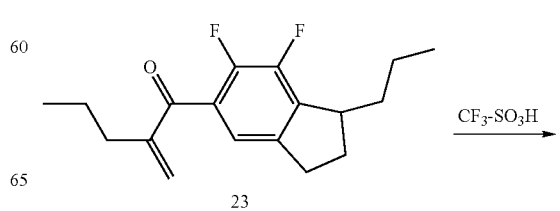

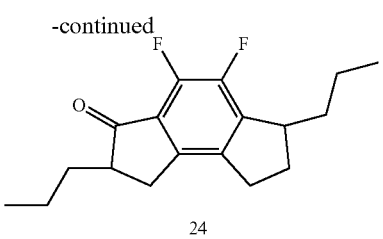

6.5 g (22.2 mmol) of the ketone 23 are introduced into 30 l of trifluoromethanesulfonic acid with ice cooling and stirring. After 24 h, the batch is transferred onto ice and extracted with MTB ether. The organic phase is washed with sat. sodium hydrogencarbonate solution, dried over sodium sulfate and evaporated. The residue is purified on silica gel (MTB ether/n-heptane 1:8), giving 2.6 g (40%) of the indacene 24.

The further derivatisation of 24 is carried out analogously to Examples B and C.

Example E

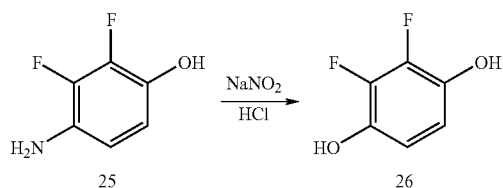

25.0 g (172 mmol) of the aromatic compound 1 are dissolved in 10 ml of semi-conc. hydrochloric acid, and 11.9 g (172 mmol) of sodium nitrite in 70 ml of water are added at a temperature of below 5° C. When the addition of nitrite is complete, the batch is diluted with 100 ml of water and heated to the boil. When the evolution of nitrogen has subsided (bubble counter), the batch is refluxed for a further hour. The cooled reaction solution is extracted with MTB ether. The organic phase is dried over sodium sulfate and evaporated, giving 13.7 g (54%) of the diol 26.

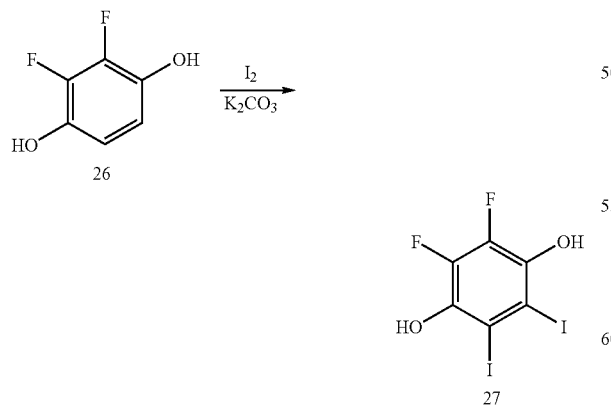

13.0 g (90.0 mmol) of the phenol 26 and 48 g (348 mmol) of potassium carbonate are dissolved in 160 ml of water, and 50 g (200 mmol) of iodine are added in portions at 5° C. The batch is stirred overnight. The reaction solution is decanted off from the resultant precipitate and acidified using hydrochloric acid. The aqueous phase is extracted with MTB ether, washed with sat. sodium chloride solution, dried over sodium sulfate and evaporated. The residue is passed through silica gel (MTB ether/heptane 2:1), giving 20.1 g (57%) of the diiodinated aromatic compound 27.

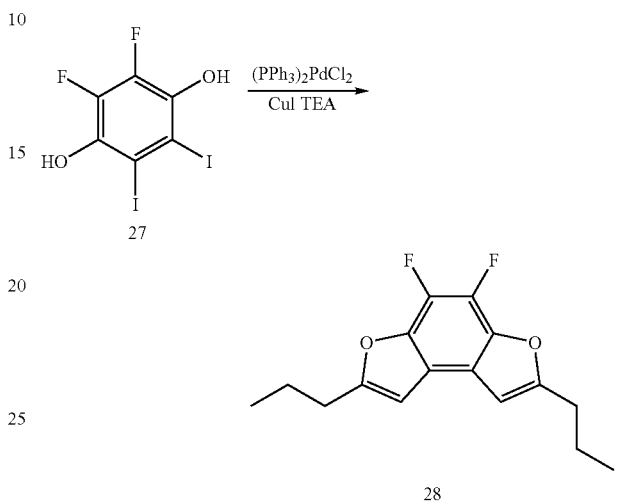

Under nitrogen, 20.0 g (50.3 mmol) of the phenol 27 are dissolved in 120 ml of dimethylformamide and 28 ml of triethylamine, and 1.0 g of bistriphenylphosphinepalladium (II) chloride and 580 mg of copper(I) iodide are added. A solution of 10.3 ml (105 mmol) of 1-pentyne in 30 ml of dimethylformamide is subsequently added slowly to the batch. The batch is stirred at room temp. until the conversion is complete (TLC). Water is added to the reaction mixture, which is extracted with MTB ether. The organic phase is dried over sodium sulfate and evaporated. Chromatography on silica gel gives 6.5 g (46%) of the benzodifuran 28.

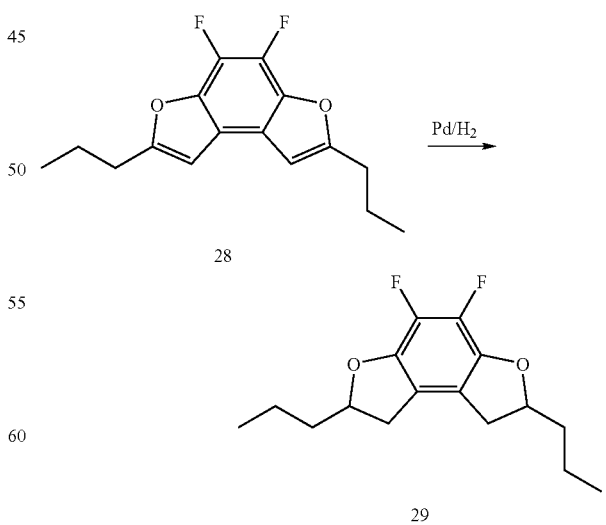

6.0 g (21.6 mmol) of the benzodifuran 28 are dissolved in 100 ml of tetrahydrofuran and hydrogenated on a palladium catalyst. The hydrogenation solution is evaporated, and the residue is chromatographed on silica gel, giving 5.5 g (90%) of substance 29.

The following compounds were prepared in accordance with or analogously to Examples A to E. "bond" here stands for a single bond:

Examples 1-259

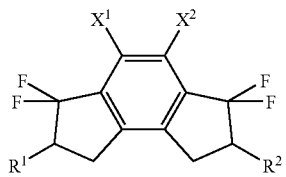

Examples 260-518

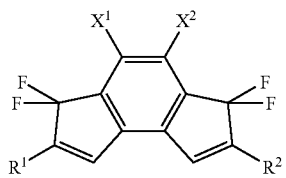

Examples 519-777

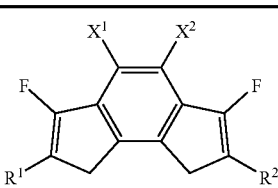

| Example No. | $X^1$ | $X^2$ | $R^1$ | $R^2$ |
|---|---|---|---|---|
| 1, 260, 519, | H | H | H | $CH_3$ |
| 2, 261, 520, | H | H | H | $C_2H_5$ |
| 3, 262, 521, | H | H | H | n-$C_3H_7$ |
| 4, 263, 522, | H | H | H | n-$C_4H_9$ |
| 5, 264, 523, | H | H | H | n-$C_5H_{11}$ |
| 6, 265, 524, | H | H | H | n-$C_6H_{13}$ |
| 7, 266, 525, | H | H | H | n-$C_7H_{15}$ |
| 8, 267, 526, | F | H | H | $CH_3$ |
| 9, 268, 527, | F | H | H | $C_2H_5$ |
| 10, 269, 528, | F | H | H | n-$C_3H_7$ |
| 11, 270, 529, | F | H | H | n-$C_4H_9$ |
| 12, 271, 530, | F | H | H | n-$C_5H_{11}$ |
| 13, 272, 531, | F | H | H | n-$C_6H_{13}$ |
| 14, 273, 532, | F | H | H | n-$C_7H_{15}$ |
| 15, 274, 533, | H | F | H | $CH_3$ |
| 16, 275, 534, | H | F | H | $C_2H_5$ |
| 17, 276, 535, | H | F | H | n-$C_3H_7$ |
| 18, 277, 536, | H | F | H | n-$C_4H_9$ |
| 19, 278, 537, | H | F | H | n-$C_5H_{11}$ |
| 20, 279, 538, | H | F | H | n-$C_6H_{13}$ |
| 21, 280, 539, | H | F | H | n-$C_7H_{15}$ |
| 22, 281, 540, | F | F | H | $CH_3$ |
| 23, 282, 541, | F | F | H | $C_2H_5$ |
| 24, 283, 542, | F | F | H | n-$C_3H_7$ |
| 25, 284, 543, | F | F | H | n-$C_4H_9$ |

-continued

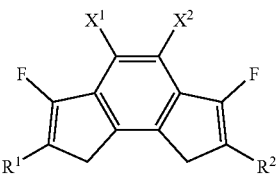

| Example No. | $X^1$ | $X^2$ | $R^1$ | $R^2$ |
|---|---|---|---|---|
| 26, 285, 544, | F | F | H | n-$C_5H_{11}$ |
| 27, 286, 545, | F | F | H | n-$C_6H_{13}$ |
| 28, 287, 546, | F | F | H | n-$C_7H_{15}$ |
| 29, 288, 547, | $CF_3$ | H | H | $CH_3$ |
| 30, 289, 548, | $CF_3$ | H | H | $C_2H_5$ |
| 31, 290, 549, | $CF_3$ | H | H | n-$C_3H_7$ |
| 32, 291, 550, | $CF_3$ | H | H | n-$C_4H_9$ |
| 33, 292, 551, | $CF_3$ | H | H | n-$C_5H_{11}$ |
| 34, 293, 552, | $CF_3$ | H | H | n-$C_6H_{13}$ |
| 35, 294, 553, | $CF_3$ | H | H | n-$C_7H_{15}$ |
| 36, 295, 554, | H | $CF_3$ | H | $CH_3$ |
| 37, 296, 555, | H | $CF_3$ | H | $C_2H_5$ |
| 38, 297, 556, | H | $CF_3$ | H | n-$C_3H_7$ |
| 39, 298, 557, | H | $CF_3$ | H | n-$C_4H_9$ |
| 40, 299, 558, | H | $CF_3$ | H | n-$C_5H_{11}$ |
| 41, 300, 559, | H | $CF_3$ | H | n-$C_6H_{13}$ |
| 42, 301, 560, | H | $CF_3$ | H | n-$C_7H_{15}$ |
| 43, 302, 561, | —$OCF_3$ | H | H | $CH_3$ |
| 44, 303, 562, | —$OCF_3$ | H | H | $C_2H_5$ |
| 45, 304, 563, | —$OCF_3$ | H | H | n-$C_3H_7$ |
| 46, 305, 564, | —$OCF_3$ | H | H | n-$C_4H_9$ |
| 47, 306, 565, | —$OCF_3$ | H | H | n-$C_5H_{11}$ |
| 48, 307, 566, | —$OCF_3$ | H | H | n-$C_6H_{13}$ |
| 49, 308, 567, | —$OCF_3$ | H | H | n-$C_7H_{15}$ |
| 50, 309, 568, | H | —$OCF_3$ | H | $CH_3$ |
| 51, 310, 569, | H | —$OCF_3$ | H | $C_2H_5$ |
| 52, 311, 570, | H | —$OCF_3$ | H | n-$C_3H_7$ |
| 53, 312, 571, | H | —$OCF_3$ | H | n-$C_4H_9$ |
| 54, 313, 572, | H | —$OCF_3$ | H | n-$C_5H_{11}$ |
| 55, 314, 573, | H | —$OCF_3$ | H | n-$C_6H_{13}$ |
| 56, 315, 574, | H | —$OCF_3$ | H | n-$C_7H_{15}$ |
| 57, 316, 575, | H | H | $CH_3$ | $CH_3$ |
| 58, 317, 576, | H | H | $CH_3$ | $C_2H_5$ |
| 59, 318, 577, | H | H | $CH_3$ | n-$C_3H_7$ |
| 60, 319, 578, | H | H | $CH_3$ | n-$C_4H_9$ |
| 61, 320, 579, | H | H | $CH_3$ | n-$C_5H_{11}$ |
| 62, 321, 580, | H | H | $CH_3$ | n-$C_6H_{13}$ |
| 63, 322, 581, | H | H | $CH_3$ | n-$C_7H_{15}$ |
| 64, 323, 582, | F | H | $CH_3$ | $CH_3$ |
| 65, 324, 583, | F | H | $CH_3$ | $C_2H_5$ |
| 66, 325, 584, | F | H | $CH_3$ | n-$C_3H_7$ |
| 67, 326, 585, | F | H | $CH_3$ | n-$C_4H_9$ |
| 68, 327, 586, | F | H | $CH_3$ | n-$C_5H_{11}$ |
| 69, 328, 587, | F | H | $CH_3$ | n-$C_6H_{13}$ |
| 70, 329, 588, | F | H | $CH_3$ | n-$C_7H_{15}$ |
| 71, 330, 589, | F | F | $CH_3$ | $CH_3$ |
| 72, 331, 590, | F | F | $CH_3$ | $C_2H_5$ |
| 73, 332, 591, | F | F | $CH_3$ | n-$C_3H_7$ |
| 74, 333, 592, | F | F | $CH_3$ | n-$C_4H_9$ |
| 75, 334, 593, | F | F | $CH_3$ | n-$C_5H_{11}$ |
| 76, 335, 594, | F | F | $CH_3$ | n-$C_6H_{13}$ |
| 77, 336, 595, | F | F | $CH_3$ | n-$C_7H_{15}$ |
| 78, 337, 596, | $CF_3$ | H | $CH_3$ | $CH_3$ |
| 79, 338, 597, | $CF_3$ | H | $CH_3$ | $C_2H_5$ |
| 80, 339, 598, | $CF_3$ | H | $CH_3$ | n-$C_3H_7$ |
| 81, 340, 599, | $CF_3$ | H | $CH_3$ | n-$C_4H_9$ |
| 82, 341, 600, | $CF_3$ | H | $CH_3$ | n-$C_5H_{11}$ |
| 83, 342, 601, | $CF_3$ | H | $CH_3$ | n-$C_6H_{13}$ |
| 84, 343, 602, | $CF_3$ | H | $CH_3$ | n-$C_7H_{15}$ |
| 85, 344, 603, | —$OCF_3$ | H | $CH_3$ | $CH_3$ |
| 86, 345, 604, | —$OCF_3$ | H | $CH_3$ | $C_2H_5$ |
| 87, 346, 605, | —$OCF_3$ | H | $CH_3$ | n-$C_3H_7$ |
| 88, 347, 606, | —$OCF_3$ | H | $CH_3$ | n-$C_4H_9$ |
| 89, 348, 607, | —$OCF_3$ | H | $CH_3$ | n-$C_5H_{11}$ |
| 90, 349, 608, | —$OCF_3$ | H | $CH_3$ | n-$C_6H_{13}$ |
| 91, 350, 609, | —$OCF_3$ | H | $CH_3$ | n-$C_7H_{15}$ |
| 92, 351, 610, | H | H | $C_2H_5$ | $C_2H_5$ |
| 93, 352, 611, | H | H | $C_2H_5$ | n-$C_3H_7$ |

| Example No. | $X^1$ | $X^2$ | $R^1$ | $R^2$ |
|---|---|---|---|---|
| 94, 353, 612, | H | H | $C_2H_5$ | $n-C_4H_9$ |
| 95, 354, 613, | H | H | $C_2H_5$ | $n-C_5H_{11}$ |
| 96, 355, 614, | H | H | $C_2H_5$ | $n-C_6H_{13}$ |
| 97, 356, 615, | H | H | $C_2H_5$ | $n-C_7H_{15}$ |
| 98, 357, 616, | F | H | $C_2H_5$ | $CH_3$ |
| 99, 358, 617, | F | H | $C_2H_5$ | $C_2H_5$ |
| 100, 359, 618, | F | H | $C_2H_5$ | $n-C_3H_7$ |
| 101, 360, 619, | F | H | $C_2H_5$ | $n-C_4H_9$ |
| 102, 361, 620, | F | H | $C_2H_5$ | $n-C_5H_{11}$ |
| 103, 362, 621, | F | H | $C_2H_5$ | $n-C_6H_{13}$ |
| 104, 363, 622, | F | H | $C_2H_5$ | $n-C_7H_{15}$ |
| 105, 364, 623, | F | F | $C_2H_5$ | $C_2H_5$ |
| 106, 365, 624, | F | F | $C_2H_5$ | $n-C_3H_7$ |
| 107, 366, 625, | F | F | $C_2H_5$ | $n-C_4H_9$ |
| 108, 367, 626, | F | F | $C_2H_5$ | $n-C_5H_{11}$ |
| 109, 368, 627, | F | F | $C_2H_5$ | $n-C_6H_{13}$ |
| 110, 369, 628, | F | F | $C_2H_5$ | $n-C_7H_{15}$ |
| 111, 370, 629, | $CF_3$ | H | $C_2H_5$ | $CH_3$ |
| 112, 371, 630, | $CF_3$ | H | $C_2H_5$ | $C_2H_5$ |
| 113, 372, 631, | $CF_3$ | H | $C_2H_5$ | $n-C_3H_7$ |
| 114, 373, 632, | $CF_3$ | H | $C_2H_5$ | $n-C_4H_9$ |
| 115, 374, 633, | $CF_3$ | H | $C_2H_5$ | $n-C_5H_{11}$ |
| 116, 375, 634, | $CF_3$ | H | $C_2H_5$ | $n-C_6H_{13}$ |
| 117, 376, 635, | $CF_3$ | H | $C_2H_5$ | $n-C_7H_{15}$ |
| 118, 377, 636, | —$OCF_3$ | H | $C_2H_5$ | $CH_3$ |
| 119, 378, 637, | —$OCF_3$ | H | $C_2H_5$ | $C_2H_5$ |
| 120, 379, 638, | —$OCF_3$ | H | $C_2H_5$ | $n-C_3H_7$ |
| 121, 380, 639, | —$OCF_3$ | H | $C_2H_5$ | $n-C_4H_9$ |
| 122, 381, 640, | —$OCF_3$ | H | $C_2H_5$ | $n-C_5H_{11}$ |
| 123, 382, 641, | —$OCF_3$ | H | $C_2H_5$ | $n-C_6H_{13}$ |
| 124, 383, 642, | —$OCF_3$ | H | $C_2H_5$ | $n-C_7H_{15}$ |
| 125, 384, 643, | H | H | $n-C_3H_7$ | $n-C_3H_7$ |
| 126, 385, 644, | H | H | $n-C_3H_7$ | $n-C_4H_9$ |
| 127, 386, 645, | H | H | $n-C_3H_7$ | $n-C_5H_{11}$ |
| 128, 387, 646, | H | H | $n-C_3H_7$ | $n-C_6H_{13}$ |
| 129, 388, 647, | H | H | $n-C_3H_7$ | $n-C_7H_{15}$ |
| 130, 389, 648, | F | H | $n-C_3H_7$ | $CH_3$ |
| 131, 390, 649, | F | H | $n-C_3H_7$ | $C_2H_5$ |
| 132, 391, 650, | F | H | $n-C_3H_7$ | $n-C_3H_7$ |
| 133, 392, 651, | F | H | $n-C_3H_7$ | $n-C_4H_9$ |
| 134, 393, 652, | F | H | $n-C_3H_7$ | $n-C_5H_{11}$ |
| 135, 394, 653, | F | H | $n-C_3H_7$ | $n-C_6H_{13}$ |
| 136, 395, 654, | F | H | $n-C_3H_7$ | $n-C_7H_{15}$ |
| 137, 396, 655, | F | F | $n-C_3H_7$ | $n-C_3H_7$ |
| 138, 397, 656, | F | F | $n-C_3H_7$ | $n-C_4H_9$ |
| 139, 398, 657, | F | F | $n-C_3H_7$ | $n-C_5H_{11}$ |
| 140, 399, 658, | F | F | $n-C_3H_7$ | $n-C_6H_{13}$ |
| 141, 400, 659, | F | F | $n-C_3H_7$ | $n-C_7H_{15}$ |
| 142, 401, 660, | $CF_3$ | H | $n-C_3H_7$ | $CH_3$ |
| 143, 402, 661, | $CF_3$ | H | $n-C_3H_7$ | $C_2H_5$ |
| 144, 403, 662, | $CF_3$ | H | $n-C_3H_7$ | $n-C_3H_7$ |
| 145, 404, 663, | $CF_3$ | H | $n-C_3H_7$ | $n-C_4H_9$ |
| 146, 405, 664, | $CF_3$ | H | $n-C_3H_7$ | $n-C_5H_{11}$ |
| 147, 406, 665, | $CF_3$ | H | $n-C_3H_7$ | $n-C_6H_{13}$ |
| 148, 407, 666, | $CF_3$ | H | $n-C_3H_7$ | $n-C_7H_{15}$ |
| 149, 408, 667, | —$OCF_3$ | H | $n-C_3H_7$ | $CH_3$ |
| 150, 409, 668, | —$OCF_3$ | H | $n-C_3H_7$ | $C_2H_5$ |
| 151, 410, 669, | —$OCF_3$ | H | $n-C_3H_7$ | $n-C_3H_7$ |
| 152, 411, 670, | —$OCF_3$ | H | $n-C_3H_7$ | $n-C_4H_9$ |
| 153, 412, 671, | —$OCF_3$ | H | $n-C_3H_7$ | $n-C_5H_{11}$ |
| 154, 413, 672, | —$OCF_3$ | H | $n-C_3H_7$ | $n-C_6H_{13}$ |
| 155, 414, 673, | —$OCF_3$ | H | $n-C_3H_7$ | $n-C_7H_{15}$ |
| 156, 415, 674, | H | H | $n-C_4H_9$ | $n-C_4H_9$ |
| 157, 416, 675, | H | H | $n-C_4H_9$ | $n-C_5H_{11}$ |
| 158, 417, 676, | H | H | $n-C_4H_9$ | $n-C_6H_{13}$ |
| 159, 418, 677, | H | H | $n-C_4H_9$ | $n-C_7H_{15}$ |
| 160, 419, 678, | F | H | $n-C_4H_9$ | $CH_3$ |
| 161, 420, 679, | F | H | $n-C_4H_9$ | $C_2H_5$ |
| 162, 421, 680, | F | H | $n-C_4H_9$ | $n-C_3H_7$ |
| 163, 422, 681, | F | H | $n-C_4H_9$ | $n-C_4H_9$ |
| 164, 423, 682, | F | H | $n-C_4H_9$ | $n-C_5H_{11}$ |
| 165, 424, 683, | F | H | $n-C_4H_9$ | $n-C_6H_{13}$ |
| 166, 425, 684, | F | H | $n-C_4H_9$ | $n-C_7H_{15}$ |
| 167, 426, 685, | F | F | $n-C_4H_9$ | $n-C_4H_9$ |
| 168, 427, 686, | F | F | $n-C_4H_9$ | $n-C_5H_{11}$ |
| 169, 428, 687, | F | F | $n-C_4H_9$ | $n-C_6H_{13}$ |
| 170, 429, 688, | F | F | $n-C_4H_9$ | $n-C_7H_{15}$ |
| 171, 430, 689, | $CF_3$ | H | $n-C_4H_9$ | $CH_3$ |
| 172, 431, 690, | $CF_3$ | H | $n-C_4H_9$ | $C_2H_5$ |
| 173, 432, 691, | $CF_3$ | H | $n-C_4H_9$ | $n-C_3H_7$ |
| 174, 433, 692, | $CF_3$ | H | $n-C_4H_9$ | $n-C_4H_9$ |
| 175, 434, 693, | $CF_3$ | H | $n-C_4H_9$ | $n-C_5H_{11}$ |
| 176, 435, 694, | $CF_3$ | H | $n-C_4H_9$ | $n-C_6H_{13}$ |
| 177, 436, 695, | $CF_3$ | H | $n-C_4H_9$ | $n-C_7H_{15}$ |
| 178, 437, 696, | —$OCF_3$ | H | $n-C_4H_9$ | $CH_3$ |
| 179, 438, 697, | —$OCF_3$ | H | $n-C_4H_9$ | $C_2H_5$ |
| 180, 439, 698, | —$OCF_3$ | H | $n-C_4H_9$ | $n-C_3H_7$ |
| 181, 440, 699, | —$OCF_3$ | H | $n-C_4H_9$ | $n-C_4H_9$ |
| 182, 441, 700, | —$OCF_3$ | H | $n-C_4H_9$ | $n-C_5H_{11}$ |
| 183, 442, 701, | —$OCF_3$ | H | $n-C_4H_9$ | $n-C_6H_{13}$ |
| 184, 443, 702, | —$OCF_3$ | H | $n-C_4H_9$ | $n-C_7H_{15}$ |
| 185, 444, 703, | H | H | $n-C_5H_{11}$ | $n-C_5H_{11}$ |
| 186, 445, 704, | H | H | $n-C_5H_{11}$ | $n-C_6H_{13}$ |
| 187, 446, 705, | H | H | $n-C_5H_{11}$ | $n-C_7H_{15}$ |
| 188, 447, 706, | F | H | $n-C_5H_{11}$ | $CH_3$ |
| 189, 448, 707, | F | H | $n-C_5H_{11}$ | $C_2H_5$ |
| 190, 449, 708, | F | H | $n-C_5H_{11}$ | $n-C_3H_7$ |
| 191, 450, 709, | F | H | $n-C_5H_{11}$ | $n-C_4H_9$ |
| 192, 451, 710, | F | H | $n-C_5H_{11}$ | $n-C_5H_{11}$ |
| 193, 452, 711, | F | H | $n-C_5H_{11}$ | $n-C_6H_{13}$ |
| 194, 453, 712, | F | H | $n-C_5H_{11}$ | $n-C_7H_{15}$ |
| 195, 454, 713, | F | F | $n-C_5H_{11}$ | $n-C_5H_{11}$ |
| 196, 455, 714, | F | F | $n-C_5H_{11}$ | $n-C_6H_{13}$ |
| 197, 456, 715, | F | F | $n-C_5H_{11}$ | $n-C_7H_{15}$ |
| 198, 457, 716, | $CF_3$ | H | $n-C_5H_{11}$ | $CH_3$ |
| 199, 458, 717, | $CF_3$ | H | $n-C_5H_{11}$ | $C_2H_5$ |
| 200, 459, 718, | $CF_3$ | H | $n-C_5H_{11}$ | $n-C_3H_7$ |
| 201, 460, 719, | $CF_3$ | H | $n-C_5H_{11}$ | $n-C_4H_9$ |
| 202, 461, 720, | $CF_3$ | H | $n-C_5H_{11}$ | $n-C_5H_{11}$ |
| 203, 462, 721, | $CF_3$ | H | $n-C_5H_{11}$ | $n-C_6H_{13}$ |
| 204, 463, 722, | $CF_3$ | H | $n-C_5H_{11}$ | $n-C_7H_{15}$ |
| 205, 464, 723, | —$OCF_3$ | H | $n-C_5H_{11}$ | $CH_3$ |
| 206, 465, 724, | —$OCF_3$ | H | $n-C_5H_{11}$ | $C_2H_5$ |
| 207, 466, 725, | —$OCF_3$ | H | $n-C_5H_{11}$ | $n-C_3H_7$ |
| 208, 467, 726, | —$OCF_3$ | H | $n-C_5H_{11}$ | $n-C_4H_9$ |
| 209, 468, 727, | —$OCF_3$ | H | $n-C_5H_{11}$ | $n-C_5H_{11}$ |
| 210, 469, 728, | —$OCF_3$ | H | $n-C_5H_{11}$ | $n-C_6H_{13}$ |
| 211, 470, 729, | —$OCF_3$ | H | $n-C_5H_{11}$ | $n-C_7H_{15}$ |
| 212, 471, 730, | H | H | $n-C_6H_{13}$ | $n-C_6H_{13}$ |
| 213, 472, 731, | H | H | $n-C_6H_{13}$ | $n-C_7H_{15}$ |
| 214, 473, 732, | F | H | $n-C_6H_{13}$ | $CH_3$ |
| 215, 474, 733, | F | H | $n-C_6H_{13}$ | $C_2H_5$ |
| 216, 475, 734, | F | H | $n-C_6H_{13}$ | $n-C_3H_7$ |
| 217, 476, 735, | F | H | $n-C_6H_{13}$ | $n-C_4H_9$ |
| 218, 477, 736, | F | H | $n-C_6H_{13}$ | $n-C_5H_{11}$ |
| 219, 478, 737, | F | H | $n-C_6H_{13}$ | $n-C_6H_{13}$ |
| 220, 479, 738, | F | H | $n-C_6H_{13}$ | $n-C_7H_{15}$ |
| 221, 480, 739, | F | F | $n-C_6H_{13}$ | $n-C_6H_{13}$ |
| 222, 481, 740, | F | F | $n-C_6H_{13}$ | $n-C_7H_{15}$ |
| 223, 482, 741, | $CF_3$ | H | $n-C_6H_{13}$ | $CH_3$ |
| 224, 483, 742, | $CF_3$ | H | $n-C_6H_{13}$ | $C_2H_5$ |
| 225, 484, 743, | $CF_3$ | H | $n-C_6H_{13}$ | $n-C_3H_7$ |
| 226, 485, 744, | $CF_3$ | H | $n-C_6H_{13}$ | $n-C_4H_9$ |
| 227, 486, 745, | $CF_3$ | H | $n-C_6H_{13}$ | $n-C_5H_{11}$ |
| 228, 487, 746, | $CF_3$ | H | $n-C_6H_{13}$ | $n-C_6H_{13}$ |
| 229, 488, 747, | $CF_3$ | H | $n-C_6H_{13}$ | $n-C_7H_{15}$ |

-continued

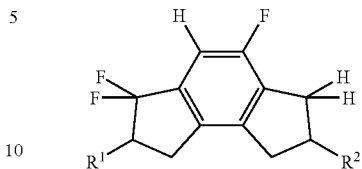

| Example No. | X¹ | X² | R¹ | R² |
|---|---|---|---|---|
| 230, 489, 748, | —OCF₃ | H | n-C₆H₁₃ | CH₃ |
| 231, 490, 749, | —OCF₃ | H | n-C₆H₁₃ | C₂H₅ |
| 232, 491, 750, | —OCF₃ | H | n-C₆H₁₃ | n-C₃H₇ |
| 233, 492, 751, | —OCF₃ | H | n-C₆H₁₃ | n-C₄H₉ |
| 234, 493, 752, | —OCF₃ | H | n-C₆H₁₃ | n-C₅H₁₁ |
| 235, 494, 753, | —OCF₃ | H | n-C₆H₁₃ | n-C₆H₁₃ |
| 236, 495, 754, | —OCF₃ | H | n-C₆H₁₃ | n-C₇H₁₅ |
| 237, 496, 755, | H | H | n-C₇H₁₅ | n-C₇H₁₅ |
| 238, 497, 756, | F | H | n-C₇H₁₅ | CH₃ |
| 239, 498, 757, | F | H | n-C₇H₁₅ | C₂H₅ |
| 240, 499, 758, | F | H | n-C₇H₁₅ | n-C₃H₇ |
| 241, 500, 759, | F | H | n-C₇H₁₅ | n-C₄H₉ |
| 242, 501, 760, | F | H | n-C₇H₁₅ | n-C₅H₁₁ |
| 243, 502, 761, | F | H | n-C₇H₁₅ | n-C₆H₁₃ |
| 244, 503, 762, | F | H | n-C₇H₁₅ | n-C₇H₁₅ |
| 245, 504, 763, | F | F | n-C₇H₁₅ | n-C₇H₁₅ |
| 246, 505, 764, | CF₃ | H | n-C₇H₁₅ | CH₃ |
| 247, 506, 765, | CF₃ | H | n-C₇H₁₅ | C₂H₅ |
| 248, 507, 766, | CF₃ | H | n-C₇H₁₅ | n-C₃H₇ |
| 249, 508, 767, | CF₃ | H | n-C₇H₁₅ | n-C₄H₉ |
| 250, 509, 768, | CF₃ | H | n-C₇H₁₅ | n-C₅H₁₁ |
| 251, 510, 769, | CF₃ | H | n-C₇H₁₅ | n-C₆H₁₃ |
| 252, 511, 770, | CF₃ | H | n-C₇H₁₅ | n-C₇H₁₅ |
| 253, 512, 771, | —OCF₃ | H | n-C₇H₁₅ | CH₃ |
| 254, 513, 772, | —OCF₃ | H | n-C₇H₁₅ | C₂H₅ |
| 255, 514, 773, | —OCF₃ | H | n-C₇H₁₅ | n-C₃H₇ |
| 256, 515, 774, | —OCF₃ | H | n-C₇H₁₅ | n-C₄H₉ |
| 257, 516, 775, | —OCF₃ | H | n-C₇H₁₅ | n-C₅H₁₁ |
| 258, 517, 776, | —OCF₃ | H | n-C₇H₁₅ | n-C₆H₁₃ |
| 259, 518, 777, | —OCF₃ | H | n-C₇H₁₅ | n-C₇H₁₅ |

Examples 778-840

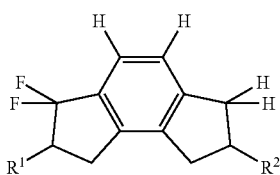

Examples 841-903

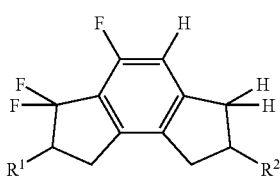

Examples 904-966

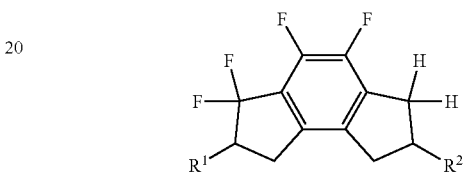

Examples 967-1029

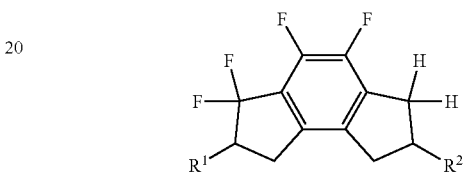

| Example No. | R¹ | R² |
|---|---|---|
| 778, 841, 904, 967, | H | CH₃ |
| 779, 842, 905, 968, | H | C₂H₅ |
| 780, 843, 906, 969, | H | n-C₃H₇ |
| 781, 844, 907, 970, | H | n-C₄H₉ |
| 782, 845, 908, 971, | H | n-C₅H₁₁ |
| 783, 846, 909, 972, | H | n-C₆H₁₃ |
| 784, 847, 910, 973, | H | n-C₇H₁₅ |
| 785, 848, 911, 974, | CH₃ | H |
| 786, 849, 912, 975, | CH₃ | CH₃ |
| 787, 850, 913, 976, | CH₃ | C₂H₅ |
| 788, 851, 914, 977, | CH₃ | n-C₃H₇ |
| 789, 852, 915, 978, | CH₃ | n-C₄H₉ |
| 790, 853, 916, 979, | CH₃ | n-C₅H₁₁ |
| 791, 854, 917, 980, | CH₃ | n-C₆H₁₃ |
| 792, 855, 918, 981, | CH₃ | n-C₇H₁₅ |
| 793, 856, 919, 982, | C₂H₅ | H |
| 794, 857, 920, 983, | C₂H₅ | CH₃ |
| 795, 858, 921, 984, | C₂H₅ | C₂H₅ |
| 796, 859, 922, 985, | C₂H₅ | n-C₃H₇ |
| 797, 860, 923, 986, | C₂H₅ | n-C₄H₉ |
| 798, 861, 924, 987, | C₂H₅ | n-C₅H₁₁ |
| 799, 862, 925, 988, | C₂H₅ | n-C₆H₁₃ |
| 800, 863, 926, 989, | C₂H₅ | n-C₇H₁₅ |
| 801, 864, 927, 990, | n-C₃H₇ | H |
| 802, 865, 928, 991, | n-C₃H₇ | CH₃ |
| 803, 866, 929, 992, | n-C₃H₇ | C₂H₅ |
| 804, 867, 930, 993, | n-C₃H₇ | n-C₃H₇ |
| 805, 868, 931, 994, | n-C₃H₇ | n-C₄H₉ |
| 806, 869, 932, 995, | n-C₃H₇ | n-C₅H₁₁ |
| 807, 870, 933, 996, | n-C₃H₇ | n-C₆H₁₃ |
| 808, 871, 934, 997, | n-C₃H₇ | n-C₇H₁₅ |
| 809, 872, 935, 998, | n-C₄H₉ | H |
| 810, 873, 936, 999, | n-C₄H₉ | CH₃ |
| 811, 874, 937, 1000, | n-C₄H₉ | C₂H₅ |
| 812, 875, 938, 1001, | n-C₄H₉ | n-C₃H₇ |
| 813, 876, 939, 1002, | n-C₄H₉ | n-C₄H₉ |
| 814, 877, 940, 1003, | n-C₄H₉ | n-C₅H₁₁ |
| 815, 878, 941, 1004, | n-C₄H₉ | n-C₆H₁₃ |
| 816, 879, 942, 1005, | n-C₄H₉ | n-C₇H₁₅ |
| 817, 880, 943, 1006, | n-C₅H₁₁ | H |
| 818, 881, 944, 1007, | n-C₅H₁₁ | CH₃ |
| 819, 882, 945, 1008, | n-C₅H₁₁ | C₂H₅ |
| 820, 883, 946, 1009, | n-C₅H₁₁ | n-C₃H₇ |
| 821, 884, 947, 1010, | n-C₅H₁₁ | n-C₄H₉ |
| 822, 885, 948, 1011, | n-C₅H₁₁ | n-C₅H₁₁ |
| 823, 886, 949, 1012, | n-C₅H₁₁ | n-C₆H₁₃ |
| 824, 887, 950, 1013, | n-C₅H₁₁ | n-C₇H₁₅ |
| 825, 888, 951, 1014, | n-C₆H₁₃ | H |
| 826, 889, 952, 1015, | n-C₆H₁₃ | CH₃ |

-continued

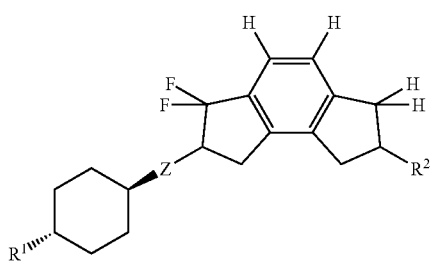

| Example No. | R¹ | R² |
|---|---|---|
| 827, 890, 953, 1016, | n-$C_6H_{13}$ | $C_2H_5$ |
| 828, 891, 954, 1017, | n-$C_6H_{13}$ | n-$C_3H_7$ |
| 829, 892, 955, 1018, | n-$C_6H_{13}$ | n-$C_4H_9$ |
| 830, 893, 956, 1019, | n-$C_6H_{13}$ | n-$C_5H_{11}$ |
| 831, 894, 957, 1020, | n-$C_6H_{13}$ | n-$C_6H_{13}$ |
| 832, 895, 958, 1021, | n-$C_6H_{13}$ | n-$C_7H_{15}$ |
| 833, 896, 959, 1022, | n-$C_7H_{15}$ | H |
| 834, 897, 960, 1023, | n-$C_7H_{15}$ | $CH_3$ |
| 835, 898, 961, 1024, | n-$C_7H_{15}$ | $C_2H_5$ |
| 836, 899, 962, 1025, | n-$C_7H_{15}$ | n-$C_3H_7$ |
| 837, 900, 963, 1026, | n-$C_7H_{15}$ | n-$C_4H_9$ |
| 838, 901, 964, 1027, | n-$C_7H_{15}$ | n-$C_5H_{11}$ |
| 839, 902, 965, 1028, | n-$C_7H_{15}$ | n-$C_6H_{13}$ |
| 840, 903, 966, 1029, | n-$C_7H_{15}$ | n-$C_7H_{15}$ |

Examples 1030-1142

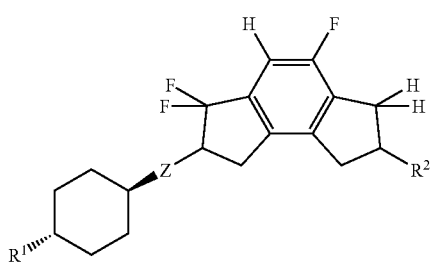

Examples 1143-1255

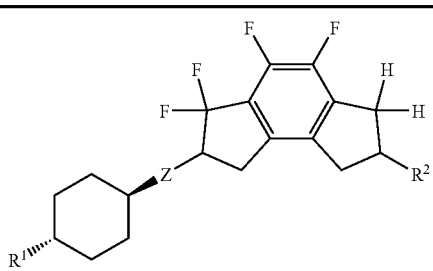

Examples 1256-1368

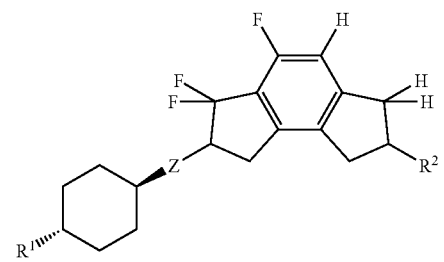

Examples 1369-1481

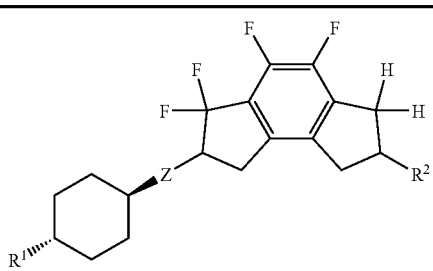

| Example No. | R¹ | R² | Z |
|---|---|---|---|
| 1030, 1143, 1256, 1369, | $CH_3$ | H | bond |
| 1031, 1144, 1257, 1370, | $CH_3$ | $CH_3$ | bond |
| 1032, 1145, 1258, 1371, | $CH_3$ | $C_2H_5$ | bond |
| 1033, 1146, 1259, 1372, | $CH_3$ | n-$C_3H_7$ | bond |
| 1034, 1147, 1260, 1373, | $CH_3$ | n-$C_4H_9$ | bond |
| 1035, 1148, 1261, 1374, | $CH_3$ | n-$C_5H_{11}$ | bond |
| 1036, 1149, 1262, 1375, | $CH_3$ | n-$C_6H_{13}$ | bond |
| 1037, 1150, 1263, 1376, | $CH_3$ | n-$C_7H_{15}$ | bond |
| 1038, 1151, 1264, 1377, | $CH_3$ | H | $CF_2CF_2$ |
| 1039, 1152, 1265, 1378, | $CH_3$ | $CH_3$ | $CF_2CF_2$ |
| 1040, 1153, 1266, 1379, | $CH_3$ | $C_2H_5$ | $CF_2CF_2$ |
| 1041, 1154, 1267, 1380, | $CH_3$ | n-$C_3H_7$ | $CF_2CF_2$ |
| 1042, 1155, 1268, 1381, | $CH_3$ | n-$C_4H_9$ | $CF_2CF_2$ |
| 1043, 1156, 1269, 1382, | $CH_3$ | n-$C_5H_{11}$ | $CF_2CF_2$ |
| 1044, 1157, 1270, 1383, | $CH_3$ | n-$C_6H_{13}$ | $CF_2CF_2$ |
| 1045, 1158, 1271, 1384, | $CH_3$ | n-$C_7H_{15}$ | $CF_2CF_2$ |
| 1046, 1159, 1272, 1385, | $C_2H_5$ | H | bond |
| 1047, 1160, 1273, 1386, | $C_2H_5$ | $CH_3$ | bond |
| 1048, 1161, 1274, 1387, | $C_2H_5$ | $C_2H_5$ | bond |
| 1049, 1162, 1275, 1388, | $C_2H_5$ | n-$C_3H_7$ | bond |
| 1050, 1163, 1276, 1389, | $C_2H_5$ | n-$C_4H_9$ | bond |
| 1051, 1164, 1277, 1390, | $C_2H_5$ | n-$C_5H_{11}$ | bond |
| 1052, 1165, 1278, 1391, | $C_2H_5$ | n-$C_6H_{13}$ | bond |
| 1053, 1166, 1279, 1392, | $C_2H_5$ | n-$C_7H_{15}$ | bond |
| 1054, 1167, 1280, 1393, | $C_2H_5$ | H | $CF_2CF_2$ |
| 1055, 1168, 1281, 1394, | $C_2H_5$ | $CH_3$ | $CF_2CF_2$ |
| 1056, 1169, 1282, 1395, | $C_2H_5$ | $C_2H_5$ | $CF_2CF_2$ |
| 1057, 1170, 1283, 1396, | $C_2H_5$ | n-$C_3H_7$ | $CF_2CF_2$ |
| 1058, 1171, 1284, 1397, | $C_2H_5$ | n-$C_4H_9$ | $CF_2CF_2$ |
| 1059, 1172, 1285, 1398, | $C_2H_5$ | n-$C_5H_{11}$ | $CF_2CF_2$ |
| 1060, 1173, 1286, 1399, | $C_2H_5$ | n-$C_6H_{13}$ | $CF_2CF_2$ |
| 1061, 1174, 1287, 1400, | $C_2H_5$ | n-$C_7H_{15}$ | $CF_2CF_2$ |
| 1062, 1175, 1288, 1401, | n-$C_3H_7$ | H | bond |
| 1063, 1176, 1289, 1402, | n-$C_3H_7$ | $CH_3$ | bond |
| 1064, 1177, 1290, 1403, | n-$C_3H_7$ | $C_2H_5$ | bond |
| 1065, 1178, 1291, 1404, | n-$C_3H_7$ | n-$C_3H_7$ | bond |
| 1066, 1179, 1292, 1405, | n-$C_3H_7$ | n-$C_4H_9$ | bond |
| 1067, 1180, 1293, 1406, | n-$C_3H_7$ | n-$C_5H_{11}$ | bond |
| 1068, 1181, 1294, 1407, | n-$C_3H_7$ | n-$C_6H_{13}$ | bond |
| 1069, 1182, 1295, 1408, | n-$C_3H_7$ | n-$C_7H_{15}$ | bond |
| 1070, 1183, 1296, 1409, | n-$C_3H_7$ | H | $CF_2CF_2$ |

-continued

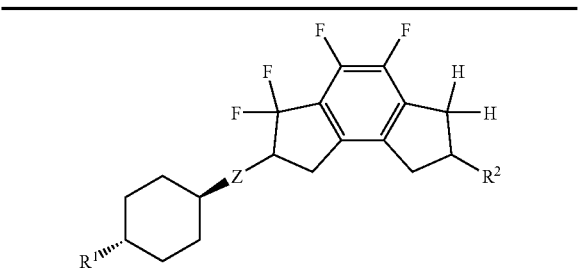

| Example No. | R[1] | R[2] | Z |
|---|---|---|---|
| 1071, 1184, 1297, 1410, | n-$C_3H_7$ | $CH_3$ | $CF_2CF_2$ |
| 1072, 1185, 1298, 1411, | n-$C_3H_7$ | $C_2H_5$ | $CF_2CF_2$ |
| 1073, 1186, 1299, 1412, | n-$C_3H_7$ | n-$C_3H_7$ | $CF_2CF_2$ |
| 1074, 1187, 1300, 1413, | n-$C_3H_7$ | n-$C_4H_9$ | $CF_2CF_2$ |
| 1075, 1188, 1301, 1414, | n-$C_3H_7$ | n-$C_5H_{11}$ | $CF_2CF_2$ |
| 1076, 1189, 1302, 1415, | n-$C_3H_7$ | n-$C_6H_{13}$ | $CF_2CF_2$ |
| 1077, 1190, 1303, 1416, | n-$C_3H_7$ | n-$C_7H_{15}$ | $CF_2CF_2$ |
| 1078, 1191, 1304, 1417, | n-$C_4H_9$ | H | bond |
| 1079, 1192, 1305, 1418, | n-$C_4H_9$ | $CH_3$ | bond |
| 1080, 1193, 1306, 1419, | n-$C_4H_9$ | $C_2H_5$ | bond |
| 1081, 1194, 1307, 1420, | n-$C_4H_9$ | n-$C_3H_7$ | bond |
| 1082, 1195, 1308, 1421, | n-$C_4H_9$ | n-$C_4H_9$ | bond |
| 1083, 1196, 1309, 1422, | n-$C_4H_9$ | n-$C_5H_{11}$ | bond |
| 1084, 1197, 1310, 1423, | n-$C_4H_9$ | n-$C_6H_{13}$ | bond |
| 1085, 1198, 1311, 1424, | n-$C_4H_9$ | n-$C_7H_{15}$ | bond |
| 1086, 1199, 1312, 1425, | n-$C_4H_9$ | H | $CF_2CF_2$ |
| 1087, 1200, 1313, 1426, | n-$C_4H_9$ | $CH_3$ | $CF_2CF_2$ |
| 1088, 1201, 1314, 1427, | n-$C_4H_9$ | $C_2H_5$ | $CF_2CF_2$ |
| 1089, 1202, 1315, 1428, | n-$C_4H_9$ | n-$C_3H_7$ | $CF_2CF_2$ |
| 1090, 1203, 1316, 1429, | n-$C_4H_9$ | n-$C_4H_9$ | $CF_2CF_2$ |
| 1091, 1204, 1317, 1430, | n-$C_4H_9$ | n-$C_5H_{11}$ | $CF_2CF_2$ |
| 1092, 1205, 1318, 1431, | n-$C_4H_9$ | n-$C_6H_{13}$ | $CF_2CF_2$ |
| 1093, 1206, 1319, 1432, | n-$C_4H_9$ | n-$C_7H_{15}$ | $CF_2CF_2$ |
| 1094, 1207, 1320, 1433, | n-$C_5H_{11}$ | n-$C_7H_{15}$ | bond |
| 1095, 1208, 1321, 1434, | n-$C_5H_{11}$ | H | bond |
| 1096, 1209, 1322, 1435, | n-$C_5H_{11}$ | $CH_3$ | bond |
| 1097, 1210, 1323, 1436, | n-$C_5H_{11}$ | $C_2H_5$ | bond |
| 1098, 1211, 1324, 1437, | n-$C_5H_{11}$ | n-$C_3H_7$ | bond |
| 1099, 1212, 1325, 1438, | n-$C_5H_{11}$ | n-$C_4H_9$ | bond |
| 1100, 1213, 1326, 1439, | n-$C_5H_{11}$ | n-$C_5H_{11}$ | bond |
| 1101, 1214, 1327, 1440, | n-$C_5H_{11}$ | n-$C_6H_{13}$ | bond |
| 1102, 1215, 1328, 1441, | n-$C_5H_{11}$ | n-$C_7H_{15}$ | bond |
| 1103, 1216, 1329, 1442, | n-$C_5H_{11}$ | H | $CF_2CF_2$ |
| 1104, 1217, 1330, 1443, | n-$C_5H_{11}$ | $CH_3$ | $CF_2CF_2$ |
| 1105, 1218, 1331, 1444, | n-$C_5H_{11}$ | $C_2H_5$ | $CF_2CF_2$ |
| 1106, 1219, 1332, 1445, | n-$C_5H_{11}$ | n-$C_3H_7$ | $CF_2CF_2$ |
| 1107, 1220, 1333, 1446, | n-$C_5H_{11}$ | n-$C_4H_9$ | $CF_2CF_2$ |
| 1108, 1221, 1334, 1447, | n-$C_5H_{11}$ | n-$C_5H_{11}$ | $CF_2CF_2$ |
| 1109, 1222, 1335, 1448, | n-$C_5H_{11}$ | n-$C_6H_{13}$ | $CF_2CF_2$ |
| 1110, 1223, 1336, 1449, | n-$C_5H_{11}$ | n-$C_7H_{15}$ | $CF_2CF_2$ |
| 1111, 1224, 1337, 1450, | n-$C_6H_{13}$ | H | bond |
| 1112, 1225, 1338, 1451, | n-$C_6H_{13}$ | $CH_3$ | bond |
| 1113, 1226, 1339, 1452, | n-$C_6H_{13}$ | $C_2H_5$ | bond |
| 1114, 1227, 1340, 1453, | n-$C_6H_{13}$ | n-$C_3H_7$ | bond |
| 1115, 1228, 1341, 1454, | n-$C_6H_{13}$ | n-$C_4H_9$ | bond |
| 1116, 1229, 1342, 1455, | n-$C_6H_{13}$ | n-$C_5H_{11}$ | bond |
| 1117, 1230, 1343, 1456, | n-$C_6H_{13}$ | n-$C_6H_{13}$ | bond |
| 1118, 1231, 1344, 1457, | n-$C_6H_{13}$ | n-$C_7H_{15}$ | bond |
| 1119, 1232, 1345, 1458, | n-$C_6H_{13}$ | H | $CF_2CF_2$ |
| 1120, 1233, 1346, 1459, | n-$C_6H_{13}$ | $CH_3$ | $CF_2CF_2$ |
| 1121, 1234, 1347, 1460, | n-$C_6H_{13}$ | $C_2H_5$ | $CF_2CF_2$ |
| 1122, 1235, 1348, 1461, | n-$C_6H_{13}$ | n-$C_3H_7$ | $CF_2CF_2$ |
| 1123, 1236, 1349, 1462, | n-$C_6H_{13}$ | n-$C_4H_9$ | $CF_2CF_2$ |
| 1124, 1237, 1350, 1463, | n-$C_6H_{13}$ | n-$C_5H_{11}$ | $CF_2CF_2$ |
| 1125, 1238, 1351, 1464, | n-$C_6H_{13}$ | n-$C_6H_{13}$ | $CF_2CF_2$ |
| 1126, 1239, 1352, 1465, | n-$C_6H_{13}$ | n-$C_7H_{15}$ | $CF_2CF_2$ |
| 1127, 1240, 1353, 1466, | n-$C_7H_{15}$ | H | bond |
| 1128, 1241, 1354, 1467, | n-$C_7H_{15}$ | $CH_3$ | bond |
| 1129, 1242, 1355, 1468, | n-$C_7H_{15}$ | $C_2H_5$ | bond |
| 1130, 1243, 1356, 1469, | n-$C_7H_{15}$ | n-$C_3H_7$ | bond |
| 1131, 1244, 1357, 1470, | n-$C_7H_{15}$ | n-$C_4H_9$ | bond |
| 1132, 1245, 1358, 1471, | n-$C_7H_{15}$ | n-$C_5H_{11}$ | bond |
| 1133, 1246, 1359, 1472, | n-$C_7H_{15}$ | n-$C_6H_{13}$ | bond |
| 1134, 1247, 1360, 1473, | n-$C_7H_{15}$ | n-$C_7H_{15}$ | bond |

-continued

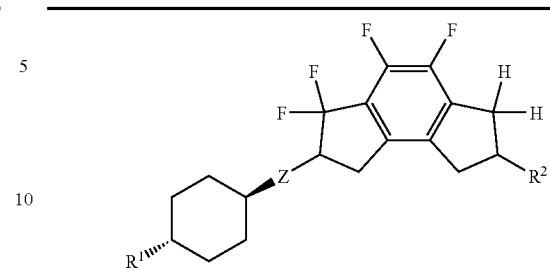

| Example No. | R[1] | R[2] | Z |
|---|---|---|---|
| 1135, 1248, 1361, 1474, | n-$C_7H_{15}$ | H | $CF_2CF_2$ |
| 1136, 1249, 1362, 1475, | n-$C_7H_{15}$ | $CH_3$ | $CF_2CF_2$ |
| 1137, 1250, 1363, 1476, | n-$C_7H_{15}$ | $C_2H_5$ | $CF_2CF_2$ |
| 1138, 1251, 1364, 1477, | n-$C_7H_{15}$ | n-$C_3H_7$ | $CF_2CF_2$ |
| 1139, 1252, 1365, 1478, | n-$C_7H_{15}$ | n-$C_4H_9$ | $CF_2CF_2$ |
| 1140, 1253, 1366, 1479, | n-$C_7H_{15}$ | n-$C_5H_{11}$ | $CF_2CF_2$ |
| 1141, 1254, 1367, 1480, | n-$C_7H_{15}$ | n-$C_6H_{13}$ | $CF_2CF_2$ |
| 1142, 1255, 1368, 1481, | n-$C_7H_{15}$ | n-$C_7H_{15}$ | $CF_2CF_2$ |

Examples 1482-1594

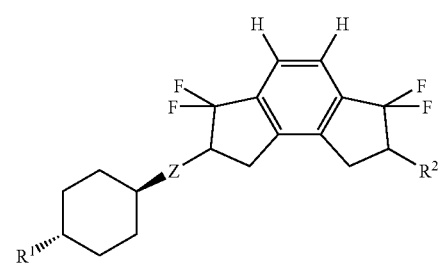

Examples 1595-1707

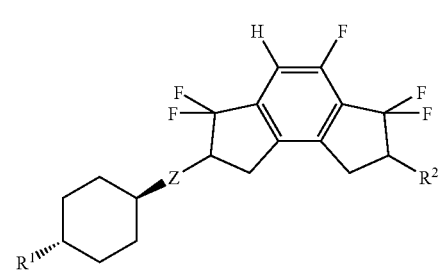

Examples 1708-1820

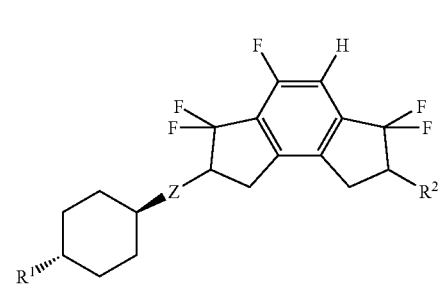

Examples 1821-1933

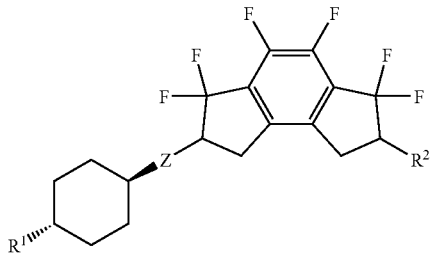

| Example No. | R¹ | R² | Z |
|---|---|---|---|
| 1482, 1595, 1708, 1821, | CH₃ | H | bond |
| 1483, 1596, 1709, 1822, | CH₃ | CH₃ | bond |
| 1484, 1597, 1710, 1823, | CH₃ | C₂H₅ | bond |
| 1485, 1598, 1711, 1824, | CH₃ | n-C₃H₇ | bond |
| 1486, 1599, 1712, 1825, | CH₃ | n-C₄H₉ | bond |
| 1487, 1600, 1713, 1826, | CH₃ | n-C₅H₁₁ | bond |
| 1488, 1601, 1714, 1827, | CH₃ | n-C₆H₁₃ | bond |
| 1489, 1602, 1715, 1828, | CH₃ | n-C₇H₁₅ | bond |
| 1490, 1603, 1716, 1829, | CH₃ | H | CF₂CF₂ |
| 1491, 1604, 1717, 1830, | CH₃ | CH₃ | CF₂CF₂ |
| 1492, 1605, 1718, 1831, | CH₃ | C₂H₅ | CF₂CF₂ |
| 1493, 1606, 1719, 1832, | CH₃ | n-C₃H₇ | CF₂CF₂ |
| 1494, 1607, 1720, 1833, | CH₃ | n-C₄H₉ | CF₂CF₂ |
| 1495, 1608, 1721, 1834, | CH₃ | n-C₅H₁₁ | CF₂CF₂ |
| 1496, 1609, 1722, 1835, | CH₃ | n-C₆H₁₃ | CF₂CF₂ |
| 1497, 1610, 1723, 1836, | CH₃ | n-C₇H₁₅ | CF₂CF₂ |
| 1498, 1611, 1724, 1837, | C₂H₅ | H | bond |
| 1499, 1612, 1725, 1838, | C₂H₅ | CH₃ | bond |
| 1500, 1613, 1726, 1839, | C₂H₅ | C₂H₅ | bond |
| 1501, 1614, 1727, 1840, | C₂H₅ | n-C₃H₇ | bond |
| 1502, 1615, 1728, 1841, | C₂H₅ | n-C₄H₉ | bond |
| 1503, 1616, 1729, 1842, | C₂H₅ | n-C₅H₁₁ | bond |
| 1504, 1617, 1730, 1843, | C₂H₅ | n-C₆H₁₃ | bond |
| 1505, 1618, 1731, 1844, | C₂H₅ | n-C₇H₁₅ | bond |
| 1506, 1619, 1732, 1845, | C₂H₅ | H | CF₂CF₂ |
| 1507, 1620, 1733, 1846, | C₂H₅ | CH₃ | CF₂CF₂ |
| 1508, 1621, 1734, 1847, | C₂H₅ | C₂H₅ | CF₂CF₂ |
| 1509, 1622, 1735, 1848, | C₂H₅ | n-C₃H₇ | CF₂CF₂ |
| 1510, 1623, 1736, 1849, | C₂H₅ | n-C₄H₉ | CF₂CF₂ |
| 1511, 1624, 1737, 1850, | C₂H₅ | n-C₅H₁₁ | CF₂CF₂ |
| 1512, 1625, 1738, 1851, | C₂H₅ | n-C₆H₁₃ | CF₂CF₂ |
| 1513, 1626, 1739, 1852, | C₂H₅ | n-C₇H₁₅ | CF₂CF₂ |
| 1514, 1627, 1740, 1853, | n-C₃H₇ | H | bond |
| 1515, 1628, 1741, 1854, | n-C₃H₇ | CH₃ | bond |
| 1516, 1629, 1742, 1855, | n-C₃H₇ | C₂H₅ | bond |
| 1517, 1630, 1743, 1856, | n-C₃H₇ | n-C₃H₇ | bond |
| 1518, 1631, 1744, 1857, | n-C₃H₇ | n-C₄H₉ | bond |
| 1519, 1632, 1745, 1858, | n-C₃H₇ | n-C₅H₁₁ | bond |
| 1520, 1633, 1746, 1859, | n-C₃H₇ | n-C₆H₁₃ | bond |
| 1521, 1634, 1747, 1860, | n-C₃H₇ | n-C₇H₁₅ | bond |
| 1522, 1635, 1748, 1861, | n-C₃H₇ | H | CF₂CF₂ |
| 1523, 1636, 1749, 1862, | n-C₃H₇ | CH₃ | CF₂CF₂ |
| 1524, 1637, 1750, 1863, | n-C₃H₇ | C₂H₅ | CF₂CF₂ |
| 1525, 1638, 1751, 1864, | n-C₃H₇ | n-C₃H₇ | CF₂CF₂ |
| 1526, 1639, 1752, 1865, | n-C₃H₇ | n-C₄H₉ | CF₂CF₂ |
| 1527, 1640, 1753, 1866, | n-C₃H₇ | n-C₅H₁₁ | CF₂CF₂ |
| 1528, 1641, 1754, 1867, | n-C₃H₇ | n-C₆H₁₃ | CF₂CF₂ |
| 1529, 1642, 1755, 1868, | n-C₃H₇ | n-C₇H₁₅ | CF₂CF₂ |
| 1530, 1643, 1756, 1869, | n-C₄H₉ | H | bond |
| 1531, 1644, 1757, 1870, | n-C₄H₉ | CH₃ | bond |
| 1532, 1645, 1758, 1871, | n-C₄H₉ | C₂H₅ | bond |
| 1533, 1646, 1759, 1872, | n-C₄H₉ | n-C₃H₇ | bond |
| 1534, 1647, 1760, 1873, | n-C₄H₉ | n-C₄H₉ | bond |
| 1535, 1648, 1761, 1874, | n-C₄H₉ | n-C₅H₁₁ | bond |
| 1536, 1649, 1762, 1875, | n-C₄H₉ | n-C₆H₁₃ | bond |
| 1537, 1650, 1763, 1876, | n-C₄H₉ | n-C₇H₁₅ | bond |
| 1538, 1651, 1764, 1877, | n-C₄H₉ | H | CF₂CF₂ |
| 1539, 1652, 1765, 1878, | n-C₄H₉ | CH₃ | CF₂CF₂ |
| 1540, 1653, 1766, 1879, | n-C₄H₉ | C₂H₅ | CF₂CF₂ |
| 1541, 1654, 1767, 1880, | n-C₄H₉ | n-C₃H₇ | CF₂CF₂ |
| 1542, 1655, 1768, 1881, | n-C₄H₉ | n-C₄H₉ | CF₂CF₂ |

-continued

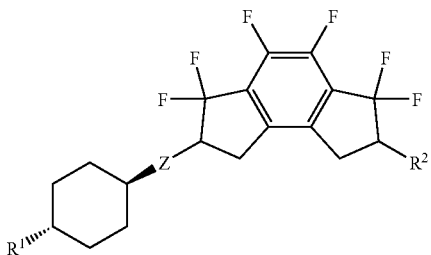

| Example No. | R¹ | R² | Z |
|---|---|---|---|
| 1543, 1656, 1769, 1882, | n-C₄H₉ | n-C₅H₁₁ | CF₂CF₂ |
| 1544, 1657, 1770, 1883, | n-C₄H₉ | n-C₆H₁₃ | CF₂CF₂ |
| 1545, 1658, 1771, 1884, | n-C₄H₉ | n-C₇H₁₅ | CF₂CF₂ |
| 1546, 1659, 1772, 1885, | n-C₅H₁₁ | n-C₇H₁₅ | bond |
| 1547, 1660, 1773, 1886, | n-C₅H₁₁ | H | bond |
| 1548, 1661, 1774, 1887, | n-C₅H₁₁ | CH₃ | bond |
| 1549, 1662, 1775, 1888, | n-C₅H₁₁ | C₂H₅ | bond |
| 1550, 1663, 1776, 1889, | n-C₅H₁₁ | n-C₃H₇ | bond |
| 1551, 1664, 1777, 1890, | n-C₅H₁₁ | n-C₄H₉ | bond |
| 1552, 1665, 1778, 1891, | n-C₅H₁₁ | n-C₅H₁₁ | bond |
| 1553, 1666, 1779, 1892, | n-C₅H₁₁ | n-C₆H₁₃ | bond |
| 1554, 1667, 1780, 1893, | n-C₅H₁₁ | n-C₇H₁₅ | bond |
| 1555, 1668, 1781, 1894, | n-C₅H₁₁ | H | CF₂CF₂ |
| 1556, 1669, 1782, 1895, | n-C₅H₁₁ | CH₃ | CF₂CF₂ |
| 1557, 1670, 1783, 1896, | n-C₅H₁₁ | C₂H₅ | CF₂CF₂ |
| 1558, 1671, 1784, 1897, | n-C₅H₁₁ | n-C₃H₇ | CF₂CF₂ |
| 1559, 1672, 1785, 1898, | n-C₅H₁₁ | n-C₄H₉ | CF₂CF₂ |
| 1560, 1673, 1786, 1899, | n-C₅H₁₁ | n-C₅H₁₁ | CF₂CF₂ |
| 1561, 1674, 1787, 1900, | n-C₅H₁₁ | n-C₆H₁₃ | CF₂CF₂ |
| 1562, 1675, 1788, 1901, | n-C₅H₁₁ | n-C₇H₁₅ | CF₂CF₂ |
| 1563, 1676, 1789, 1902, | n-C₆H₁₃ | H | bond |
| 1564, 1677, 1790, 1903, | n-C₆H₁₃ | CH₃ | bond |
| 1565, 1678, 1791, 1904, | n-C₆H₁₃ | C₂H₅ | bond |
| 1566, 1679, 1792, 1905, | n-C₆H₁₃ | n-C₃H₇ | bond |
| 1567, 1680, 1793, 1906, | n-C₆H₁₃ | n-C₄H₉ | bond |
| 1568, 1681, 1794, 1907, | n-C₆H₁₃ | n-C₅H₁₁ | bond |
| 1569, 1682, 1795, 1908, | n-C₆H₁₃ | n-C₆H₁₃ | bond |
| 1570, 1683, 1796, 1909, | n-C₆H₁₃ | n-C₇H₁₅ | bond |
| 1571, 1684, 1797, 1910, | n-C₆H₁₃ | H | CF₂CF₂ |
| 1572, 1685, 1798, 1911, | n-C₆H₁₃ | CH₃ | CF₂CF₂ |
| 1573, 1686, 1799, 1912, | n-C₆H₁₃ | C₂H₅ | CF₂CF₂ |
| 1574, 1687, 1800, 1913, | n-C₆H₁₃ | n-C₃H₇ | CF₂CF₂ |
| 1575, 1688, 1801, 1914, | n-C₆H₁₃ | n-C₄H₉ | CF₂CF₂ |
| 1576, 1689, 1802, 1915, | n-C₆H₁₃ | n-C₅H₁₁ | CF₂CF₂ |
| 1577, 1690, 1803, 1916, | n-C₆H₁₃ | n-C₆H₁₃ | CF₂CF₂ |
| 1578, 1691, 1804, 1917, | n-C₆H₁₃ | n-C₇H₁₅ | CF₂CF₂ |
| 1579, 1692, 1805, 1918, | n-C₇H₁₅ | H | bond |
| 1580, 1693, 1806, 1919, | n-C₇H₁₅ | CH₃ | bond |
| 1581, 1694, 1807, 1920, | n-C₇H₁₅ | C₂H₅ | bond |
| 1582, 1695, 1808, 1921, | n-C₇H₁₅ | n-C₃H₇ | bond |
| 1583, 1696, 1809, 1922, | n-C₇H₁₅ | n-C₄H₉ | bond |
| 1584, 1697, 1810, 1923, | n-C₇H₁₅ | n-C₅H₁₁ | bond |
| 1585, 1698, 1811, 1924, | n-C₇H₁₅ | n-C₆H₁₃ | bond |

-continued

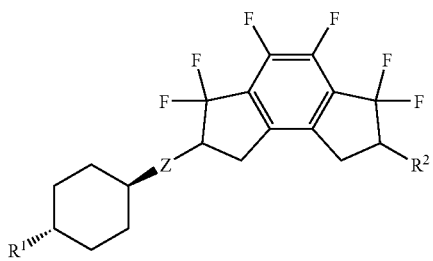

| Example No. | R¹ | R² | Z |
|---|---|---|---|
| 1586, 1699, 1812, 1925, | n-C$_7$H$_{15}$ | n-C$_7$H$_{15}$ | bond |
| 1587, 1700, 1813, 1926, | n-C$_7$H$_{15}$ | H | CF$_2$CF$_2$ |
| 1588, 1701, 1814, 1927, | n-C$_7$H$_{15}$ | CH$_3$ | CF$_2$CF$_2$ |
| 1589, 1702, 1815, 1928, | n-C$_7$H$_{15}$ | C$_2$H$_5$ | CF$_2$CF$_2$ |
| 1590, 1703, 1816, 1929, | n-C$_7$H$_{15}$ | n-C$_3$H$_7$ | CF$_2$CF$_2$ |
| 1591, 1704, 1817, 1930, | n-C$_7$H$_{15}$ | n-C$_4$H$_9$ | CF$_2$CF$_2$ |
| 1592, 1705, 1818, 1931, | n-C$_7$H$_{15}$ | n-C$_5$H$_{11}$ | CF$_2$CF$_2$ |
| 1593, 1706, 1819, 1932, | n-C$_7$H$_{15}$ | n-C$_6$H$_{13}$ | CF$_2$CF$_2$ |
| 1594, 1707, 1820, 1933, | n-C$_7$H$_{15}$ | n-C$_7$H$_{15}$ | CF$_2$CF$_2$ |

Examples 1934-1958

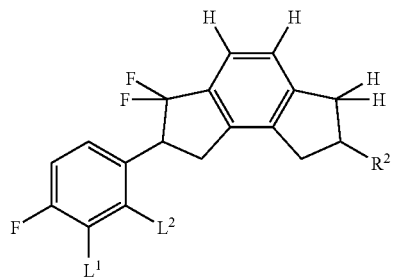

Examples 1959-1983

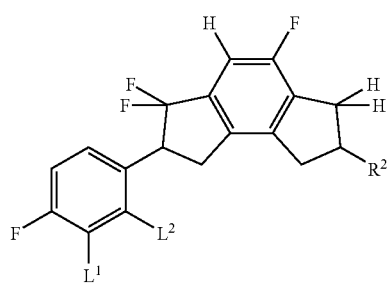

Examples 1984-2008

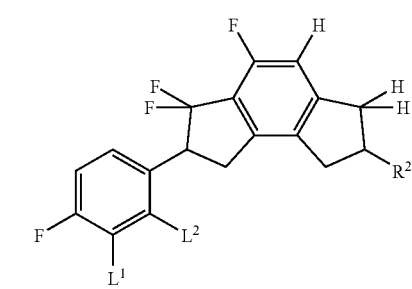

Examples 2009-2033

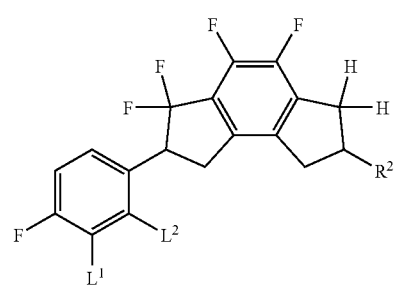

| Example No. | L¹ | L² | R² |
|---|---|---|---|
| 1934, 1959, 1984, 2009, | H | H | H |
| 1935, 1960, 1985, 2010, | F | H | H |
| 1936, 1961, 1986, 2011, | F | F | H |
| 1937, 1962, 1987, 2012, | F | F | H |
| 1938, 1963, 1988, 2013, | H | H | CH$_3$ |
| 1939, 1964, 1989, 2014, | F | H | CH$_3$ |
| 1940, 1965, 1990, 2015, | F | F | CH$_3$ |
| 1941, 1966, 1991, 2016, | H | H | C$_2$H$_5$ |
| 1942, 1967, 1992, 2017, | F | H | C$_2$H$_5$ |
| 1943, 1968, 1993, 2018, | F | F | C$_2$H$_5$ |
| 1944, 1969, 1994, 2019, | H | H | n-C$_3$H$_7$ |
| 1945, 1970, 1995, 2020, | F | H | n-C$_3$H$_7$ |
| 1946, 1971, 1996, 2021, | F | F | n-C$_3$H$_7$ |
| 1947, 1972, 1997, 2022, | H | H | n-C$_4$H$_9$ |
| 1948, 1973, 1998, 2023, | F | H | n-C$_4$H$_9$ |
| 1949, 1974, 1999, 2024, | F | F | n-C$_4$H$_9$ |
| 1950, 1975, 2000, 2025, | H | H | n-C$_5$H$_{11}$ |
| 1951, 1976, 2001, 2026, | F | H | n-C$_5$H$_{11}$ |
| 1952, 1977, 2002, 2027, | F | F | n-C$_5$H$_{11}$ |
| 1953, 1978, 2003, 2028, | H | H | n-C$_6$H$_{13}$ |
| 1954, 1979, 2004, 2029, | F | H | n-C$_6$H$_{13}$ |
| 1955, 1980, 2005, 2030, | F | F | n-C$_6$H$_{13}$ |
| 1956, 1981, 2006, 2031, | H | H | n-C$_7$H$_{15}$ |
| 1957, 1982, 2007, 2032, | F | H | n-C$_7$H$_{15}$ |
| 1958, 1983, 2008, 2033, | F | F | n-C$_7$H$_{15}$ |

Examples 2034-2058

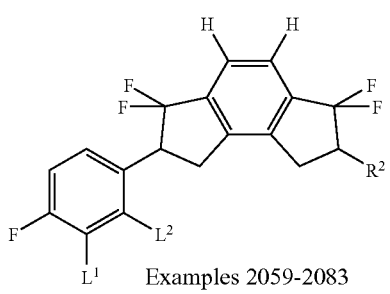

Examples 2059-2083

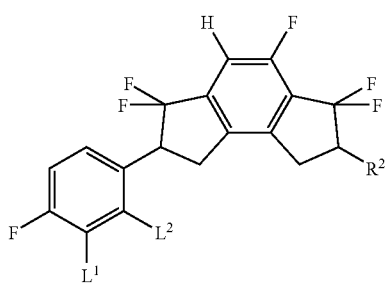

Examples 2084-2108

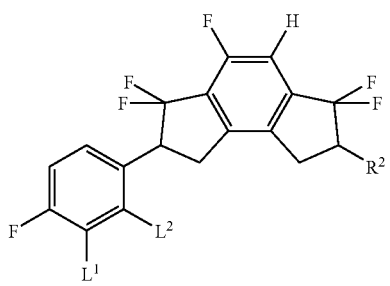

Examples 2109-2133

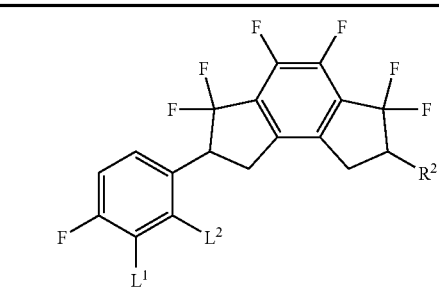

| Example No. | L¹ | L² | R² |
|---|---|---|---|
| 2034, 2059, 2084, 2109, | H | H | H |
| 2035, 2060, 2085, 2110, | F | H | H |
| 2036, 2061, 2086, 2111, | F | F | H |
| 2037, 2062, 2087, 2112, | F | F | H |
| 2038, 2063, 2088, 2113, | H | H | $CH_3$ |
| 2039, 2064, 2089, 2114, | F | H | $CH_3$ |

-continued

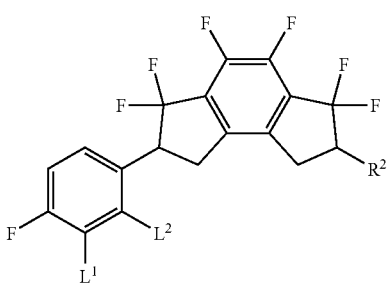

| Example No. | L¹ | L² | R² |
|---|---|---|---|
| 2040, 2065, 2090, 2115, | F | F | $CH_3$ |
| 2041, 2066, 2091, 2116, | H | H | $C_2H_5$ |
| 2042, 2067, 2092, 2117, | F | H | $C_2H_5$ |
| 2043, 2068, 2093, 2118, | F | F | $C_2H_5$ |
| 2044, 2069, 2094, 2119, | H | H | $n\text{-}C_3H_7$ |
| 2045, 2070, 2095, 2120, | F | H | $n\text{-}C_3H_7$ |
| 2046, 2071, 2096, 2121, | F | F | $n\text{-}C_3H_7$ |
| 2047, 2072, 2097, 2122, | H | H | $n\text{-}C_4H_9$ |
| 2048, 2073, 2098, 2123, | F | H | $n\text{-}C_4H_9$ |
| 2049, 2074, 2099, 2124, | F | F | $n\text{-}C_4H_9$ |
| 2050, 2075, 2100, 2125, | H | H | $n\text{-}C_5H_{11}$ |
| 2051, 2076, 2101, 2126, | F | H | $n\text{-}C_5H_{11}$ |
| 2052, 2077, 2102, 2127, | F | F | $n\text{-}C_5H_{11}$ |
| 2053, 2078, 2103, 2128, | H | H | $n\text{-}C_6H_{13}$ |
| 2054, 2079, 2104, 2129, | F | H | $n\text{-}C_6H_{13}$ |
| 2055, 2080, 2105, 2130, | F | F | $n\text{-}C_6H_{13}$ |
| 2056, 2081, 2106, 2131, | H | H | $n\text{-}C_7H_{15}$ |
| 2057, 2082, 2107, 2132, | F | H | $n\text{-}C_7H_{15}$ |
| 2058, 2083, 2108, 2133, | F | F | $n\text{-}C_7H_{15}$ |

Examples 2134-2189

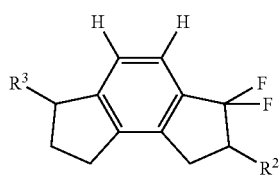

Examples 2190-2245

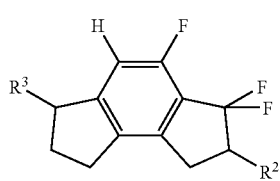

Examples 2246-2301

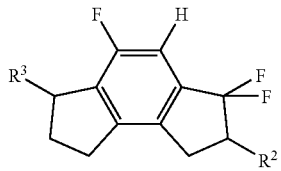

Examples 2302-2357

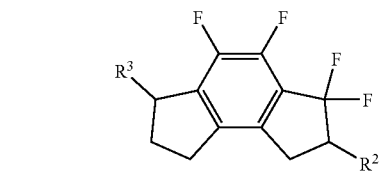

| Example No. | R² | R³ |
|---|---|---|
| 2134, 2190, 2246, 2302, | H | CH₃ |
| 2135, 2191, 2247, 2303, | H | C₂H₅ |
| 2136, 2192, 2248, 2304, | H | n-C₃H₇ |
| 2137, 2193, 2249, 2305, | H | n-C₄H₉ |
| 2138, 2194, 2250, 2306, | H | n-C₅H₁₁ |
| 2139, 2195, 2251, 2307, | H | n-C₆H₁₃ |
| 2140, 2196, 2252, 2308, | H | n-C₇H₁₅ |
| 2141, 2197, 2253, 2309, | CH₃ | CH₃ |
| 2142, 2198, 2254, 2310, | CH₃ | C₂H₅ |
| 2143, 2199, 2255, 2311, | CH₃ | n-C₃H₇ |
| 2144, 2200, 2256, 2312, | CH₃ | n-C₄H₉ |
| 2145, 2201, 2257, 2313, | CH₃ | n-C₅H₁₁ |
| 2146, 2202, 2258, 2314, | CH₃ | n-C₆H₁₃ |
| 2147, 2203, 2259, 2315, | CH₃ | n-C₇H₁₅ |
| 2148, 2204, 2260, 2316, | C₂H₅ | CH₃ |
| 2149, 2205, 2261, 2317, | C₂H₅ | C₂H₅ |
| 2150, 2206, 2262, 2318, | C₂H₅ | n-C₃H₇ |
| 2151, 2207, 2263, 2319, | C₂H₅ | n-C₄H₉ |
| 2152, 2208, 2264, 2320, | C₂H₅ | n-C₅H₁₁ |
| 2153, 2209, 2265, 2321, | C₂H₅ | n-C₆H₁₃ |
| 2154, 2210, 2266, 2322, | C₂H₅ | n-C₇H₁₅ |
| 2155, 2211, 2267, 2323, | n-C₃H₇ | CH₃ |
| 2156, 2212, 2268, 2324, | n-C₃H₇ | C₂H₅ |
| 2157, 2213, 2269, 2325, | n-C₃H₇ | n-C₃H₇ |
| 2158, 2214, 2270, 2326, | n-C₃H₇ | n-C₄H₉ |
| 2159, 2215, 2271, 2327, | n-C₃H₇ | n-C₅H₁₁ |
| 2160, 2216, 2272, 2328, | n-C₃H₇ | n-C₆H₁₃ |
| 2161, 2217, 2273, 2329, | n-C₃H₇ | n-C₇H₁₅ |
| 2162, 2218, 2274, 2330, | n-C₄H₉ | CH₃ |
| 2163, 2219, 2275, 2331, | n-C₄H₉ | C₂H₅ |
| 2164, 2220, 2276, 2332, | n-C₄H₉ | n-C₃H₇ |
| 2165, 2221, 2277, 2333, | n-C₄H₉ | n-C₄H₉ |
| 2166, 2222, 2278, 2334, | n-C₄H₉ | n-C₅H₁₁ |
| 2167, 2223, 2279, 2335, | n-C₄H₉ | n-C₆H₁₃ |
| 2168, 2224, 2280, 2336, | n-C₄H₉ | n-C₇H₁₅ |
| 2169, 2225, 2281, 2337, | n-C₅H₁₁ | CH₃ |
| 2170, 2226, 2282, 2338, | n-C₅H₁₁ | C₂H₅ |
| 2171, 2227, 2283, 2339, | n-C₅H₁₁ | n-C₃H₇ |
| 2172, 2228, 2284, 2340, | n-C₅H₁₁ | n-C₄H₉ |
| 2173, 2229, 2285, 2341, | n-C₅H₁₁ | n-C₅H₁₁ |
| 2174, 2230, 2286, 2342, | n-C₅H₁₁ | n-C₆H₁₃ |
| 2175, 2231, 2287, 2343, | n-C₅H₁₁ | n-C₇H₁₅ |
| 2176, 2232, 2288, 2344, | n-C₆H₁₃ | CH₃ |
| 2177, 2233, 2289, 2345, | n-C₆H₁₃ | C₂H₅ |
| 2178, 2234, 2290, 2346, | n-C₆H₁₃ | n-C₃H₇ |
| 2179, 2235, 2291, 2347, | n-C₆H₁₃ | n-C₄H₉ |
| 2180, 2236, 2292, 2348, | n-C₆H₁₃ | n-C₅H₁₁ |
| 2181, 2237, 2293, 2349, | n-C₆H₁₃ | n-C₆H₁₃ |
| 2182, 2238, 2294, 2350, | n-C₆H₁₃ | n-C₇H₁₅ |

-continued

| Example No. | R² | R³ |
|---|---|---|
| 2183, 2239, 2295, 2351, | n-C₇H₁₅ | CH₃ |
| 2184, 2240, 2296, 2352, | n-C₇H₁₅ | C₂H₅ |
| 2185, 2241, 2297, 2353, | n-C₇H₁₅ | n-C₃H₇ |
| 2186, 2242, 2298, 2354, | n-C₇H₁₅ | n-C₄H₉ |
| 2187, 2243, 2299, 2355, | n-C₇H₁₅ | n-C₅H₁₁ |
| 2188, 2244, 2300, 2356, | n-C₇H₁₅ | n-C₆H₁₃ |
| 2189, 2245, 2301, 2357, | n-C₇H₁₅ | n-C₇H₁₅ |

Examples 2358-2621

Examples 2622-2885

| Example No. | X¹ | X² | R¹ | R² |
|---|---|---|---|---|
| 2358, 2622, | H | H | H | H |
| 2359, 2623, | H | H | H | CH₃ |
| 2360, 2624, | H | H | H | C₂H₅ |
| 2361, 2625, | H | H | H | n-C₃H₇ |
| 2362, 2626, | H | H | H | n-C₄H₉ |
| 2363, 2627, | H | H | H | n-C₅H₁₁ |
| 2364, 2628, | H | H | H | n-C₆H₁₃ |
| 2365, 2629, | H | H | H | n-C₇H₁₅ |
| 2366, 2630, | F | H | H | H |
| 2367, 2631, | F | H | H | CH₃ |
| 2368, 2632, | F | H | H | C₂H₅ |
| 2369, 2633, | F | H | H | n-C₃H₇ |
| 2370, 2634, | F | H | H | n-C₄H₉ |
| 2371, 2635, | F | H | H | n-C₅H₁₁ |
| 2372, 2636, | F | H | H | n-C₆H₁₃ |
| 2373, 2637, | F | H | H | n-C₇H₁₅ |
| 2374, 2638, | F | F | H | H |
| 2375, 2639, | F | F | H | CH₃ |
| 2376, 2640, | F | F | H | C₂H₅ |
| 2377, 2641, | F | F | H | n-C₃H₇ |
| 2378, 2642, | F | F | H | n-C₄H₉ |
| 2379, 2643, | F | F | H | n-C₅H₁₁ |
| 2380, 2644, | F | F | H | n-C₆H₁₃ |
| 2381, 2645, | F | F | H | n-C₇H₁₅ |
| 2382, 2646, | CF₃ | H | H | H |

| Example No. | X¹ | X² | R¹ | R² |
|---|---|---|---|---|
| 2383, 2647, | CF$_3$ | H | H | CH$_3$ |
| 2384, 2648, | CF$_3$ | H | H | C$_2$H$_5$ |
| 2385, 2649, | CF$_3$ | H | H | n-C$_3$H$_7$ |
| 2386, 2650, | CF$_3$ | H | H | n-C$_4$H$_9$ |
| 2387, 2651, | CF$_3$ | H | H | n-C$_5$H$_{11}$ |
| 2388, 2652, | CF$_3$ | H | H | n-C$_6$H$_{13}$ |
| 2389, 2653, | CF$_3$ | H | H | n-C$_7$H$_{15}$ |
| 2390, 2654, | —OCF$_3$ | H | H | H |
| 2391, 2655, | —OCF$_3$ | H | H | CH$_3$ |
| 2392, 2656, | —OCF$_3$ | H | H | C$_2$H$_5$ |
| 2393, 2657, | —OCF$_3$ | H | H | n-C$_3$H$_7$ |
| 2394, 2658, | —OCF$_3$ | H | H | n-C$_4$H$_9$ |
| 2395, 2659, | —OCF$_3$ | H | H | n-C$_5$H$_{11}$ |
| 2396, 2660, | —OCF$_3$ | H | H | n-C$_6$H$_{13}$ |
| 2397, 2661, | —OCF$_3$ | H | H | n-C$_7$H$_{15}$ |
| 2398, 2662, | H | H | CH$_3$ | CH$_3$ |
| 2399, 2663, | H | H | CH$_3$ | C$_2$H$_5$ |
| 2400, 2664, | H | H | CH$_3$ | n-C$_3$H$_7$ |
| 2401, 2665, | H | H | CH$_3$ | n-C$_4$H$_9$ |
| 2402, 2666, | H | H | CH$_3$ | n-C$_5$H$_{11}$ |
| 2403, 2667, | H | H | CH$_3$ | n-C$_6$H$_{13}$ |
| 2404, 2668, | H | H | CH$_3$ | n-C$_7$H$_{15}$ |
| 2405, 2669, | F | H | CH$_3$ | H |
| 2406, 2670, | F | H | CH$_3$ | CH$_3$ |
| 2407, 2671, | F | H | CH$_3$ | C$_2$H$_5$ |
| 2408, 2672, | F | H | CH$_3$ | n-C$_3$H$_7$ |
| 2409, 2673, | F | H | CH$_3$ | n-C$_4$H$_9$ |
| 2410, 2674, | F | H | CH$_3$ | n-C$_5$H$_{11}$ |
| 2411, 2675, | F | H | CH$_3$ | n-C$_6$H$_{13}$ |
| 2412, 2676, | F | H | CH$_3$ | n-C$_7$H$_{15}$ |
| 2413, 2677, | F | F | CH$_3$ | CH$_3$ |
| 2414, 2678, | F | F | CH$_3$ | C$_2$H$_5$ |
| 2415, 2679, | F | F | CH$_3$ | n-C$_3$H$_7$ |
| 2416, 2680, | F | F | CH$_3$ | n-C$_4$H$_9$ |
| 2417, 2681, | F | F | CH$_3$ | n-C$_5$H$_{11}$ |
| 2418, 2682, | F | F | CH$_3$ | n-C$_6$H$_{13}$ |
| 2419, 2683, | F | F | CH$_3$ | n-C$_7$H$_{15}$ |
| 2420, 2684, | CF$_3$ | H | CH$_3$ | H |
| 2421, 2685, | CF$_3$ | H | CH$_3$ | CH$_3$ |
| 2422, 2686, | CF$_3$ | H | CH$_3$ | C$_2$H$_5$ |
| 2423, 2687, | CF$_3$ | H | CH$_3$ | n-C$_3$H$_7$ |
| 2424, 2688, | CF$_3$ | H | CH$_3$ | n-C$_4$H$_9$ |
| 2425, 2689, | CF$_3$ | H | CH$_3$ | n-C$_5$H$_{11}$ |
| 2426, 2690, | CF$_3$ | H | CH$_3$ | n-C$_6$H$_{13}$ |
| 2427, 2691, | CF$_3$ | H | CH$_3$ | n-C$_7$H$_{15}$ |
| 2428, 2692, | —OCF$_3$ | H | CH$_3$ | H |
| 2429, 2693, | —OCF$_3$ | H | CH$_3$ | CH$_3$ |
| 2430, 2694, | —OCF$_3$ | H | CH$_3$ | C$_2$H$_5$ |
| 2431, 2695, | —OCF$_3$ | H | CH$_3$ | n-C$_3$H$_7$ |
| 2432, 2696, | —OCF$_3$ | H | CH$_3$ | n-C$_4$H$_9$ |
| 2433, 2697, | —OCF$_3$ | H | CH$_3$ | n-C$_5$H$_{11}$ |
| 2434, 2698, | —OCF$_3$ | H | CH$_3$ | n-C$_6$H$_{13}$ |
| 2435, 2699, | —OCF$_3$ | H | CH$_3$ | n-C$_7$H$_{15}$ |
| 2436, 2700, | H | H | C$_2$H$_5$ | C$_2$H$_5$ |
| 2437, 2701, | H | H | C$_2$H$_5$ | n-C$_3$H$_7$ |
| 2438, 2702, | H | H | C$_2$H$_5$ | n-C$_4$H$_9$ |
| 2439, 2703, | H | H | C$_2$H$_5$ | n-C$_5$H$_{11}$ |
| 2440, 2704, | H | H | C$_2$H$_5$ | n-C$_6$H$_{13}$ |
| 2441, 2705, | H | H | C$_2$H$_5$ | n-C$_7$H$_{15}$ |
| 2442, 2706, | F | H | C$_2$H$_5$ | H |
| 2443, 2707, | F | H | C$_2$H$_5$ | CH$_3$ |
| 2444, 2708, | F | H | C$_2$H$_5$ | C$_2$H$_5$ |
| 2445, 2709, | F | H | C$_2$H$_5$ | n-C$_3$H$_7$ |
| 2446, 2710, | F | H | C$_2$H$_5$ | n-C$_4$H$_9$ |
| 2447, 2711, | F | H | C$_2$H$_5$ | n-C$_5$H$_{11}$ |
| 2448, 2712, | F | H | C$_2$H$_5$ | n-C$_6$H$_{13}$ |
| 2449, 2713, | F | H | C$_2$H$_5$ | n-C$_7$H$_{15}$ |
| 2450, 2714, | F | F | C$_2$H$_5$ | C$_2$H$_5$ |
| 2451, 2715, | F | F | C$_2$H$_5$ | n-C$_3$H$_7$ |
| 2452, 2716, | F | F | C$_2$H$_5$ | n-C$_4$H$_9$ |
| 2453, 2717, | F | F | C$_2$H$_5$ | n-C$_5$H$_{11}$ |
| 2454, 2718, | F | F | C$_2$H$_5$ | n-C$_6$H$_{13}$ |
| 2455, 2719, | F | F | C$_2$H$_5$ | n-C$_7$H$_{15}$ |
| 2456, 2720, | CF$_3$ | H | C$_2$H$_5$ | H |
| 2457, 2721, | CF$_3$ | H | C$_2$H$_5$ | CH$_3$ |
| 2458, 2722, | CF$_3$ | H | C$_2$H$_5$ | C$_2$H$_5$ |
| 2459, 2723, | CF$_3$ | H | C$_2$H$_5$ | n-C$_3$H$_7$ |
| 2460, 2724, | CF$_3$ | H | C$_2$H$_5$ | n-C$_4$H$_9$ |
| 2461, 2725, | CF$_3$ | H | C$_2$H$_5$ | n-C$_5$H$_{11}$ |
| 2462, 2726, | CF$_3$ | H | C$_2$H$_5$ | n-C$_6$H$_{13}$ |
| 2463, 2727, | CF$_3$ | H | C$_2$H$_5$ | n-C$_7$H$_{15}$ |
| 2464, 2728, | —OCF$_3$ | H | C$_2$H$_5$ | H |
| 2465, 2729, | —OCF$_3$ | H | C$_2$H$_5$ | CH$_3$ |
| 2466, 2730, | —OCF$_3$ | H | C$_2$H$_5$ | C$_2$H$_5$ |
| 2467, 2731, | —OCF$_3$ | H | C$_2$H$_5$ | n-C$_3$H$_7$ |
| 2468, 2732, | —OCF$_3$ | H | C$_2$H$_5$ | n-C$_4$H$_9$ |
| 2469, 2733, | —OCF$_3$ | H | C$_2$H$_5$ | n-C$_5$H$_{11}$ |
| 2470, 2734, | —OCF$_3$ | H | C$_2$H$_5$ | n-C$_6$H$_{13}$ |
| 2471, 2735, | —OCF$_3$ | H | C$_2$H$_5$ | n-C$_7$H$_{15}$ |
| 2472, 2736, | H | H | n-C$_3$H$_7$ | n-C$_3$H$_7$ |
| 2473, 2737, | H | H | n-C$_3$H$_7$ | n-C$_4$H$_9$ |
| 2474, 2738, | H | H | n-C$_3$H$_7$ | n-C$_5$H$_{11}$ |
| 2475, 2739, | H | H | n-C$_3$H$_7$ | n-C$_6$H$_{13}$ |
| 2476, 2740, | H | H | n-C$_3$H$_7$ | n-C$_7$H$_{15}$ |
| 2477, 2741, | F | H | n-C$_3$H$_7$ | H |
| 2478, 2742, | F | H | n-C$_3$H$_7$ | CH$_3$ |
| 2479, 2743, | F | H | n-C$_3$H$_7$ | C$_2$H$_5$ |
| 2480, 2744, | F | H | n-C$_3$H$_7$ | n-C$_3$H$_7$ |
| 2481, 2745, | F | H | n-C$_3$H$_7$ | n-C$_4$H$_9$ |
| 2482, 2746, | F | H | n-C$_3$H$_7$ | n-C$_5$H$_{11}$ |
| 2483, 2747, | F | H | n-C$_3$H$_7$ | n-C$_6$H$_{13}$ |
| 2484, 2748, | F | H | n-C$_3$H$_7$ | n-C$_7$H$_{15}$ |
| 2485, 2749, | F | F | n-C$_3$H$_7$ | n-C$_3$H$_7$ |
| 2486, 2750, | F | F | n-C$_3$H$_7$ | n-C$_4$H$_9$ |
| 2487, 2751, | F | F | n-C$_3$H$_7$ | n-C$_5$H$_{11}$ |
| 2488, 2752, | F | F | n-C$_3$H$_7$ | n-C$_6$H$_{13}$ |
| 2489, 2753, | F | F | n-C$_3$H$_7$ | n-C$_7$H$_{15}$ |
| 2490, 2754, | CF$_3$ | H | n-C$_3$H$_7$ | H |
| 2491, 2755, | CF$_3$ | H | n-C$_3$H$_7$ | CH$_3$ |
| 2492, 2756, | CF$_3$ | H | n-C$_3$H$_7$ | C$_2$H$_5$ |
| 2493, 2757, | CF$_3$ | H | n-C$_3$H$_7$ | n-C$_3$H$_7$ |
| 2494, 2758, | CF$_3$ | H | n-C$_3$H$_7$ | n-C$_4$H$_9$ |
| 2495, 2759, | CF$_3$ | H | n-C$_3$H$_7$ | n-C$_5$H$_{11}$ |
| 2496, 2760, | CF$_3$ | H | n-C$_3$H$_7$ | n-C$_6$H$_{13}$ |
| 2497, 2761, | CF$_3$ | H | n-C$_3$H$_7$ | n-C$_7$H$_{15}$ |
| 2498, 2762, | —OCF$_3$ | H | n-C$_3$H$_7$ | H |
| 2499, 2763, | —OCF$_3$ | H | n-C$_3$H$_7$ | CH$_3$ |
| 2500, 2764, | —OCF$_3$ | H | n-C$_3$H$_7$ | C$_2$H$_5$ |
| 2501, 2765, | —OCF$_3$ | H | n-C$_3$H$_7$ | n-C$_3$H$_7$ |
| 2502, 2766, | —OCF$_3$ | H | n-C$_3$H$_7$ | n-C$_4$H$_9$ |
| 2503, 2767, | —OCF$_3$ | H | n-C$_3$H$_7$ | n-C$_5$H$_{11}$ |
| 2504, 2768, | —OCF$_3$ | H | n-C$_3$H$_7$ | n-C$_6$H$_{13}$ |
| 2505, 2769, | —OCF$_3$ | H | n-C$_3$H$_7$ | n-C$_7$H$_{15}$ |
| 2506, 2770, | H | H | n-C$_4$H$_9$ | n-C$_4$H$_9$ |
| 2507, 2771, | H | H | n-C$_4$H$_9$ | n-C$_5$H$_{11}$ |
| 2508, 2772, | H | H | n-C$_4$H$_9$ | n-C$_6$H$_{13}$ |
| 2509, 2773, | H | H | n-C$_4$H$_9$ | n-C$_7$H$_{15}$ |
| 2510, 2774, | F | H | n-C$_4$H$_9$ | H |
| 2511, 2775, | F | H | n-C$_4$H$_9$ | CH$_3$ |
| 2512, 2776, | F | H | n-C$_4$H$_9$ | C$_2$H$_5$ |
| 2513, 2777, | F | H | n-C$_4$H$_9$ | n-C$_3$H$_7$ |
| 2514, 2778, | F | H | n-C$_4$H$_9$ | n-C$_4$H$_9$ |
| 2515, 2779, | F | H | n-C$_4$H$_9$ | n-C$_5$H$_{11}$ |
| 2516, 2780, | F | H | n-C$_4$H$_9$ | n-C$_6$H$_{13}$ |
| 2517, 2781, | F | H | n-C$_4$H$_9$ | n-C$_7$H$_{15}$ |
| 2518, 2782, | F | F | n-C$_4$H$_9$ | n-C$_4$H$_9$ |

-continued

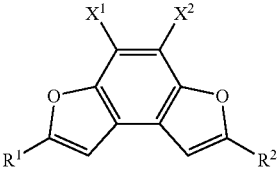

| Example No. | $X^1$ | $X^2$ | $R^1$ | $R^2$ |
|---|---|---|---|---|
| 2519, 2783, | F | F | n-$C_4H_9$ | n-$C_5H_{11}$ |
| 2520, 2784, | F | F | n-$C_4H_9$ | n-$C_6H_{13}$ |
| 2521, 2785, | F | F | n-$C_4H_9$ | n-$C_7H_{15}$ |
| 2522, 2786, | $CF_3$ | H | n-$C_4H_9$ | H |
| 2523, 2787, | $CF_3$ | H | n-$C_4H_9$ | $CH_3$ |
| 2524, 2788, | $CF_3$ | H | n-$C_4H_9$ | $C_2H_5$ |
| 2525, 2789, | $CF_3$ | H | n-$C_4H_9$ | n-$C_3H_7$ |
| 2526, 2790, | $CF_3$ | H | n-$C_4H_9$ | n-$C_4H_9$ |
| 2527, 2791, | $CF_3$ | H | n-$C_4H_9$ | n-$C_5H_{11}$ |
| 2528, 2792, | $CF_3$ | H | n-$C_4H_9$ | n-$C_6H_{13}$ |
| 2529, 2793, | $CF_3$ | H | n-$C_4H_9$ | n-$C_7H_{15}$ |
| 2530, 2794, | —$OCF_3$ | H | n-$C_4H_9$ | H |
| 2531, 2795, | —$OCF_3$ | H | n-$C_4H_9$ | $CH_3$ |
| 2532, 2796, | —$OCF_3$ | H | n-$C_4H_9$ | $C_2H_5$ |
| 2533, 2797, | —$OCF_3$ | H | n-$C_4H_9$ | n-$C_3H_7$ |
| 2534, 2798, | —$OCF_3$ | H | n-$C_4H_9$ | n-$C_4H_9$ |
| 2535, 2799, | —$OCF_3$ | H | n-$C_4H_9$ | n-$C_5H_{11}$ |
| 2536, 2800, | —$OCF_3$ | H | n-$C_4H_9$ | n-$C_6H_{13}$ |
| 2537, 2801, | —$OCF_3$ | H | n-$C_4H_9$ | n-$C_7H_{15}$ |
| 2538, 2802, | H | H | n-$C_5H_{11}$ | n-$C_5H_{11}$ |
| 2539, 2803, | H | H | n-$C_5H_{11}$ | n-$C_6H_{13}$ |
| 2540, 2804, | H | H | n-$C_5H_{11}$ | n-$C_7H_{15}$ |
| 2541, 2805, | F | H | n-$C_5H_{11}$ | H |
| 2542, 2806, | F | H | n-$C_5H_{11}$ | $CH_3$ |
| 2543, 2807, | F | H | n-$C_5H_{11}$ | $C_2H_5$ |
| 2544, 2808, | F | H | n-$C_5H_{11}$ | n-$C_3H_7$ |
| 2545, 2809, | F | H | n-$C_5H_{11}$ | n-$C_4H_9$ |
| 2546, 2810, | F | H | n-$C_5H_{11}$ | n-$C_5H_{11}$ |
| 2547, 2811, | F | H | n-$C_5H_{11}$ | n-$C_6H_{13}$ |
| 2548, 2812, | F | H | n-$C_5H_{11}$ | n-$C_7H_{15}$ |
| 2549, 2813, | F | F | n-$C_5H_{11}$ | n-$C_5H_{11}$ |
| 2550, 2814, | F | F | n-$C_5H_{11}$ | n-$C_6H_{13}$ |
| 2551, 2815, | F | F | n-$C_5H_{11}$ | n-$C_7H_{15}$ |
| 2552, 2816, | $CF_3$ | H | n-$C_5H_{11}$ | H |
| 2553, 2817, | $CF_3$ | H | n-$C_5H_{11}$ | $CH_3$ |
| 2554, 2818, | $CF_3$ | H | n-$C_5H_{11}$ | $C_2H_5$ |
| 2555, 2819, | $CF_3$ | H | n-$C_5H_{11}$ | n-$C_3H_7$ |
| 2556, 2820, | $CF_3$ | H | n-$C_5H_{11}$ | n-$C_4H_9$ |
| 2557, 2821, | $CF_3$ | H | n-$C_5H_{11}$ | n-$C_5H_{11}$ |
| 2558, 2822, | $CF_3$ | H | n-$C_5H_{11}$ | n-$C_6H_{13}$ |
| 2559, 2823, | $CF_3$ | H | n-$C_5H_{11}$ | n-$C_7H_{15}$ |
| 2560, 2824, | —$OCF_3$ | H | n-$C_5H_{11}$ | H |
| 2561, 2825, | —$OCF_3$ | H | n-$C_5H_{11}$ | $CH_3$ |
| 2562, 2826, | —$OCF_3$ | H | n-$C_5H_{11}$ | $C_2H_5$ |
| 2563, 2827, | —$OCF_3$ | H | n-$C_5H_{11}$ | n-$C_3H_7$ |
| 2564, 2828, | —$OCF_3$ | H | n-$C_5H_{11}$ | n-$C_4H_9$ |
| 2565, 2829, | —$OCF_3$ | H | n-$C_5H_{11}$ | n-$C_5H_{11}$ |
| 2566, 2830, | —$OCF_3$ | H | n-$C_5H_{11}$ | n-$C_6H_{13}$ |
| 2567, 2831, | —$OCF_3$ | H | n-$C_5H_{11}$ | n-$C_7H_{15}$ |
| 2568, 2832, | H | H | n-$C_6H_{13}$ | n-$C_6H_{13}$ |
| 2569, 2833, | H | H | n-$C_6H_{13}$ | n-$C_7H_{15}$ |
| 2570, 2834, | F | H | n-$C_6H_{13}$ | H |
| 2571, 2835, | F | H | n-$C_6H_{13}$ | $CH_3$ |
| 2572, 2836, | F | H | n-$C_6H_{13}$ | $C_2H_5$ |
| 2573, 2837, | F | H | n-$C_6H_{13}$ | n-$C_3H_7$ |
| 2574, 2838, | F | H | n-$C_6H_{13}$ | n-$C_4H_9$ |
| 2575, 2839, | F | H | n-$C_6H_{13}$ | n-$C_5H_{11}$ |
| 2576, 2840, | F | H | n-$C_6H_{13}$ | n-$C_6H_{13}$ |
| 2577, 2841, | F | H | n-$C_6H_{13}$ | n-$C_7H_{15}$ |
| 2578, 2842, | F | F | n-$C_6H_{13}$ | n-$C_6H_{13}$ |
| 2579, 2843, | F | F | n-$C_6H_{13}$ | n-$C_7H_{15}$ |
| 2580, 2844, | $CF_3$ | H | n-$C_6H_{13}$ | H |
| 2581, 2845, | $CF_3$ | H | n-$C_6H_{13}$ | $CH_3$ |
| 2582, 2846, | $CF_3$ | H | n-$C_6H_{13}$ | $C_2H_5$ |
| 2583, 2847, | $CF_3$ | H | n-$C_6H_{13}$ | n-$C_3H_7$ |
| 2584, 2848, | $CF_3$ | H | n-$C_6H_{13}$ | n-$C_4H_9$ |
| 2585, 2849, | $CF_3$ | H | n-$C_6H_{13}$ | n-$C_5H_{11}$ |
| 2586, 2850, | $CF_3$ | H | n-$C_6H_{13}$ | n-$C_6H_{13}$ |

-continued

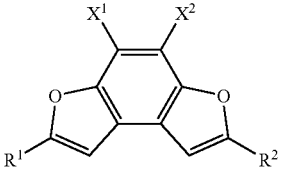

| Example No. | $X^1$ | $X^2$ | $R^1$ | $R^2$ |
|---|---|---|---|---|
| 2587, 2851, | $CF_3$ | H | n-$C_6H_{13}$ | n-$C_7H_{15}$ |
| 2588, 2852, | —$OCF_3$ | H | n-$C_6H_{13}$ | H |
| 2589, 2853, | —$OCF_3$ | H | n-$C_6H_{13}$ | $CH_3$ |
| 2590, 2854, | —$OCF_3$ | H | n-$C_6H_{13}$ | $C_2H_5$ |
| 2591, 2855, | —$OCF_3$ | H | n-$C_6H_{13}$ | n-$C_3H_7$ |
| 2592, 2856, | —$OCF_3$ | H | n-$C_6H_{13}$ | n-$C_4H_9$ |
| 2593, 2857, | —$OCF_3$ | H | n-$C_6H_{13}$ | n-$C_5H_{11}$ |
| 2594, 2858, | —$OCF_3$ | H | n-$C_6H_{13}$ | n-$C_6H_{13}$ |
| 2595, 2859, | —$OCF_3$ | H | n-$C_6H_{13}$ | n-$C_7H_{15}$ |
| 2596, 2860, | H | H | n-$C_7H_{15}$ | n-$C_7H_{15}$ |
| 2597, 2861, | F | H | n-$C_7H_{15}$ | H |
| 2598, 2862, | F | H | n-$C_7H_{15}$ | $CH_3$ |
| 2599, 2863, | F | H | n-$C_7H_{15}$ | $C_2H_5$ |
| 2600, 2864, | F | H | n-$C_7H_{15}$ | n-$C_3H_7$ |
| 2601, 2865, | F | H | n-$C_7H_{15}$ | n-$C_4H_9$ |
| 2602, 2866, | F | H | n-$C_7H_{15}$ | n-$C_5H_{11}$ |
| 2603, 2867, | F | H | n-$C_7H_{15}$ | n-$C_6H_{13}$ |
| 2604, 2868, | F | H | n-$C_7H_{15}$ | n-$C_7H_{15}$ |
| 2605, 2869, | F | F | n-$C_7H_{15}$ | n-$C_7H_{15}$ |
| 2606, 2870, | $CF_3$ | H | n-$C_7H_{15}$ | H |
| 2607, 2871, | $CF_3$ | H | n-$C_7H_{15}$ | $CH_3$ |
| 2608, 2872, | $CF_3$ | H | n-$C_7H_{15}$ | $C_2H_5$ |
| 2609, 2873, | $CF_3$ | H | n-$C_7H_{15}$ | n-$C_3H_7$ |
| 2610, 2874, | $CF_3$ | H | n-$C_7H_{15}$ | n-$C_4H_9$ |
| 2611, 2875, | $CF_3$ | H | n-$C_7H_{15}$ | n-$C_5H_{11}$ |
| 2612, 2876, | $CF_3$ | H | n-$C_7H_{15}$ | n-$C_6H_{13}$ |
| 2613, 2877, | $CF_3$ | H | n-$C_7H_{15}$ | n-$C_7H_{15}$ |
| 2614, 2878, | —$OCF_3$ | H | n-$C_7H_{15}$ | H |
| 2615, 2879, | —$OCF_3$ | H | n-$C_7H_{15}$ | $CH_3$ |
| 2616, 2880, | —$OCF_3$ | H | n-$C_7H_{15}$ | $C_2H_5$ |
| 2617, 2881, | —$OCF_3$ | H | n-$C_7H_{15}$ | n-$C_3H_7$ |
| 2618, 2882, | —$OCF_3$ | H | n-$C_7H_{15}$ | n-$C_4H_9$ |
| 2619, 2883, | —$OCF_3$ | H | n-$C_7H_{15}$ | n-$C_5H_{11}$ |
| 2620, 2884, | —$OCF_3$ | H | n-$C_7H_{15}$ | n-$C_6H_{13}$ |
| 2621, 2885, | —$OCF_3$ | H | n-$C_7H_{15}$ | n-$C_7H_{15}$ |

Examples 2886-2949

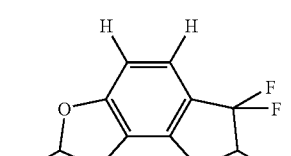

Examples 2950-3013

Examples 3014-3077

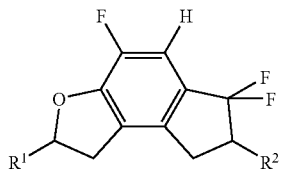

Examples 3078-3141

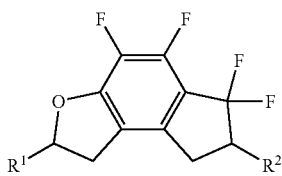

| Example No. | R¹ | R² |
|---|---|---|
| 2886, 2950, 3014, 3078, | H | H |
| 2887, 2951, 3015, 3079, | H | $CH_3$ |
| 2888, 2952, 3016, 3080, | H | $C_2H_5$ |
| 2889, 2953, 3017, 3081, | H | n-$C_3H_7$ |
| 2890, 2954, 3018, 3082, | H | n-$C_4H_9$ |
| 2891, 2955, 3019, 3083, | H | n-$C_5H_{11}$ |
| 2892, 2956, 3020, 3084, | H | n-$C_6H_{13}$ |
| 2893, 2957, 3021, 3085, | H | n-$C_7H_{15}$ |
| 2894, 2958, 3022, 3086, | $CH_3$ | H |
| 2895, 2959, 3023, 3087, | $CH_3$ | $CH_3$ |
| 2896, 2960, 3024, 3088, | $CH_3$ | $C_2H_5$ |
| 2897, 2961, 3025, 3089, | $CH_3$ | n-$C_3H_7$ |
| 2898, 2962, 3026, 3090, | $CH_3$ | n-$C_4H_9$ |
| 2899, 2963, 3027, 3091, | $CH_3$ | n-$C_5H_{11}$ |
| 2900, 2964, 3028, 3092, | $CH_3$ | n-$C_6H_{13}$ |
| 2901, 2965, 3029, 3093, | $CH_3$ | n-$C_7H_{15}$ |
| 2902, 2966, 3030, 3094, | $C_2H_5$ | H |
| 2903, 2967, 3031, 3095, | $C_2H_5$ | $CH_3$ |
| 2904, 2968, 3032, 3096, | $C_2H_5$ | $C_2H_5$ |
| 2905, 2969, 3033, 3097, | $C_2H_5$ | n-$C_3H_7$ |
| 2906, 2970, 3034, 3098, | $C_2H_5$ | n-$C_4H_9$ |
| 2907, 2971, 3035, 3099, | $C_2H_5$ | n-$C_5H_{11}$ |
| 2908, 2972, 3036, 3100, | $C_2H_5$ | n-$C_6H_{13}$ |
| 2909, 2973, 3037, 3101, | $C_2H_5$ | n-$C_7H_{15}$ |
| 2910, 2974, 3038, 3102, | n-$C_3H_7$ | H |
| 2911, 2975, 3039, 3103, | n-$C_3H_7$ | $CH_3$ |
| 2912, 2976, 3040, 3104, | n-$C_3H_7$ | $C_2H_5$ |
| 2913, 2977, 3041, 3105, | n-$C_3H_7$ | n-$C_3H_7$ |
| 2914, 2978, 3042, 3106, | n-$C_3H_7$ | n-$C_4H_9$ |
| 2915, 2979, 3043, 3107, | n-$C_3H_7$ | n-$C_5H_{11}$ |
| 2916, 2980, 3044, 3108, | n-$C_3H_7$ | n-$C_6H_{13}$ |
| 2917, 2981, 3045, 3109, | n-$C_3H_7$ | n-$C_7H_{15}$ |
| 2918, 2982, 3046, 3110, | n-$C_4H_9$ | H |
| 2919, 2983, 3047, 3111, | n-$C_4H_9$ | $CH_3$ |
| 2920, 2984, 3048, 3112, | n-$C_4H_9$ | $C_2H_5$ |
| 2921, 2985, 3049, 3113, | n-$C_4H_9$ | n-$C_3H_7$ |
| 2922, 2986, 3050, 3114, | n-$C_4H_9$ | n-$C_4H_9$ |
| 2923, 2987, 3051, 3115, | n-$C_4H_9$ | n-$C_5H_{11}$ |
| 2924, 2988, 3052, 3116, | n-$C_4H_9$ | n-$C_6H_{13}$ |
| 2925, 2989, 3053, 3117, | n-$C_4H_9$ | n-$C_7H_{15}$ |
| 2926, 2990, 3054, 3118, | n-$C_5H_{11}$ | H |
| 2927, 2991, 3055, 3119, | n-$C_5H_{11}$ | $CH_3$ |
| 2928, 2992, 3056, 3120, | n-$C_5H_{11}$ | $C_2H_5$ |
| 2929, 2993, 3057, 3121, | n-$C_5H_{11}$ | n-$C_3H_7$ |
| 2930, 2994, 3058, 3122, | n-$C_5H_{11}$ | n-$C_4H_9$ |
| 2931, 2995, 3059, 3123, | n-$C_5H_{11}$ | n-$C_5H_{11}$ |
| 2932, 2996, 3060, 3124, | n-$C_5H_{11}$ | n-$C_6H_{13}$ |
| 2933, 2997, 3061, 3125, | n-$C_5H_{11}$ | n-$C_7H_{15}$ |
| 2934, 2998, 3062, 3126, | n-$C_6H_{13}$ | H |
| 2935, 2999, 3063, 3127, | n-$C_6H_{13}$ | $CH_3$ |
| 2936, 3000, 3064, 3128, | n-$C_6H_{13}$ | $C_2H_5$ |
| 2937, 3001, 3065, 3129, | n-$C_6H_{13}$ | n-$C_3H_7$ |
| 2938, 3002, 3066, 3130, | n-$C_6H_{13}$ | n-$C_4H_9$ |
| 2939, 3003, 3067, 3131, | n-$C_6H_{13}$ | n-$C_5H_{11}$ |
| 2940, 3004, 3068, 3132, | n-$C_6H_{13}$ | n-$C_6H_{13}$ |
| 2941, 3005, 3069, 3133, | n-$C_6H_{13}$ | n-$C_7H_{15}$ |
| 2942, 3006, 3070, 3134, | n-$C_7H_{15}$ | H |
| 2943, 3007, 3071, 3135, | n-$C_7H_{15}$ | $CH_3$ |
| 2944, 3008, 3072, 3136, | n-$C_7H_{15}$ | $C_2H_5$ |
| 2945, 3009, 3073, 3137, | n-$C_7H_{15}$ | n-$C_3H_7$ |
| 2946, 3010, 3074, 3138, | n-$C_7H_{15}$ | n-$C_4H_9$ |
| 2947, 3011, 3075, 3139, | n-$C_7H_{15}$ | n-$C_5H_{11}$ |
| 2948, 3012, 3076, 3140, | n-$C_7H_{15}$ | n-$C_6H_{13}$ |
| 2949, 3013, 3077, 3141, | n-$C_7H_{15}$ | n-$C_7H_{15}$ |

Examples 3142-3205

Examples 3206-3269

Examples 3270-3333

Examples 3334-3397

Examples 3398-3461

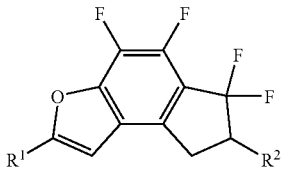

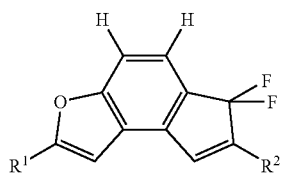

Examples 3462-3525

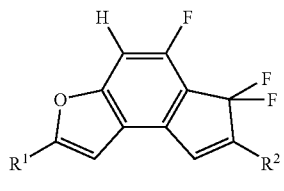

Examples 3526-3589

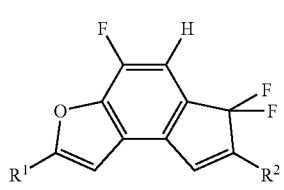

Examples 3590-3653

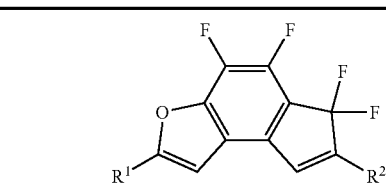

| Example No. | R¹ | R² |
|---|---|---|
| 3142, 3206, 3270, 3334, | H | H |
| 3143, 3207, 3271, 3335, | H | CH$_3$ |
| 3144, 3208, 3272, 3336, | H | C$_2$H$_5$ |
| 3145, 3209, 3273, 3337, | H | n-C$_3$H$_7$ |
| 3146, 3210, 3274, 3338, | H | n-C$_4$H$_9$ |
| 3147, 3211, 3275, 3339, | H | n-C$_5$H$_{11}$ |
| 3148, 3212, 3276, 3340, | H | n-C$_6$H$_{13}$ |
| 3149, 3213, 3277, 3341, | H | n-C$_7$H$_{15}$ |
| 3150, 3214, 3278, 3342, | CH$_3$ | H |
| 3151, 3215, 3279, 3343, | CH$_3$ | CH$_3$ |
| 3152, 3216, 3280, 3344, | CH$_3$ | C$_2$H$_5$ |
| 3153, 3217, 3281, 3345, | CH$_3$ | n-C$_3$H$_7$ |
| 3154, 3218, 3282, 3346, | CH$_3$ | n-C$_4$H$_9$ |
| 3155, 3219, 3283, 3347, | CH$_3$ | n-C$_5$H$_{11}$ |
| 3156, 3220, 3284, 3348, | CH$_3$ | n-C$_6$H$_{13}$ |
| 3157, 3221, 3285, 3349, | CH$_3$ | n-C$_7$H$_{15}$ |
| 3158, 3222, 3286, 3350, | C$_2$H$_5$ | H |
| 3159, 3223, 3287, 3351, | C$_2$H$_5$ | CH$_3$ |
| 3160, 3224, 3288, 3352, | C$_2$H$_5$ | C$_2$H$_5$ |
| 3161, 3225, 3289, 3353, | C$_2$H$_5$ | n-C$_3$H$_7$ |
| 3162, 3226, 3290, 3354, | C$_2$H$_5$ | n-C$_4$H$_9$ |
| 3163, 3227, 3291, 3355, | C$_2$H$_5$ | n-C$_5$H$_{11}$ |
| 3164, 3228, 3292, 3356, | C$_2$H$_5$ | n-C$_6$H$_{13}$ |
| 3165, 3229, 3293, 3357, | C$_2$H$_5$ | n-C$_7$H$_{15}$ |
| 3166, 3230, 3294, 3358, | n-C$_3$H$_7$ | H |
| 3167, 3231, 3295, 3359, | n-C$_3$H$_7$ | CH$_3$ |
| 3168, 3232, 3296, 3360, | n-C$_3$H$_7$ | C$_2$H$_5$ |
| 3169, 3233, 3297, 3361, | n-C$_3$H$_7$ | n-C$_3$H$_7$ |
| 3170, 3234, 3298, 3362, | n-C$_3$H$_7$ | n-C$_4$H$_9$ |
| 3171, 3235, 3299, 3363, | n-C$_3$H$_7$ | n-C$_5$H$_{11}$ |
| 3172, 3236, 3300, 3364, | n-C$_3$H$_7$ | n-C$_6$H$_{13}$ |
| 3173, 3237, 3301, 3365, | n-C$_3$H$_7$ | n-C$_7$H$_{15}$ |
| 3174, 3238, 3302, 3366, | n-C$_4$H$_9$ | H |
| 3175, 3239, 3303, 3367, | n-C$_4$H$_9$ | CH$_3$ |
| 3176, 3240, 3304, 3368, | n-C$_4$H$_9$ | C$_2$H$_5$ |
| 3177, 3241, 3305, 3369, | n-C$_4$H$_9$ | n-C$_3$H$_7$ |
| 3178, 3242, 3306, 3370, | n-C$_4$H$_9$ | n-C$_4$H$_9$ |
| 3179, 3243, 3307, 3371, | n-C$_4$H$_9$ | n-C$_5$H$_{11}$ |
| 3180, 3244, 3308, 3372, | n-C$_4$H$_9$ | n-C$_6$H$_{13}$ |
| 3181, 3245, 3309, 3373, | n-C$_4$H$_9$ | n-C$_7$H$_{15}$ |
| 3182, 3246, 3310, 3374, | n-C$_5$H$_{11}$ | H |
| 3183, 3247, 3311, 3375, | n-C$_5$H$_{11}$ | CH$_3$ |
| 3184, 3248, 3312, 3376, | n-C$_5$H$_{11}$ | C$_2$H$_5$ |
| 3185, 3249, 3313, 3377, | n-C$_5$H$_{11}$ | n-C$_3$H$_7$ |
| 3186, 3250, 3314, 3378, | n-C$_5$H$_{11}$ | n-C$_4$H$_9$ |
| 3187, 3251, 3315, 3379, | n-C$_5$H$_{11}$ | n-C$_5$H$_{11}$ |
| 3188, 3252, 3316, 3380, | n-C$_5$H$_{11}$ | n-C$_6$H$_{13}$ |
| 3189, 3253, 3317, 3381, | n-C$_5$H$_{11}$ | n-C$_7$H$_{15}$ |
| 3190, 3254, 3318, 3382, | n-C$_6$H$_{13}$ | H |
| 3191, 3255, 3319, 3383, | n-C$_6$H$_{13}$ | CH$_3$ |
| 3192, 3256, 3320, 3384, | n-C$_6$H$_{13}$ | C$_2$H$_5$ |
| 3193, 3257, 3321, 3385, | n-C$_6$H$_{13}$ | n-C$_3$H$_7$ |
| 3194, 3258, 3322, 3386, | n-C$_6$H$_{13}$ | n-C$_4$H$_9$ |
| 3195, 3259, 3323, 3387, | n-C$_6$H$_{13}$ | n-C$_5$H$_{11}$ |
| 3196, 3260, 3324, 3388, | n-C$_6$H$_{13}$ | n-C$_6$H$_{13}$ |
| 3197, 3261, 3325, 3389, | n-C$_6$H$_{13}$ | n-C$_7$H$_{15}$ |
| 3198, 3262, 3326, 3390, | n-C$_7$H$_{15}$ | H |
| 3199, 3263, 3327, 3391, | n-C$_7$H$_{15}$ | CH$_3$ |
| 3200, 3264, 3328, 3392, | n-C$_7$H$_{15}$ | C$_2$H$_5$ |
| 3201, 3265, 3329, 3393, | n-C$_7$H$_{15}$ | n-C$_3$H$_7$ |
| 3202, 3266, 3330, 3394, | n-C$_7$H$_{15}$ | n-C$_4$H$_9$ |
| 3203, 3267, 3331, 3395, | n-C$_7$H$_{15}$ | n-C$_5$H$_{11}$ |
| 3204, 3268, 3332, 3396, | n-C$_7$H$_{15}$ | n-C$_6$H$_{13}$ |
| 3205, 3269, 3333, 3397, | n-C$_7$H$_{15}$ | n-C$_7$H$_{15}$ |

| Example No. | R¹ | R² |
|---|---|---|
| 3398, 3462, 3526, 3590, | H | H |
| 3399, 3463, 3527, 3591, | H | CH$_3$ |
| 3400, 3464, 3528, 3592, | H | C$_2$H$_5$ |
| 3401, 3465, 3529, 3593, | H | n-C$_3$H$_7$ |
| 3402, 3466, 3530, 3594, | H | n-C$_4$H$_9$ |
| 3403, 3467, 3531, 3595, | H | n-C$_5$H$_{11}$ |
| 3404, 3468, 3532, 3596, | H | n-C$_6$H$_{13}$ |
| 3405, 3469, 3533, 3597, | H | n-C$_7$H$_{15}$ |
| 3406, 3470, 3534, 3598, | CH$_3$ | H |
| 3407, 3471, 3535, 3599, | CH$_3$ | CH$_3$ |
| 3408, 3472, 3536, 3600, | CH$_3$ | C$_2$H$_5$ |
| 3409, 3473, 3537, 3601, | CH$_3$ | n-C$_3$H$_7$ |
| 3410, 3474, 3538, 3602, | CH$_3$ | n-C$_4$H$_9$ |
| 3411, 3475, 3539, 3603, | CH$_3$ | n-C$_5$H$_{11}$ |
| 3412, 3476, 3540, 3604, | CH$_3$ | n-C$_6$H$_{13}$ |
| 3413, 3477, 3541, 3605, | CH$_3$ | n-C$_7$H$_{15}$ |
| 3414, 3478, 3542, 3606, | C$_2$H$_5$ | H |
| 3415, 3479, 3543, 3607, | C$_2$H$_5$ | CH$_3$ |

-continued

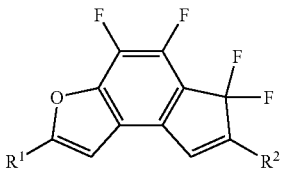

| Example No. | R¹ | R² |
|---|---|---|
| 3416, 3480, 3544, 3608, | $C_2H_5$ | $C_2H_5$ |
| 3417, 3481, 3545, 3609, | $C_2H_5$ | $n-C_3H_7$ |
| 3418, 3482, 3546, 3610, | $C_2H_5$ | $n-C_4H_9$ |
| 3419, 3483, 3547, 3611, | $C_2H_5$ | $n-C_5H_{11}$ |
| 3420, 3484, 3548, 3612, | $C_2H_5$ | $n-C_6H_{13}$ |
| 3421, 3485, 3549, 3613, | $C_2H_5$ | $n-C_7H_{15}$ |
| 3422, 3486, 3550, 3614, | $n-C_3H_7$ | H |
| 3423, 3487, 3551, 3615, | $n-C_3H_7$ | $CH_3$ |
| 3424, 3488, 3552, 3616, | $n-C_3H_7$ | $C_2H_5$ |
| 3425, 3489, 3553, 3617, | $n-C_3H_7$ | $n-C_3H_7$ |
| 3426, 3490, 3554, 3618, | $n-C_3H_7$ | $n-C_4H_9$ |
| 3427, 3491, 3555, 3619, | $n-C_3H_7$ | $n-C_5H_{11}$ |
| 3428, 3492, 3556, 3620, | $n-C_3H_7$ | $n-C_6H_{13}$ |
| 3429, 3493, 3557, 3621, | $n-C_3H_7$ | $n-C_7H_{15}$ |
| 3430, 3494, 3558, 3622, | $n-C_4H_9$ | H |
| 3431, 3495, 3559, 3623, | $n-C_4H_9$ | $CH_3$ |
| 3432, 3496, 3560, 3624, | $n-C_4H_9$ | $C_2H_5$ |
| 3433, 3497, 3561, 3625, | $n-C_4H_9$ | $n-C_3H_7$ |
| 3434, 3498, 3562, 3626, | $n-C_4H_9$ | $n-C_4H_9$ |
| 3435, 3499, 3563, 3627, | $n-C_4H_9$ | $n-C_5H_{11}$ |
| 3436, 3500, 3564, 3628, | $n-C_4H_9$ | $n-C_6H_{13}$ |
| 3437, 3501, 3565, 3629, | $n-C_4H_9$ | $n-C_7H_{15}$ |
| 3438, 3502, 3566, 3630, | $n-C_5H_{11}$ | H |
| 3439, 3503, 3567, 3631, | $n-C_5H_{11}$ | $CH_3$ |
| 3440, 3504, 3568, 3632, | $n-C_5H_{11}$ | $C_2H_5$ |
| 3441, 3505, 3569, 3633, | $n-C_5H_{11}$ | $n-C_3H_7$ |
| 3442, 3506, 3570, 3634, | $n-C_5H_{11}$ | $n-C_4H_9$ |
| 3443, 3507, 3571, 3635, | $n-C_5H_{11}$ | $n-C_5H_{11}$ |
| 3444, 3508, 3572, 3636, | $n-C_5H_{11}$ | $n-C_6H_{13}$ |
| 3445, 3509, 3573, 3637, | $n-C_5H_{11}$ | $n-C_7H_{15}$ |
| 3446, 3510, 3574, 3638, | $n-C_6H_{13}$ | H |
| 3447, 3511, 3575, 3639, | $n-C_6H_{13}$ | $CH_3$ |
| 3448, 3512, 3576, 3640, | $n-C_6H_{13}$ | $C_2H_5$ |
| 3449, 3513, 3577, 3641, | $n-C_6H_{13}$ | $n-C_3H_7$ |
| 3450, 3514, 3578, 3642, | $n-C_6H_{13}$ | $n-C_4H_9$ |
| 3451, 3515, 3579, 3643, | $n-C_6H_{13}$ | $n-C_5H_{11}$ |
| 3452, 3516, 3580, 3644, | $n-C_6H_{13}$ | $n-C_6H_{13}$ |
| 3453, 3517, 3581, 3645, | $n-C_6H_{13}$ | $n-C_7H_{15}$ |
| 3454, 3518, 3582, 3646, | $n-C_7H_{15}$ | H |
| 3455, 3519, 3583, 3647, | $n-C_7H_{15}$ | $CH_3$ |
| 3456, 3520, 3584, 3648, | $n-C_7H_{15}$ | $C_2H_5$ |
| 3457, 3521, 3585, 3649, | $n-C_7H_{15}$ | $n-C_3H_7$ |
| 3458, 3522, 3586, 3650, | $n-C_7H_{15}$ | $n-C_4H_9$ |
| 3459, 3523, 3587, 3651, | $n-C_7H_{15}$ | $n-C_5H_{11}$ |
| 3460, 3524, 3588, 3652, | $n-C_7H_{15}$ | $n-C_6H_{13}$ |
| 3461, 3525, 3589, 3653, | $n-C_7H_{15}$ | $n-C_7H_{15}$ |

Examples 3654-3912

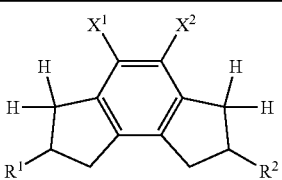

| Example No. | X¹ | X² | R¹ | R² |
|---|---|---|---|---|
| 3654, | H | H | H | $CH_3$ |
| 3655, | H | H | H | $C_2H_5$ |

-continued

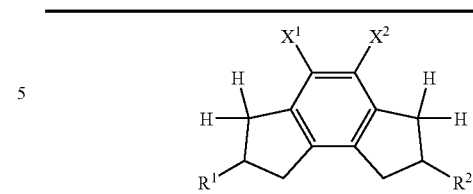

| Example No. | X¹ | X² | R¹ | R² |
|---|---|---|---|---|
| 3656, | H | H | H | $n-C_3H_7$ |
| 3657, | H | H | H | $n-C_4H_9$ |
| 3658, | H | H | H | $n-C_5H_{11}$ |
| 3659, | H | H | H | $n-C_6H_{13}$ |
| 3660, | H | H | H | $n-C_7H_{15}$ |
| 3661, | F | H | H | $CH_3$ |
| 3662, | F | H | H | $C_2H_5$ |
| 3663, | F | H | H | $n-C_3H_7$ |
| 3664, | F | H | H | $n-C_4H_9$ |
| 3665, | F | H | H | $n-C_5H_{11}$ |
| 3666, | F | H | H | $n-C_6H_{13}$ |
| 3667, | F | H | H | $n-C_7H_{15}$ |
| 3668, | H | F | H | $CH_3$ |
| 3669, | H | F | H | $C_2H_5$ |
| 3670, | H | F | H | $n-C_3H_7$ |
| 3671, | H | F | H | $n-C_4H_9$ |
| 3672, | H | F | H | $n-C_5H_{11}$ |
| 3673, | H | F | H | $n-C_6H_{13}$ |
| 3674, | H | F | H | $n-C_7H_{15}$ |
| 3675, | F | F | H | $CH_3$ |
| 3676, | F | F | H | $C_2H_5$ |
| 3677, | F | F | H | $n-C_3H_7$ |
| 3678, | F | F | H | $n-C_4H_9$ |
| 3679, | F | F | H | $n-C_5H_{11}$ |
| 3680, | F | F | H | $n-C_6H_{13}$ |
| 3681, | F | F | H | $n-C_7H_{15}$ |
| 3682, | $CF_3$ | H | H | $CH_3$ |
| 3683, | $CF_3$ | H | H | $C_2H_5$ |
| 3684, | $CF_3$ | H | H | $n-C_3H_7$ |
| 3685, | $CF_3$ | H | H | $n-C_4H_9$ |
| 3686, | $CF_3$ | H | H | $n-C_5H_{11}$ |
| 3687, | $CF_3$ | H | H | $n-C_6H_{13}$ |
| 3688, | $CF_3$ | H | H | $n-C_7H_{15}$ |
| 3689, | H | $CF_3$ | H | $CH_3$ |
| 3690, | H | $CF_3$ | H | $C_2H_5$ |
| 3691, | H | $CF_3$ | H | $n-C_3H_7$ |
| 3692, | H | $CF_3$ | H | $n-C_4H_9$ |
| 3693, | H | $CF_3$ | H | $n-C_5H_{11}$ |
| 3694, | H | $CF_3$ | H | $n-C_6H_{13}$ |
| 3695, | H | $CF_3$ | H | $n-C_7H_{15}$ |
| 3696, | —$OCF_3$ | H | H | $CH_3$ |
| 3697, | —$OCF_3$ | H | H | $C_2H_5$ |
| 3698, | —$OCF_3$ | H | H | $n-C_3H_7$ |
| 3699, | —$OCF_3$ | H | H | $n-C_4H_9$ |
| 3700, | —$OCF_3$ | H | H | $n-C_5H_{11}$ |
| 3701, | —$OCF_3$ | H | H | $n-C_6H_{13}$ |
| 3702, | —$OCF_3$ | H | H | $n-C_7H_{15}$ |
| 3703, | H | —$OCF_3$ | H | $CH_3$ |
| 3704, | H | —$OCF_3$ | H | $C_2H_5$ |
| 3705, | H | —$OCF_3$ | H | $n-C_3H_7$ |
| 3706, | H | —$OCF_3$ | H | $n-C_4H_9$ |
| 3707, | H | —$OCF_3$ | H | $n-C_5H_{11}$ |
| 3708, | H | —$OCF_3$ | H | $n-C_6H_{13}$ |
| 3709, | H | —$OCF_3$ | H | $n-C_7H_{15}$ |
| 3710, | H | H | $CH_3$ | $CH_3$ |
| 3711, | H | H | $CH_3$ | $C_2H_5$ |
| 3712, | H | H | $CH_3$ | $n-C_3H_7$ |
| 3713, | H | H | $CH_3$ | $n-C_4H_9$ |
| 3714, | H | H | $CH_3$ | $n-C_5H_{11}$ |
| 3715, | H | H | $CH_3$ | $n-C_6H_{13}$ |
| 3716, | H | H | $CH_3$ | $n-C_7H_{15}$ |
| 3717, | F | H | $CH_3$ | $CH_3$ |
| 3718, | F | H | $CH_3$ | $C_2H_5$ |
| 3719, | F | H | $CH_3$ | $n-C_3H_7$ |
| 3720, | F | H | $CH_3$ | $n-C_4H_9$ |
| 3721, | F | H | $CH_3$ | $n-C_5H_{11}$ |

-continued

| Example No. | X¹ | X² | R¹ | R² |
|---|---|---|---|---|
| 3722, | F | H | CH$_3$ | n-C$_6$H$_{13}$ |
| 3723, | F | H | CH$_3$ | n-C$_7$H$_{15}$ |
| 3724, | F | F | CH$_3$ | CH$_3$ |
| 3725, | F | F | CH$_3$ | C$_2$H$_5$ |
| 3726, | F | F | CH$_3$ | n-C$_3$H$_7$ |
| 3727, | F | F | CH$_3$ | n-C$_4$H$_9$ |
| 3728, | F | F | CH$_3$ | n-C$_5$H$_{11}$ |
| 3729, | F | F | CH$_3$ | n-C$_6$H$_{13}$ |
| 3730, | F | F | CH$_3$ | n-C$_7$H$_{15}$ |
| 3731, | CF$_3$ | H | CH$_3$ | CH$_3$ |
| 3732, | CF$_3$ | H | CH$_3$ | C$_2$H$_5$ |
| 3733, | CF$_3$ | H | CH$_3$ | n-C$_3$H$_7$ |
| 3734, | CF$_3$ | H | CH$_3$ | n-C$_4$H$_9$ |
| 3735, | CF$_3$ | H | CH$_3$ | n-C$_5$H$_{11}$ |
| 3736, | CF$_3$ | H | CH$_3$ | n-C$_6$H$_{13}$ |
| 3737, | CF$_3$ | H | CH$_3$ | n-C$_7$H$_{15}$ |
| 3738, | —OCF$_3$ | H | CH$_3$ | CH$_3$ |
| 3739, | —OCF$_3$ | H | CH$_3$ | C$_2$H$_5$ |
| 3740, | —OCF$_3$ | H | CH$_3$ | n-C$_3$H$_7$ |
| 3741, | —OCF$_3$ | H | CH$_3$ | n-C$_4$H$_9$ |
| 3742, | —OCF$_3$ | H | CH$_3$ | n-C$_5$H$_{11}$ |
| 3743, | —OCF$_3$ | H | CH$_3$ | n-C$_6$H$_{13}$ |
| 3744, | —OCF$_3$ | H | CH$_3$ | n-C$_7$H$_{15}$ |
| 3745, | H | H | C$_2$H$_5$ | C$_2$H$_5$ |
| 3746, | H | H | C$_2$H$_5$ | n-C$_3$H$_7$ |
| 3747, | H | H | C$_2$H$_5$ | n-C$_4$H$_9$ |
| 3748, | H | H | C$_2$H$_5$ | n-C$_5$H$_{11}$ |
| 3749, | H | H | C$_2$H$_5$ | n-C$_6$H$_{13}$ |
| 3750, | H | H | C$_2$H$_5$ | n-C$_7$H$_{15}$ |
| 3751, | F | H | C$_2$H$_5$ | CH$_3$ |
| 3752, | F | H | C$_2$H$_5$ | C$_2$H$_5$ |
| 3753, | F | H | C$_2$H$_5$ | n-C$_3$H$_7$ |
| 3754, | F | H | C$_2$H$_5$ | n-C$_4$H$_9$ |
| 3755, | F | H | C$_2$H$_5$ | n-C$_5$H$_{11}$ |
| 3756, | F | H | C$_2$H$_5$ | n-C$_6$H$_{13}$ |
| 3757, | F | H | C$_2$H$_5$ | n-C$_7$H$_{15}$ |
| 3758, | F | F | C$_2$H$_5$ | C$_2$H$_5$ |
| 3759, | F | F | C$_2$H$_5$ | n-C$_3$H$_7$ |
| 3760, | F | F | C$_2$H$_5$ | n-C$_4$H$_9$ |
| 3761, | F | F | C$_2$H$_5$ | n-C$_5$H$_{11}$ |
| 3762, | F | F | C$_2$H$_5$ | n-C$_6$H$_{13}$ |
| 3763, | F | F | C$_2$H$_5$ | n-C$_7$H$_{15}$ |
| 3764, | CF$_3$ | H | C$_2$H$_5$ | CH$_3$ |
| 3765, | CF$_3$ | H | C$_2$H$_5$ | C$_2$H$_5$ |
| 3766, | CF$_3$ | H | C$_2$H$_5$ | n-C$_3$H$_7$ |
| 3767, | CF$_3$ | H | C$_2$H$_5$ | n-C$_4$H$_9$ |
| 3768, | CF$_3$ | H | C$_2$H$_5$ | n-C$_5$H$_{11}$ |
| 3769, | CF$_3$ | H | C$_2$H$_5$ | n-C$_6$H$_{13}$ |
| 3770, | CF$_3$ | H | C$_2$H$_5$ | n-C$_7$H$_{15}$ |
| 3771, | —OCF$_3$ | H | C$_2$H$_5$ | CH$_3$ |
| 3772, | —OCF$_3$ | H | C$_2$H$_5$ | C$_2$H$_5$ |
| 3773, | —OCF$_3$ | H | C$_2$H$_5$ | n-C$_3$H$_7$ |
| 3774, | —OCF$_3$ | H | C$_2$H$_5$ | n-C$_4$H$_9$ |
| 3775, | —OCF$_3$ | H | C$_2$H$_5$ | n-C$_5$H$_{11}$ |
| 3776, | —OCF$_3$ | H | C$_2$H$_5$ | n-C$_6$H$_{13}$ |
| 3777, | —OCF$_3$ | H | C$_2$H$_5$ | n-C$_7$H$_{15}$ |
| 3778, | H | H | n-C$_3$H$_7$ | n-C$_3$H$_7$ |
| 3779, | H | H | n-C$_3$H$_7$ | n-C$_4$H$_9$ |
| 3780, | H | H | n-C$_3$H$_7$ | n-C$_5$H$_{11}$ |
| 3781, | H | H | n-C$_3$H$_7$ | n-C$_6$H$_{13}$ |
| 3782, | H | H | n-C$_3$H$_7$ | n-C$_7$H$_{15}$ |
| 3783, | F | H | n-C$_3$H$_7$ | CH$_3$ |
| 3784, | F | H | n-C$_3$H$_7$ | C$_2$H$_5$ |
| 3785, | F | H | n-C$_3$H$_7$ | n-C$_3$H$_7$ |
| 3786, | F | H | n-C$_3$H$_7$ | n-C$_4$H$_9$ |
| 3787, | F | H | n-C$_3$H$_7$ | n-C$_5$H$_{11}$ |
| 3788, | F | H | n-C$_3$H$_7$ | n-C$_6$H$_{13}$ |
| 3789, | F | H | n-C$_3$H$_7$ | n-C$_7$H$_{15}$ |
| 3790, | F | F | n-C$_3$H$_7$ | n-C$_3$H$_7$ |
| 3791, | F | F | n-C$_3$H$_7$ | n-C$_4$H$_9$ |
| 3792, | F | F | n-C$_3$H$_7$ | n-C$_5$H$_{11}$ |
| 3793, | F | F | n-C$_3$H$_7$ | n-C$_6$H$_{13}$ |
| 3794, | F | F | n-C$_3$H$_7$ | n-C$_7$H$_{15}$ |
| 3795, | CF$_3$ | H | n-C$_3$H$_7$ | CH$_3$ |
| 3796, | CF$_3$ | H | n-C$_3$H$_7$ | C$_2$H$_5$ |
| 3797, | CF$_3$ | H | n-C$_3$H$_7$ | n-C$_3$H$_7$ |
| 3798, | CF$_3$ | H | n-C$_3$H$_7$ | n-C$_4$H$_9$ |
| 3799, | CF$_3$ | H | n-C$_3$H$_7$ | n-C$_5$H$_{11}$ |
| 3800, | CF$_3$ | H | n-C$_3$H$_7$ | n-C$_6$H$_{13}$ |
| 3801, | CF$_3$ | H | n-C$_3$H$_7$ | n-C$_7$H$_{15}$ |
| 3802, | —OCF$_3$ | H | n-C$_3$H$_7$ | CH$_3$ |
| 3803, | —OCF$_3$ | H | n-C$_3$H$_7$ | C$_2$H$_5$ |
| 3804, | —OCF$_3$ | H | n-C$_3$H$_7$ | n-C$_3$H$_7$ |
| 3805, | —OCF$_3$ | H | n-C$_3$H$_7$ | n-C$_4$H$_9$ |
| 3806, | —OCF$_3$ | H | n-C$_3$H$_7$ | n-C$_5$H$_{11}$ |
| 3807, | —OCF$_3$ | H | n-C$_3$H$_7$ | n-C$_6$H$_{13}$ |
| 3808, | —OCF$_3$ | H | n-C$_3$H$_7$ | n-C$_7$H$_{15}$ |
| 3809, | H | H | n-C$_4$H$_9$ | n-C$_4$H$_9$ |
| 3810, | H | H | n-C$_4$H$_9$ | n-C$_5$H$_{11}$ |
| 3811, | H | H | n-C$_4$H$_9$ | n-C$_6$H$_{13}$ |
| 3812, | H | H | n-C$_4$H$_9$ | n-C$_7$H$_{15}$ |
| 3813, | F | H | n-C$_4$H$_9$ | CH$_3$ |
| 3814, | F | H | n-C$_4$H$_9$ | C$_2$H$_5$ |
| 3815, | F | H | n-C$_4$H$_9$ | n-C$_3$H$_7$ |
| 3816, | F | H | n-C$_4$H$_9$ | n-C$_4$H$_9$ |
| 3817, | F | H | n-C$_4$H$_9$ | n-C$_5$H$_{11}$ |
| 3818, | F | H | n-C$_4$H$_9$ | n-C$_6$H$_{13}$ |
| 3819, | F | H | n-C$_4$H$_9$ | n-C$_7$H$_{15}$ |
| 3820, | F | F | n-C$_4$H$_9$ | n-C$_4$H$_9$ |
| 3821, | F | F | n-C$_4$H$_9$ | n-C$_5$H$_{11}$ |
| 3822, | F | F | n-C$_4$H$_9$ | n-C$_6$H$_{13}$ |
| 3823, | F | F | n-C$_4$H$_9$ | n-C$_7$H$_{15}$ |
| 3824, | CF$_3$ | H | n-C$_4$H$_9$ | CH$_3$ |
| 3825, | CF$_3$ | H | n-C$_4$H$_9$ | C$_2$H$_5$ |
| 3826, | CF$_3$ | H | n-C$_4$H$_9$ | n-C$_3$H$_7$ |
| 3827, | CF$_3$ | H | n-C$_4$H$_9$ | n-C$_4$H$_9$ |
| 3828, | CF$_3$ | H | n-C$_4$H$_9$ | n-C$_5$H$_{11}$ |
| 3829, | CF$_3$ | H | n-C$_4$H$_9$ | n-C$_6$H$_{13}$ |
| 3830, | CF$_3$ | H | n-C$_4$H$_9$ | n-C$_7$H$_{15}$ |
| 3831, | —OCF$_3$ | H | n-C$_4$H$_9$ | CH$_3$ |
| 3832, | —OCF$_3$ | H | n-C$_4$H$_9$ | C$_2$H$_5$ |
| 3833, | —OCF$_3$ | H | n-C$_4$H$_9$ | n-C$_3$H$_7$ |
| 3834, | —OCF$_3$ | H | n-C$_4$H$_9$ | n-C$_4$H$_9$ |
| 3835, | —OCF$_3$ | H | n-C$_4$H$_9$ | n-C$_5$H$_{11}$ |
| 3836, | —OCF$_3$ | H | n-C$_4$H$_9$ | n-C$_6$H$_{13}$ |
| 3837, | —OCF$_3$ | H | n-C$_4$H$_9$ | n-C$_7$H$_{15}$ |
| 3838, | H | H | n-C$_5$H$_{11}$ | n-C$_5$H$_{11}$ |
| 3839, | H | H | n-C$_5$H$_{11}$ | n-C$_6$H$_{13}$ |
| 3840, | H | H | n-C$_5$H$_{11}$ | n-C$_7$H$_{15}$ |
| 3841, | F | H | n-C$_5$H$_{11}$ | CH$_3$ |
| 3842, | F | H | n-C$_5$H$_{11}$ | C$_2$H$_5$ |
| 3843, | F | H | n-C$_5$H$_{11}$ | n-C$_3$H$_7$ |
| 3844, | F | H | n-C$_5$H$_{11}$ | n-C$_4$H$_9$ |
| 3845, | F | H | n-C$_5$H$_{11}$ | n-C$_5$H$_{11}$ |
| 3846, | F | H | n-C$_5$H$_{11}$ | n-C$_6$H$_{13}$ |
| 3847, | F | H | n-C$_5$H$_{11}$ | n-C$_7$H$_{15}$ |
| 3848, | F | F | n-C$_5$H$_{11}$ | n-C$_5$H$_{11}$ |
| 3849, | F | F | n-C$_5$H$_{11}$ | n-C$_6$H$_{13}$ |
| 3850, | F | F | n-C$_5$H$_{11}$ | n-C$_7$H$_{15}$ |
| 3851, | CF$_3$ | H | n-C$_5$H$_{11}$ | CH$_3$ |
| 3852, | CF$_3$ | H | n-C$_5$H$_{11}$ | C$_2$H$_5$ |
| 3853, | CF$_3$ | H | n-C$_5$H$_{11}$ | n-C$_3$H$_7$ |
| 3854, | CF$_3$ | H | n-C$_5$H$_{11}$ | n-C$_4$H$_9$ |
| 3855, | CF$_3$ | H | n-C$_5$H$_{11}$ | n-C$_5$H$_{11}$ |

-continued

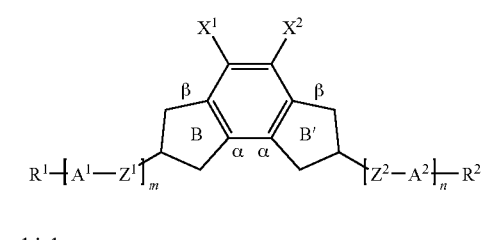

| Example No. | X¹ | X² | R¹ | R² |
|---|---|---|---|---|
| 3856, | CF₃ | H | n-C₅H₁₁ | n-C₆H₁₃ |
| 3857, | CF₃ | H | n-C₅H₁₁ | n-C₇H₁₅ |
| 3858, | —OCF₃ | H | n-C₅H₁₁ | CH₃ |
| 3859, | —OCF₃ | H | n-C₅H₁₁ | C₂H₅ |
| 3860, | —OCF₃ | H | n-C₅H₁₁ | n-C₃H₇ |
| 3861, | —OCF₃ | H | n-C₅H₁₁ | n-C₄H₉ |
| 3862, | —OCF₃ | H | n-C₅H₁₁ | n-C₅H₁₁ |
| 3863, | —OCF₃ | H | n-C₅H₁₁ | n-C₆H₁₃ |
| 3864, | —OCF₃ | H | n-C₅H₁₁ | n-C₇H₁₅ |
| 3865, | H | H | n-C₆H₁₃ | n-C₆H₁₃ |
| 3866, | H | H | n-C₆H₁₃ | n-C₇H₁₅ |
| 3867, | F | H | n-C₆H₁₃ | CH₃ |
| 3868, | F | H | n-C₆H₁₃ | C₂H₅ |
| 3869, | F | H | n-C₆H₁₃ | n-C₃H₇ |
| 3870, | F | H | n-C₆H₁₃ | n-C₄H₉ |
| 3871, | F | H | n-C₆H₁₃ | n-C₅H₁₁ |
| 3872, | F | H | n-C₆H₁₃ | n-C₆H₁₃ |
| 3873, | F | H | n-C₆H₁₃ | n-C₇H₁₅ |
| 3874, | F | F | n-C₆H₁₃ | n-C₆H₁₃ |
| 3875, | F | F | n-C₆H₁₃ | n-C₇H₁₅ |
| 3876, | CF₃ | H | n-C₆H₁₃ | CH₃ |
| 3877, | CF₃ | H | n-C₆H₁₃ | C₂H₅ |
| 3878, | CF₃ | H | n-C₆H₁₃ | n-C₃H₇ |
| 3879, | CF₃ | H | n-C₆H₁₃ | n-C₄H₉ |
| 3880, | CF₃ | H | n-C₆H₁₃ | n-C₅H₁₁ |
| 3881, | CF₃ | H | n-C₆H₁₃ | n-C₆H₁₃ |
| 3882, | CF₃ | H | n-C₆H₁₃ | n-C₇H₁₅ |
| 3883, | —OCF₃ | H | n-C₆H₁₃ | CH₃ |
| 3884, | —OCF₃ | H | n-C₆H₁₃ | C₂H₅ |
| 3885, | —OCF₃ | H | n-C₆H₁₃ | n-C₃H₇ |
| 3886, | —OCF₃ | H | n-C₆H₁₃ | n-C₄H₉ |
| 3887, | —OCF₃ | H | n-C₆H₁₃ | n-C₅H₁₁ |
| 3888, | —OCF₃ | H | n-C₆H₁₃ | n-C₆H₁₃ |
| 3889, | —OCF₃ | H | n-C₆H₁₃ | n-C₇H₁₅ |
| 3890, | H | H | n-C₇H₁₅ | n-C₇H₁₅ |
| 3891, | F | H | n-C₇H₁₅ | CH₃ |
| 3892, | F | H | n-C₇H₁₅ | C₂H₅ |
| 3893, | F | H | n-C₇H₁₅ | n-C₃H₇ |
| 3894, | F | H | n-C₇H₁₅ | n-C₄H₉ |
| 3895, | F | H | n-C₇H₁₅ | n-C₅H₁₁ |
| 3896, | F | H | n-C₇H₁₅ | n-C₆H₁₃ |
| 3897, | F | H | n-C₇H₁₅ | n-C₇H₁₅ |
| 3898, | F | F | n-C₇H₁₅ | n-C₇H₁₅ |
| 3899, | CF₃ | H | n-C₇H₁₅ | CH₃ |
| 3900, | CF₃ | H | n-C₇H₁₅ | C₂H₅ |
| 3901, | CF₃ | H | n-C₇H₁₅ | n-C₃H₇ |
| 3902, | CF₃ | H | n-C₇H₁₅ | n-C₄H₉ |
| 3903, | CF₃ | H | n-C₇H₁₅ | n-C₅H₁₁ |
| 3904, | CF₃ | H | n-C₇H₁₅ | n-C₆H₁₃ |
| 3905, | CF₃ | H | n-C₇H₁₅ | n-C₇H₁₅ |
| 3906, | —OCF₃ | H | n-C₇H₁₅ | CH₃ |
| 3907, | —OCF₃ | H | n-C₇H₁₅ | C₂H₅ |
| 3908, | —OCF₃ | H | n-C₇H₁₅ | n-C₃H₇ |
| 3909, | —OCF₃ | H | n-C₇H₁₅ | n-C₄H₉ |
| 3910, | —OCF₃ | H | n-C₇H₁₅ | n-C₅H₁₁ |
| 3911, | —OCF₃ | H | n-C₇H₁₅ | n-C₆H₁₃ |
| 3912, | —OCF₃ | H | n-C₇H₁₅ | n-C₇H₁₅ |

TABLE 1

Δε and Δn values for substances of individual examples

| Example No. | Δε | Δn |
|---|---|---|
| 73 | -10.2 | 0.006 |
| 106 | -10.3 | 0.068 |
| 137 | -10.0 | 0.069 |
| 1401 | -6.8 | 0.074 |
| 1402 | -7.4 | 0.072 |
| 2325 | -8.7 | 0.078 |
| 3726 | -4.4 | 0.087 |
| 3758 | -5.0 | 0.088 |
| 3759 | -4.5 | 0.088 |
| 3790 | -4.4 | 0.088 |

The invention claimed is:

1. A compound of formula I:

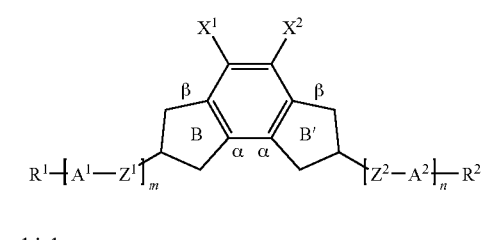    I in which:

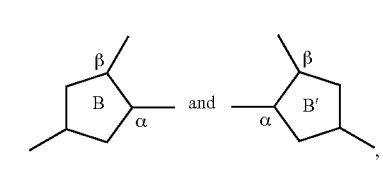 and 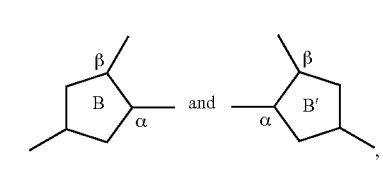, independently of one another, stand for

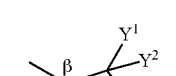   a

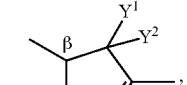   b

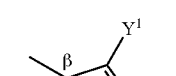   e

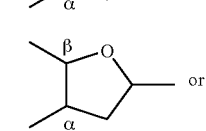 or   f

-continued

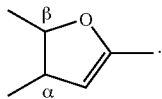
g $A^1$ and $A^2$ are each, independently of one another, 1,4-phenylene, in which =CH— may be replaced once or twice by =N— and which may be unsubstituted or mono- to tetrasubstituted, independently of one another, by —CN, F, Cl, Br and/or I, $C_1$-$C_6$-alkanyl which is unsubstituted or mono- or polysubstituted by fluorine and/or chlorine or by $C_1$-$C_6$-alkoxy which is unsubstituted or mono- or polysubstituted by fluorine and/or chlorine, 1,4-cyclohexylene, 1,4-cyclohexenylene or 1,4-cyclohexadienylene, in which —$CH_2$— may be replaced once or twice, independently of one another, by —O— or —S— in such a way that hetero atoms are not linked directly and which may be unsubstituted or mono- or polysubstituted by F, Cl, Br and/or I;

$Z^1$ and $Z^2$ are each, independently of one another, a single bond, a double bond, —$CF_2O$—, —$OCF_2$—, —$CH_2CH_2$—, —$CF_2CF_2$—, —$CF_2CH_2$—, —$CH_2CF_2$—, —CHF—CHF—, —C(O)O—, —OC(O)—, —$CH_2O$—, —$OCH_2$—, —CF=CH—, —CH=CF—, —CF=CF—, —CH=CH— or —C≡C—;

$R^1$ and $R^2$ are each, independently of one another, hydrogen, or alkanyl having 1 to 15 C atoms, alkoxy having 1 to 15 C atoms, alkenyl having 2 to 15 C atoms, or alkynyl having 2 to 15 C atoms, each of which is unsubstituted, monosubstituted by —CN or —$CF_3$ or monosubstituted or polysubstituted by F, Cl, Br and/or I, where, in addition, one or more $CH_2$ groups in these radicals may each be replaced, independently of one another, by —O—, —S—, —$SO_2$—, —CO—, —COO—, —OCO— or —OCO—O— in such a way that hetero atoms in the chain are not linked directly, F, Cl, Br, I, —CN, —SCN, —NCS or —$SF_5$;

m and n, independently of one another, are 0, 1, 2 or 3;

$X^1$, $X^2$ and $Y^2$ are each, independently of one another, hydrogen, or alkanyl having 1 to 15 C atoms, alkoxy having 1 to 15 C atoms, alkenyl having 2 to 15 C atoms, or alkynyl having 2 to 15 C atoms, each of which is unsubstituted or monosubstituted or polysubstituted by F, Cl, Br and/or I, where, in addition, one or more $CH_2$ groups in these radicals may each be replaced, independently of one another, by —O—, —S—, —$SO_2$—, —CO—, —COO—, —OCO— or —OCO—O— in such a way that hetero atoms in the chain are not linked directly, F, Cl, Br, I, —CN, —$SF_5$, —SCN or —NCS;

$Y^1$ is hydrogen, or alkanyl having 1 to 15 C atoms, alkoxy having 1 to 15 C atoms, alkenyl having 2 to 15 C atoms, or alkynyl having 2 to 15 C atoms, each of which is unsubstituted or monosubstituted or polysubstituted by F, Cl, Br and/or I, where, in addition, one or more $CH_2$ groups in these radicals may each be replaced, independently of one another, by —O—, —S—, —$SO_2$—, —CO—, —COO—, —OCO— or —OCO—O— in such a way that hetero atoms in the chain are not linked directly, F, Cl, Br, I, —CN, —$SF_5$, —SCN or —NCS, or $Y^1$ is —[—$Z^3$—$A^3$—]$_p$—$R^3$;

$Z^3$ is a single bond, a double bond, —$CF_2O$—, —$OCF_2$—, —$CH_2CH_2$—, —$CF_2CF_2$—, —$CF_2CH_2$—, —$CH_2CF_2$—, —CHF—CHF—, —C(O)O—, —OC(O)—, —$CH_2O$—, —$OCH_2$—, —CF=CH—, —CH=CF—, —CF=CF—, —CH=CH— or —C≡C—;

$A^3$ is 1,4-phenylene, in which =CH— may be replaced once or twice by =N— and which may be unsubstituted or mono- to tetrasubstituted, independently of one another, by —CN, F, Cl, Br and/or I, $C_1$-$C_6$-alkanyl which is unsubstituted or mono- or polysubstituted by fluorine and/or chlorine or by $C_1$-$C_6$-alkoxy which is unsubstituted or mono- or polysubstituted by fluorine and/or chlorine, 1,4-cyclohexylene, 1,4-cyclohexenylene or 1,4-cyclohexadienylene, in which —$CH_2$— may be replaced once or twice, independently of one another, by —O— or —S— in such a way that hetero atoms are not linked directly and which may be unsubstituted or mono- or polysubstituted by F, Cl, Br and/or I;

$R^3$ is hydrogen, or alkanyl having 1 to 15 C atoms, alkoxy having 1 to 15 C atoms, alkenyl having 2 to 15 C atoms, or alkynyl having 2 to 15 C atoms, each of which is unsubstituted, monosubstituted by —CN or —$CF_3$ or monosubstituted or polysubstituted by F, Cl, Br and/or I, where, in addition, one or more $CH_2$ groups in these radicals may each be replaced, independently of one another, by —O—, —S—, —$SO_2$—, —CO—, —COO—, —OCO— or —OCO—O— in such a way that hetero atoms in the chain are not linked directly, F, Cl, Br, I, —CN, —SCN, —NCS or —$SF_5$; and p is 0, 1, 2 or 3;

where $A^1, A^2, A^3, Z^1, Z^2, Z^3, R^2, R^2$ and $R^3$ may each have identical or different meanings if m, n and p respectively are greater than 1;

$Y^1$ and $Y^2$ may each have identical or different meanings for rings B and B';

and where (a) $R^1$-[-$A^1$-$Z^1$-]$_m$- and -[-$Z^2$-$A^2$-]$_n$-$R^2$ are not simultaneously $CH_3$ if one of $X^1$ and $X^2$ is hydrogen and the other of $X^1$ and $X^2$ is Cl and at the same time both rings B and B' stand for ring g; and (b) at least one $X^1$, $X^2$, $Y^1$ or $Y^2$ group is F, Cl, $CF_3$, or $OCF_3$.

2. A compound according to claim 1, wherein rings B and B' are identical, $Y^1$ in both rings can have identical or different meanings, and $Y^2$ in both rings can have identical or different meanings.

3. A compound according to claim 1, wherein said compound is selected from formulae Iaa, Ibb, Iee, Iff and Igg:

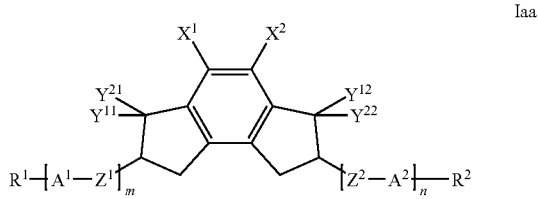
Iaa

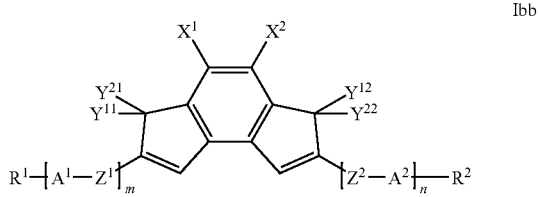
Ibb

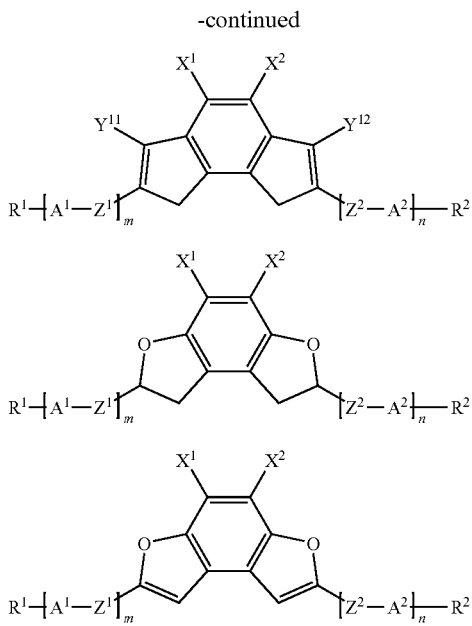

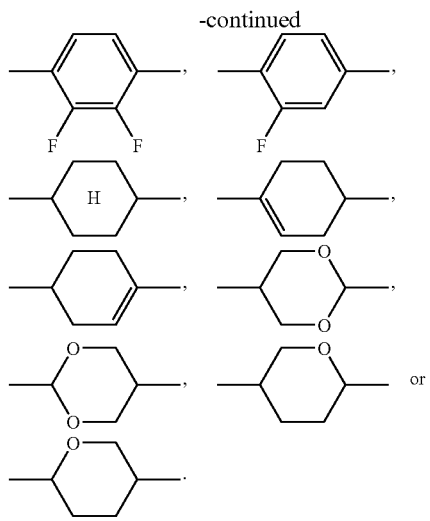

where $Y^{11}$ $Y^{12}$ can have identical or different meanings and are each hydrogen, $-[-Z^3-A^3-]_p-R^3$, or alkanyl having 1 to 15 C atoms, alkoxy having 1 to 15 C atoms, alkenyl having 2 to 15 C atoms, or alkynyl having 2 to 15 C atoms, each of which is unsubstituted or monosubstituted or polysubstituted by F, Cl, Br and/or I, where, in addition, one or more $CH_2$ groups in these radicals may each be replaced, independently of one another, by —O—, —S—, —$SO_2$—, —CO—, —COO—, —OCO— or —OCO—O— in such a way that hetero atoms in the chain are not linked directly, F, Cl, Br, I, —CN, —$SF_5$, —SCN, or —NCS; and Y²¹ and Y²² can have identical or different meanings and are each, independently of one another, hydrogen, or alkanyl having 1 to 15 C atoms, alkoxy having 1 to 15 C atoms, alkenyl having 2 to 15 C atoms, or alkynyl having 2 to 15 C atoms, each of which is unsubstituted or monosubstituted or polysubstituted by F, Cl, Br and/or I, where, in addition, one or more $CH_2$ groups in these radicals may each be replaced, independently of one another, by —O—, —S—, —$SO_2$—, —CO—, —COO—, —OCO— or —OCO—O— in such a way that hetero atoms in the chain are not linked directly, F, Cl, Br, I, —CN, —$SF_5$, —SCN or —NCS.

4. A compound according to claim 1, wherein $Y^1$ and $Y^2$ are simultaneously F.

5. A compound according to claim 1, wherein $Z^1$, $Z^2$, and $Z^3$, if present, independently of one another, are each a single bond, —$CF_2O$—, —$OCF_2$—, —$CF_2CF_2$—, —CH=CH—, —CF=CH—, —CH=CF— or -CF=CF—.

6. A compound according to claim 1, wherein $A^1$, $A^2$, and $A^3$, if present, independently of one another, are each

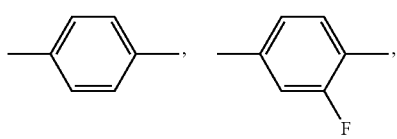

7. A compound according to claim 1, wherein $R^1$, $R^2$, and $R^3$, if present, independently of one another, are each alkanyl having 1 to 7 C atoms, alkoxy having 1 to 7 C atoms, or alkenyl radical having 2 to 7 C atoms.

8. A compound according to claim 1, wherein
m is 0, 1 or 2;
n is 0, 1 or 2;
m+n is 0, 1, 2 or 3; and
p is 0.

9. A compound according to claim 1, wherein at least one of $X^1$ and $X^2$ is F, Cl, $CF_3$ or $OCF_3$.

10. A compound according to claim 1, wherein $X^1$ and $X^2$ are F.

11. A liquid-crystalline medium comprising at least two liquid-crystalline compounds, wherein said medium comprises at least one compound according to claim 1.

12. An electro-optical display element containing a liquid-crystalline medium according to claim 1.

13. A compound according to claim 3, wherein $Y^{11}$, $Y^{12}$, $Y^{21}$ and $Y^{22}$ are simultaneously F.

14. A compound of formula I:

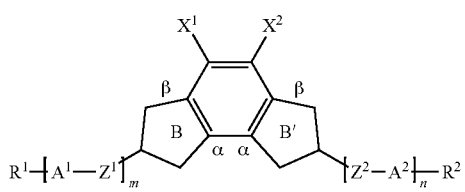

in which:

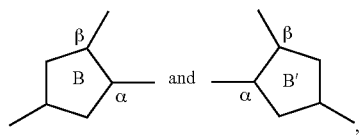

independently of one another, stand for

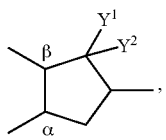 a

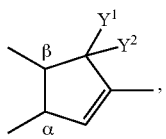 b

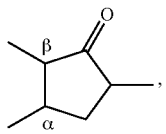 c

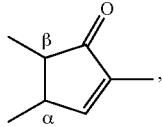 d

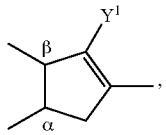 e

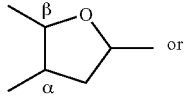 f or

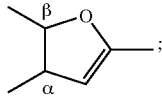 g ;

$A^1$ and $A^2$ are each, independently of one another, 1,4-phenylene, in which =CH— may be replaced once or twice by =N— and which may be unsubstituted or mono- to tetrasubstituted, independently of one another, by —CN, F, Cl, Br and/or I, $C_1$-$C_6$-alkanyl which is unsubstituted or mono- or polysubstituted by fluorine and/or chlorine or by $C_1$-$C_6$-alkoxy which is unsubstituted or mono- or polysubstituted by fluorine and/or chlorine, 1,4-cyclohexylene, 1,4-cyclohexenylene or 1,4-cyclohexadienylene, in which —$CH_2$- may be replaced once or twice, independently of one another, by —O— or —S— in such a way that hetero atoms are not linked directly and which may be unsubstituted or mono- or polysubstituted by F, Cl, Br and/or I;

$Z^1$ and $Z^2$ are each, independently of one another, a single bond, a double bond, —$CF_2O$—, —$OCF_2$—, —$CH_2CH_2$—, —$CF_2CF_2$—, —$CF_2CH_2$—, —$CH_2CF_2$—, —CHF—CHF—, —C(O)O—, —OC(O)—, —$CH_2O$—, —$OCH_2$—, —CF=CH—, —CH=CF—, —CF=CF—, —CH=CH— or —C≡C—;

$R^1$ and $R^2$ independently of one another, are each alkanyl having 1 to 7 C atoms, alkoxy having 1 to 7 C atoms, or alkenyl radical having 2 to 7 C atoms;

m and n, independently of one another, are 0, 1, 2 or 3, and n+m is 1, 2, or 3;

$X^1$, $X^2$ and $Y^2$ are each, independently of one another, hydrogen, or alkanyl having 1 to 15 C atoms, alkoxy having 1 to 15 C atoms, alkenyl having 2 to 15 C atoms, or alkynyl having 2 to 15 C atoms, each of which is unsubstituted or monosubstituted or polysubstituted by F, Cl, Br and/or I, where, in addition, one or more $CH_2$ groups in these radicals may each be replaced, independently of one another, by —O—, —S—, —$SO_2$—, —CO—, —COO—, —OCO— or —OCO—O— in such a way that hetero atoms in the chain are not linked directly, F, Cl, Br, I, —CN, —$SF_5$, —SCN or —NCS;

$Y^1$ is hydrogen, or alkanyl having 1 to 15 C atoms, alkoxy having 1 to 15 C atoms, alkenyl having 2 to 15 C atoms, or alkynyl having 2 to 15 C atoms, each of which is unsubstituted or monosubstituted or polysubstituted by F, Cl, Br and/or I, where, in addition, one or more $CH_2$ groups in these radicals may each be replaced, independently of one another, by —O—, —S—, —$SO_2$—, —CO—, —COO—, —OCO— or —OCO—O— in such a way that hetero atoms in the chain are not linked directly, F, Cl, Br, I, —CN, —$SF_5$, —SCN or —NCS, or $Y^1$ is -$[-Z^3$ -$A^3$-$]_p$-$R^3$;

$Z^3$ is a single bond, a double bond, —$CF_2O$—, —$OCF_2$—, —$CH_2CH_2$—, —$CF_2CF_2$—, —$CF_2CH_2$—, —$CH_2CF_2$—, —CHF—CHF—, —C(O)O—, —OC(O)—, —$CH_2O$—, —$OCH_2$—, —CF=CH—, —CH=CF—, —CF=CF—, —CH=CH— or —C≡C—;

$A^3$ is 1,4-phenylene, in which =CH— may be replaced once or twice by =N— and which may be unsubstituted or mono- to tetrasubstituted, independently of one another, by —CN, F, Cl, Br and/or I, $C_1$-$C_6$-alkanyl which is unsubstituted or mono- or polysubstituted by fluorine and/or chlorine or by $C_1$-$C_6$-alkoxy which is unsubstituted or mono- or polysubstituted by fluorine and/or chlorine, 1,4-cyclohexylene, 1,4-cyclohexenylene or 1,4-cyclohexadienylene, in which —$CH_2$— may be replaced once or twice, independently of one another, by —O— or —S— in such a way that hetero atoms are not linked directly and which may be unsubstituted or mono- or polysubstituted by F, Cl, Br and/or I;

$R^3$ is alkanyl having 1 to 7 C atoms, alkoxy having 1 to 7 C atoms, or alkenyl radical having 2 to 7 C atoms; and p is 0, 1, 2 or 3;

where $A^1$, $A^2$, $A^3$, $Z^1$, $Z^2$, $Z^3$, $R^1$, $R^2$ and $R^3$ may each have identical or different meanings if m, n and p respectively are greater than 1;

$Y^1$ and $Y^2$ may each have identical or different meanings for rings B and B';

and where (a) $R^1$ does not stand for —COOH if ring B stands for ring f or g and ring B' stands for ring d and at the same time m is zero and $X^2$ is not H, or $R^2$ does not stand for —COOH if ring B' stands for ring f or g and ring B stands for ring d and n is zero and $X^1$ is not H;

(b) $R^1$-$[-A^1$-$Z^1$-$]_m$- and -$[-Z^2$-$A^2$-$]_n$-$R^2$ are not simultaneously $CH_3$ if one of $X^1$ and $X^2$ is hydrogen and the other of $X^1$ and $X^2$ hydrogen or Cl and at the same time both rings B and B' stand for ring g.

15. A liquid-crystalline medium comprising at least two liquid-crystalline compounds, wherein said medium comprises at least one compound according to formula I:

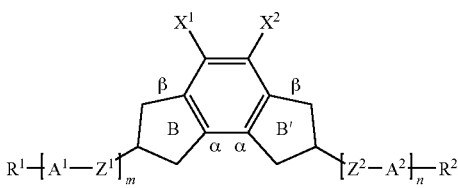

in which:

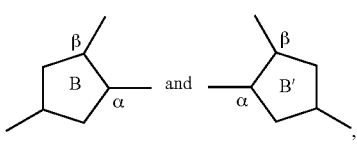

independently of one another, stand for

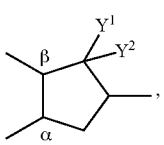 a

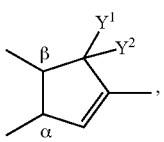 b

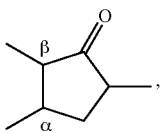 c

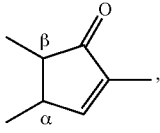 d

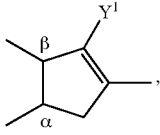 e

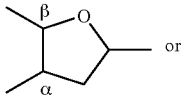 f

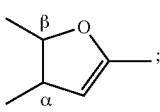 g $A^1$ and $A^2$ are each, independently of one another, 1,4-phenylene, in which =CH— may be replaced once or twice by =N— and which may be unsubstituted or mono- to tetrasubstituted, independently of one another, by —CN, F, Cl, Br and/or I, $C_1$-$C_6$-alkanyl which is unsubstituted or mono- or polysubstituted by fluorine and/or chlorine or by $C_1$-$C_6$-alkoxy which is unsubstituted or mono- or polysubstituted by fluorine and/or chlorine, 1,4-cyclohexylene, 1,4-cyclohexenylene or 1,4-cyclohexadienylene, in which —$CH_2$— may be replaced once or twice, independently of one another, by —O— or —S— in such a way that hetero atoms are not linked directly and which may be unsubstituted or mono- or polysubstituted by F, Cl, Br and/or I;

$Z^1$ and $Z^2$ are each, independently of one another, a single bond, a double bond, —$CF_2$O—, —$OCF_2$—, —$CH_2CH_2$—, —$CF_2CF_2$—, —$CF_2CH_2$—, —$CH_2CF_2$—, —CHF—CHF—, —C(O)O—, —OC(O)—, —$CH_2$O—, —$OCH_2$—, —CF=CH—, —CH=CF—, —CF=CF—, —CH=CH— or —C≡C—;

$R^1$ and $R^2$ are each, independently of one another, hydrogen, or alkanyl having 1 to 15 C atoms, alkoxy having 1 to 15 C atoms, alkenyl having 2 to 15 C atoms, or alkynyl having 2 to 15 C atoms, each of which is unsubstituted, monosubstituted by —CN or —$CF_3$ or monosubstituted or polysubstituted by F, Cl, Br and/or I, where, in addition, one or more $CH_2$ groups in these radicals may each be replaced, independently of one another, by —O—, —S—, —$SO_2$—, —CO—, —COO—, —OCO— or —OCO—O— in such a way that hetero atoms in the chain are not linked directly, F, Cl, Br, I, —CN, —SCN, —NCS or —$SF_5$;

m and n, independently of one another, are 0, 1, 2 or 3;

$X^1$, $X^2$ and $Y^2$ are each, independently of one another, hydrogen, or alkanyl having 1 to 15 C atoms, alkoxy having 1 to 15 C atoms, alkenyl having 2 to 15 C atoms, or alkynyl having 2 to 15 C atoms, each of which is unsubstituted or monosubstituted or polysubstituted by F, Cl, Br and/or I, where, in addition, one or more $CH_2$ groups in these radicals may each be replaced, independently of one another, by —O—, —S—, —$SO_2$—, —CO—, —COO—, —OCO— or —OCOO— in such a way that hetero atoms in the chain are not linked directly, F, Cl, Br, I, —CN, —$SF_5$, —SCN or —NCS;

$Y^1$ is hydrogen, or alkanyl having 1 to 15 C atoms, alkoxy having 1 to 15 C atoms, alkenyl having 2 to 15 C atoms, or alkynyl having 2 to 15 C atoms, each of which is unsubstituted or monosubstituted or polysubstituted by F, Cl, Br and/or I, where, in addition, one or more $CH_2$ groups in these radicals may each be replaced, independently of one another, by —O—, —S—, —$SO_2$—, —CO—, —COO—, —OCO— or —OCO—O— in such a way that hetero atoms in the chain are not linked directly, F, Cl, Br, I, —CN, —$SF_5$, —SCN or —NCS, or $Y^1$ is -[-$Z^3$-$A^3$-]$_p$-$R^3$;

$Z^3$ is a single bond, a double bond, —$CF_2$O—, —$OCF_2$—, —$CH_2CH_2$—, —$CF_2CF_2$—, —$CF_2CH_2$—, —$CH_2CF_2$—, —CHF—CHF—, —C(O)O—, —OC(O)—, —$CH_2$O—, —$OCH_2$—, —CF=CH—, —CH=CF—, —CF=CF—, —CH=CH— or —C≡C—;

$A^3$ is 1,4-phenylene, in which =CH— may be replaced once or twice by =N— and which may be unsubstituted or mono- to tetrasubstituted, independently of one another, by —CN, F, Cl, Br and/or I, $C_1$-$C_6$- alkanyl which is unsubstituted or mono- or polysubstituted by fluorine and/or chlorine or by $C_1$-$C_6$-alkoxy which is unsubstituted or mono- or polysubstituted by fluorine and/or chlorine, 1,4-cyclohexylene, 1,4-cyclohexenylene or 1,4-cyclohexadienylene, in which —CH$_2$— may be replaced once or twice, independently of one another, by —O— or —S— in such a way that hetero atoms are not linked directly and which may be unsubstituted or mono- or polysubstituted by F, Cl, Br and/or I;

R$^3$ is hydrogen, or alkanyl having 1 to 15 C atoms, alkoxy having 1 to 15 C atoms, alkenyl having 2 to 15 C atoms, or alkynyl having 2 to 15 C atoms, each of which is unsubstituted, monosubstituted by —CN or —CF$_3$ or monosubstituted or polysubstituted by F, Cl, Br and/or I, where, in addition, one or more CH$_2$ groups in these radicals may each be replaced, independently of one another, by —O—, —S—, —SO$_2$—, —CO—, —COO—, —OCO— or —OCO—O— in such a way that hetero atoms in the chain are not linked directly, F, Cl, Br, I, —CN, —SCN, —NCS or —SF$_5$; and p is 0, 1, 2 or 3;

where

A$^1$, A$^2$, A$^3$, Z$^1$, Z$^2$, Z$^3$, R$^1$, R$^2$ and R$^3$ may each have identical or different meanings if m, n and p respectively are greater than 1;

Y$^1$ and Y$^2$ may each have identical or different meanings for rings B and B';

and where (a) R$^1$ does not stand for —COOH if ring B stands for ring f or g and ring B' stands for ring d and at the same time m is zero and X$^2$ is not H, or R$^2$ does not stand for —COOH if ring B' stands for ring f or g and ring B stands for ring d and n is zero and X$^1$ is not H;

(b) R$^1$-[-A$^1$-Z$^1$-]$_m$- and -[-Z$^2$-A$^2$-]$_n$-R$^2$ are not simultaneously CH$_3$ if one of X$^1$ and X$^2$ is hydrogen and the other of X$^1$ and X$^2$ hydrogen or Cl and at the same time both rings B and B' stand for ring g.

16. An electro-optical display element containing a liquid-crystalline medium according to at least one compound according to formula I:

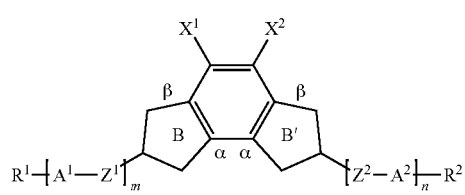

in which:

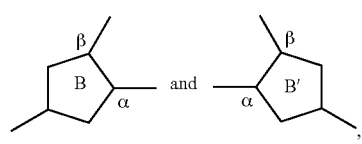

independently of one another, stand for

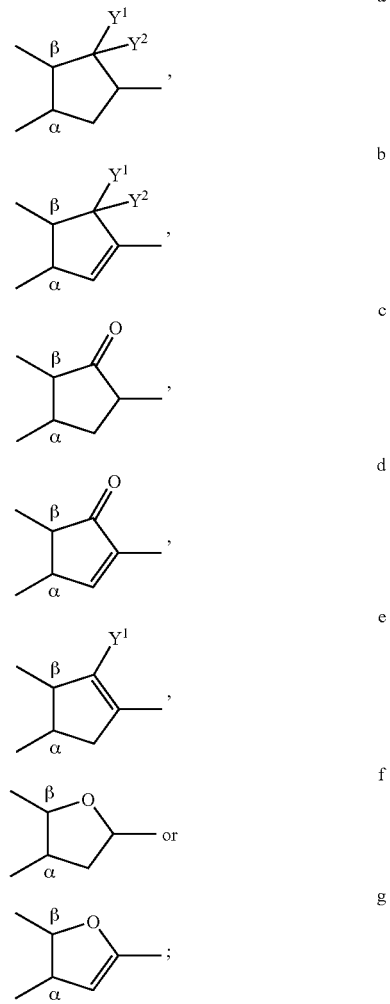

A$^1$ and A$^2$ are each, independently of one another, 1,4-phenylene, in which =CH— may be replaced once or twice by =N— and which may be unsubstituted or mono- to tetrasubstituted, independently of one another, by —CN, F, Cl, Br and/or I, C$_1$-C$_6$-alkanyl which is unsubstituted or mono- or polysubstituted by fluorine and/or chlorine or by C$_1$-C$_6$-alkoxy which is unsubstituted or mono- or polysubstituted by fluorine and/or chlorine, 1,4-cyclohexylene, 1,4-cyclohexenylene or 1,4-cyclohexadienylene, in which —CH$_2$- may be replaced once or twice, independently of one another, by —O— or —S— in such a way that hetero atoms are not linked directly and which may be unsubstituted or mono- or polysubstituted by F, Cl, Br and/or I;

Z$^1$ and Z$^2$ are each, independently of one another, a single bond, a double bond, —CF$_2$O—, —OCF$_2$—, —CH$_2$CH$_2$—, —CF$_2$CF$_2$—, —CF$_2$CH$_2$—, —CH$_2$CF$_2$—, —CHF—CHF—, —C(O)O—, —OC(O)—, —CH$_2$O—, —OCH$_2$—, —CF=CH—, —CH=CF—, —CF=CF—, —CH=CH— or —C≡C—;

R$^1$ and R$^2$ are each, independently of one another, hydrogen, or alkanyl having 1 to 15 C atoms, alkoxy having 1 to 15 C atoms, alkenyl having 2 to 15 C atoms, or alkynyl having 2 to 15 C atoms, each of which is unsubstituted, monosubstituted by —CN or —CF$_3$ or monosubstituted or polysubstituted by F, Cl, Br and/or I, where, in addition, one or more CH$_2$ groups in these radicals may each be replaced, independently of one another, by —O—, —S—, —SO$_2$—, —CO—, —COO—, —OCO— or —OCO—O— in such a way that hetero atoms in the chain are not linked directly, F, Cl, Br, I, —CN, —SCN, —NCS or —SF$_5$;

m and n, independently of one another, are 0, 1, 2 or 3;

$X^1$, $X^2$ and $Y^2$ are each, independently of one another, hydrogen, or alkanyl having 1 to 15 C atoms, alkoxy having 1 to 15 C atoms, alkenyl having 2 to 15 C atoms, or alkynyl having 2 to 15 C atoms, each of which is unsubstituted or monosubstituted or polysubstituted by F, Cl, Br and/or I, where, in addition, one or more CH$_2$ groups in these radicals may each be replaced, independently of one another, by —O—, —S—, —SO$_2$—, —CO—, —COO—, —OCO— or —OCO—O— in such a way that hetero atoms in the chain are not linked directly, F, Cl, Br, I, —CN, —SF$_5$, —SCN or —NCS;

$Y^1$ is hydrogen, or alkanyl having 1 to 15 C atoms, alkoxy having 1 to 15 C atoms, alkenyl having 2 to 15 C atoms, or alkynyl having 2 to 15 C atoms, each of which is unsubstituted or monosubstituted or polysubstituted by F, Cl, Br and/or I, where, in addition, one or more CH$_2$ groups in these radicals may each be replaced, independently of one another, by —O—, —S—, —SO$_2$—, —CO—, —COO—, —OCO— or —OCO—O— in such a way that hetero atoms in the chain are not linked directly, F, Cl, Br, I, —CN, —SF$_5$, —SCN or —NCS, or $Y^1$ is -[-$Z^3$-$A^3$-]$_p$-$R^3$;

$Z^3$ is a single bond, a double bond, —CF$_2$O—, —OCF$_2$—, —CH$_2$CH$_2$—, —CF$_2$CF$_2$—, —CF$_2$CH$_2$—, —CH$_2$CF$_2$—, —CHF—CHF—, —C(O)O—, —OC(O)—, —CH$_2$O—, —OCH$_2$—, —CF=CH—, —CH=CF—, —CF=CF—, —CH=CH— or —C≡C—;

$A^3$ is 1,4-phenylene, in which =CH— may be replaced once or twice by =N— and which may be unsubstituted or mono- to tetrasubstituted, independently of one another, by —CN, F, Cl, Br and/or I, $C_1$-$C_6$-alkanyl which is unsubstituted or mono- or polysubstituted by fluorine and/or chlorine or by $C_1$-$C_6$-alkoxy which is unsubstituted or mono- or polysubstituted by fluorine and/or chlorine, 1,4-cyclohexylene, 1,4-cyclohexenylene or 1,4-cyclohexadienylene, in which —CH$_2$- may be replaced once or twice, independently of one another, by —O— or —S— in such a way that hetero atoms are not linked directly and which may be unsubstituted or mono- or polysubstituted by F, Cl, Br and/or I;

$R^3$ is hydrogen, or alkanyl having 1 to 15 C atoms, alkoxy having 1 to 15 C atoms, alkenyl having 2 to 15 C atoms, or alkynyl having 2 to 15 C atoms, each of which is unsubstituted, monosubstituted by —CN or —CF$_3$ or monosubstituted or polysubstituted by F, Cl, Br and/or I, where, in addition, one or more CH$_2$ groups in these radicals may each be replaced, independently of one another, by —O—, —S—, —SO$_2$—, —COO—, —OCO— or —OCO—O— in such a way that hetero atoms in the chain are not linked directly, F, Cl, Br, I, —CN, —SCN, —NCS or —SF$_5$; and p is 0, 1, 2 or 3;

where $A^1$, $A^2$, $A^3$, $Z^1$, $Z^2$, $Z^3$, $R^1$, $R^2$ and $R^3$ may each have identical or different meanings if m, n and p respectively are greater than 1;

$Y^1$ and $Y^2$ may each have identical or different meanings for rings B and B';

and where (a) $R^1$ does not stand for —COOH if ring B stands for ring f or g and ring B' stands for ring d and at the same time m is zero and $X^2$ is not H, or $R^2$ does not stand for -COOH if ring B' stands for ring f or g and ring B stands for ring d and n is zero and $X^1$ is not H;

(b) $R^1$-[-$A^1$-$Z^1$-]$_m$- and -[-$Z^2$-$A^2$-]$_n$-$R^2$ are not simultaneously CH$_3$ if one of $X^1$ and $X^2$ is hydrogen and the other of $X^1$ and $X^2$ is hydrogen or Cl and at the same time both rings B and B' stand for ring g.

17. A compound according to claim 1, wherein said compound has a dielectric anisotropy Δϵ of <-2.

18. A compound according to claim 1, wherein said compound has a dielectric anisotropy Δϵ of <-5.

19. A compound according to claim 1, wherein said compound has an optical anisotropy Δn of greater than 0.02 and less than 0.25.

20. A compound according to claim 1, wherein at least one of $X^{21}$ and Xis other than hydrogen.

21. A compound according to claim 3, wherein $Y^{11}$, $Y^{12}$, $Y^{21}$ and $Y^{22}$ are, independently of one another, H, F, Cl or a (per)fluorinated alkanyl or alkoxy radical having up to 6 carbon atoms.

22. A compound according to claim 3, wherein $Z^1$ and $Z^2$ and, if present $Z^3$, are each independently of one another, a single bond, —CF$_2$O—, —OCF$_2$—, —CF$_2$CF$_2$—, —CH=CH—, —CF=CH—, —CH=CF— or —CF=CF.

23. A compound according to claim 1, wherein $R^1$, $R^2$, $R^3$, $X^1$, $X^2$, $Y^1$ and $Y^2$ are each, independently of one another, methyl, ethyl, propyl, butyl, pentyl, hexyl, heptyl, methoxy, ethoxy, propoxy, butoxy, pentoxy, hexoxy, heptoxy, 2-oxapropyl, 2- or 3-oxabutyl, 2-, 3- or 4-oxapentyl, 2-, 3-, 4- or 5-oxahexyl, 2-, 3-, 4-, 5- or 6-oxaheptyl, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, acetoxy, propionyloxy, butyryloxy, pentanoyloxy, hexanoyloxy, acetoxymethyl, propionyloxymethyl, butyryloxymethyl, pentanoyloxymethyl, 2-acetoxyethyl, 2-propionyloxyethyl, 2-butyryloxyethyl, 2-acetoxy-propyl, 3 -propionyloxypropyl, 4-acetoxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3 -(ethoxycarbonyl)propyl, 4-(methoxycarbonyl)butyl, acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl, —CF$_3$, F, —Cl, —Br, —I, —CN, —SCN, —NCS or —SF$_5$. 1 2

24. A compound according to claim 1, wherein $R^1$, $R^2$ and $R^3$, if present, are, independently of one another, alkanyl having 1 to 7, alkoxy having 1 to 7, or alkenyl having 2 to 7 C atoms.

25. A compound according to claim 1, wherein $X^1$ and $X^2$ are, independently of one another, hydrogen, halogen, or alkanyl having 1 to 7, alkoxy having 1 to 7, or alkenyl having 2 to 7 C atoms respectively, each of which is at least monosubstituted by halogen.

26. A compound according to claim 25, wherein at least one of $X^1$ and $X^2$ is —$CF_3$, —$OCF_3$, F or Cl.

27. A compound according to claim 1, wherein n+m is 0 or 1.

28. A display according to claim 12, wherein said compound is in a liquid-crystalline layer having a thickness of 5 to 10 μm, said layer is arranged between two plane-parallel glass plates, onto each of which an electrically conductive, transparent layer of tin oxide or indium tin oxide is provided as an electrode, and a transparent alignment layer is positioned between the electrodes and the liquid-crystalline layer.

29. A display according to claim 16, wherein said compound is in a liquid-crystalline layer having a thickness of 5 to 10 μm, said layer is arranged between two plane-parallel glass plates, onto each of which an electrically conductive, transparent layer of tin oxide or indium tin oxide is provided as an electrode, and a transparent alignment layer is positioned between the electrodes and the liquid-crystalline layer.

30. A compound according to claim 1, wherein said compound is selected from formulae Iaa, Iaf, and Iag:

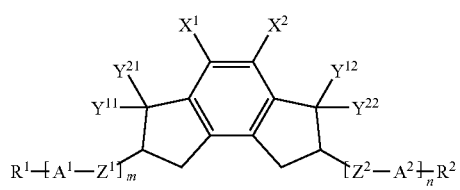

Iaa

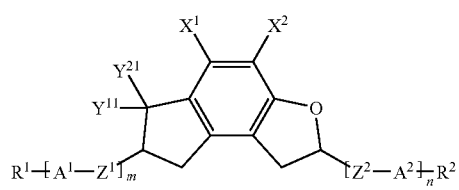

Iaf

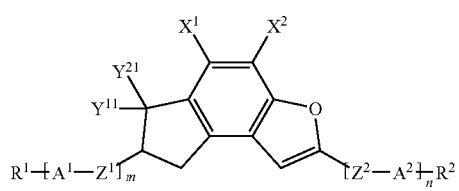

Iag where
$Y^{11}$ and $Y^{12}$ can have identical or different meanings and are each hydrogen, -[-$Z^3$-$A^3$-]$_p$-$R^3$, or alkanyl having 1 to 15 C atoms, alkoxy having 1 to 15 C atoms, alkenyl having 2 to 15 C atoms, or alkynyl having 2 to 15 C atoms, each of which is unsubstituted or monosubstituted or polysubstituted by F, Cl, Br and/or I, where, in addition, one or more $CH_2$ groups in these radicals may each be replaced, independently of one another, by —O—, —S—, —$SO_2$—, —CO—, —COO—, —OCO— or —OCO—O— in such a way that hetero atoms in the chain are not linked directly, F, Cl, Br, I, —CN, —$SF_5$, —SCN, or —NCS; and $Y^{21}$ and $Y^{22}$ can have identical or different meanings and are each, independently of one another, hydrogen, or alkanyl having 1 to 15 C atoms, alkoxy having 1 to 15 C atoms, alkenyl having 2 to 15 C atoms, or alkynyl having 2 to 15 C atoms, each of which is unsubstituted or monosubstituted or polysubstituted by F, Cl, Br and/or I, where, in addition, one or more $CH_2$ groups in these radicals may each be replaced, independently of one another, by —O—, —S—, —$SO_2$—, —CO—, —COO—, —OCO— or —OCO—O— in such a way that hetero atoms in the chain are not linked directly, F, Cl, Br, I, —CN, —$SF_5$, —SCN or —NCS.

31. A compound according to claim 1, wherein said compound is selected from formulae Iba, Iaf, and Iag:

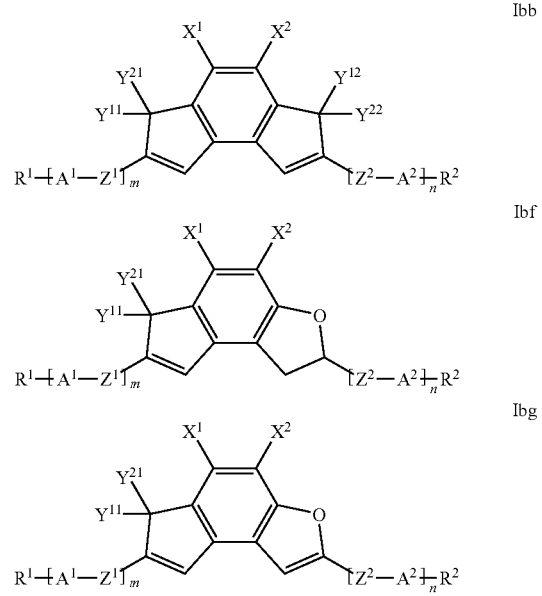

where
$Y^{11}$ and $Y^{12}$ can have identical or different meanings and are each hydrogen, -[-$Z^3$-$A^3$-]$_p$-$R^3$, or alkanyl having 1 to 15 C atoms, alkoxy having 1 to 15 C atoms, alkenyl having 2 to 15 C atoms, or alkynyl having 2 to 15 C atoms, each of which is unsubstituted or monosubstituted or polysubstituted by F, Cl, Br and/or I, where, in addition, one or more $CH_2$ groups in these radicals may each be replaced, independently of one another, by —O—, —S—, —$SO_2$—, —CO—, —COO—, —OCO— or —OCO—O— in such a way that hetero atoms in the chain are not linked directly, F, Cl, Br, I, —CN, —$SF_5$, —SCN, or —NCS; and $Y^{21}$ and $Y^{22}$ can have identical or different meanings and are each, independently of one another, hydrogen, or alkanyl having 1 to 15 C atoms, alkoxy having 1 to 15 C atoms, alkenyl having 2 to 15 C atoms, or alkynyl having 2 to 15 C atoms, each of which is unsubstituted or monosubstituted or polysubstituted by F, Cl, Br and/or I, where, in addition, one or more $CH_2$ groups in these radicals may each be replaced, independently of one another, by —O—, —S—, —$SO_2$—, —CO—, —COO—, —OCO— or —OCO—O— in such a way that hetero atoms in the chain are not linked directly, F, Cl, Br, I, —CN, —$SF_5$, —SCN or —NCS.

32. A compound of formula I:

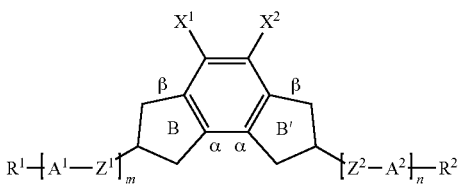

in which:

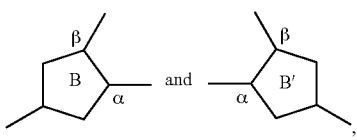

independently of one another, stand for

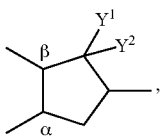 a

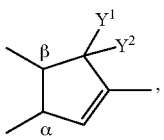 b

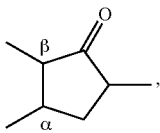 c

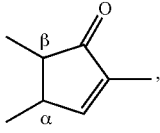 d

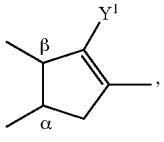 e

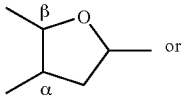 f

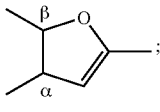 g $A^1$ and $A^2$ are each, independently of one another, 1,4-phenylene, in which =CH— may be replaced once or twice by =N— and which may be unsubstituted or mono- to tetrasubstituted, independently of one another, by —CN, F, Cl, Br and/or I, $C_1$-$C_6$-alkanyl which is unsubstituted or mono- or polysubstituted by fluorine and/or chlorine or by $C_1$-$C_6$-alkoxy which is unsubstituted or mono- or polysubstituted by fluorine and/or chlorine, 1,4-cyclohexylene, 1,4-cyclohexenylene or 1,4-cyclohexadienylene, in which —$CH_2$— may be replaced once or twice, independently of one another, by —O— or —S— in such a way that hetero atoms are not linked directly and which may be unsubstituted or mono- or polysubstituted by F, Cl, Br and/or I;

$Z^1$ and $Z^2$ are each, independently of one another, a single bond, a double bond, —$CF_2O$—, —$OCF_2$—, —$CH_2CH_2$—, —$CF_2CF_2$—, —$CF_2CH_2$—, —$CH_2CF_2$—, —CHF—CHF—, —C(O)O—, —OC(O)—, —$CH_2O$—, —$OCH_2$—, —CF=CH—, —CH=CF—, —CF=CF—, —CH=CH— or —C≡C—;

$R^1$ and $R^2$ are each, independently of one another, hydrogen, or alkanyl having 1 to 15 C atoms, alkoxy having 1 to 15 C atoms, alkenyl having 2 to 15 C atoms, or alkynyl having 2 to 15 C atoms, each of which is unsubstituted, monosubstituted by —CN or —$CF_3$ or monosubstituted or polysubstituted by F, Cl, Br and/or I, where, in addition, one or more $CH_2$ groups in these radicals may each be replaced, independently of one another, by —O—, —S—, —$SO_2$—, —CO—, —COO—, —OCO— or —OCO—O— in such a way that hetero atoms in the chain are not linked directly, F, Cl, Br, I, —CN, —SCN, —NCS or —$SF_5$;

m and n, independently of one another, are 0, 1, 2 or 3;

$X^1$, $X^2$ and $Y^2$ are each, independently of one another, hydrogen, or alkanyl having 1 to 15 C atoms, alkoxy having 1 to 15 C atoms, alkenyl having 2 to 15 C atoms, or alkynyl having 2 to 15 C atoms, each of which is unsubstituted or monosubstituted or polysubstituted by F, Cl, Br and/or I, where, in addition, one or more $CH_2$ groups in these radicals may each be replaced, independently of one another, by —O—, —S—, —$SO_2$—, —CO—, —COO—, —OCO— or —OCO—O—O in such a way that hetero atoms in the chain are not linked directly, F, Cl, Br, I, —CN, —$SF_5$, —SCN or —NCS;

$Y^1$ is hydrogen, or alkanyl having 1 to 15 C atoms, alkoxy having 1 to 15 C atoms, alkenyl having 2 to 15 C atoms, or alkynyl having 2 to 15 C atoms, each of which is unsubstituted or monosubstituted or polysubstituted by F, Cl, Br and/or I, where, in addition, one or more $CH_2$ groups in these radicals may each be replaced, independently of one another, by —O—, —S—, —$SO_2$—, —CO—, —COO—, —OCO— or —OCO—O— in such a way that hetero atoms in the chain are not linked directly, F, Cl, Br, I, —CN, —$SF_5$, —SCN or —NCS, or $Y^1$ is -[-$Z^3$-$A^3$-$]_p$-$R^3$;

$Z^3$ is a single bond, a double bond, —$CF_2O$—, —$OCF_2$—, —$CH_2CH_2$—, —$CF_2CF_2$—, —$CF_2CH_2$—, —$CH_2CF_2$—, —CHF—CHF—, —C(O)O—, —OC(O)—, —$CH_2O$—, —$OCH_2$—, —CF=CH—, —CH=CF—, —CF=CF—, —CH=CH— or —C≡C—;

$A^3$ is 1,4-phenylene, in which =CH— may be replaced once or twice by =N— and which may be unsubstituted or mono- to tetrasubstituted, independently of one another, by —CN, F, Cl, Br and/or I, $C_1$-$C_6$-alkanyl which is unsubstituted or mono- or polysubstituted by fluorine and/or chlorine or by $C_1$-$C_6$-alkoxy which is unsubstituted or mono- or polysubstituted by fluorine and/or chlorine, 1,4-cyclohexylene, 1,4-cyclohexenylene or 1,4-cyclohexadienylene, in which —$CH_2$— may be replaced once or twice, independently of one another, by —O— or —S— in such a way that hetero atoms are not linked directly and which may be unsubstituted or mono- or polysubstituted by F, Cl, Br and/or I;

$R^3$ is hydrogen, or alkanyl having 1 to 15 C atoms, alkoxy having 1 to 15 C atoms, alkenyl having 2 to 15 C atoms, or alkynyl having 2 to 15 C atoms, each of which is unsubstituted, monosubstituted by —CN or —$CF_3$ or monosubstituted or polysubstituted by F, Cl, Br and/or I, where, in addition, one or more $CH_2$ groups in these radicals may each be replaced, independently of one another, by —O—, —S—, —$SO_2$—, —CO—, —COO—, —OCO— or —OCO—O— in such a way that hetero atoms in the chain are not linked directly, F, Cl, Br, I, —CN, —SCN, —NCS or —$SF_5$; and p is 0, 1, 2 or 3;

where $A^1$, $A^2$, $A^3$, $Z^1$, $Z^2$, $Z^3$, $R^1$, $R^2$ and $R^3$ may each have identical or different meanings if m, n and p respectively are greater than 1;

$Y^1$ and $Y^2$ may each have identical or different meanings for rings B and B';

and where (a) $R^1$-[-$A^1$-$Z^1$-]$_m$ and -[-$Z^2$-$A^2$-]$_n$-$R^2$ are not simultaneously $CH_3$ if one of $X^1$ and $X^2$ is hydrogen and the other of $X^1$ and $X^2$ Cl and at the same time both rings B and B' stand for ring g; and (b) at least one $X^1$, $X^2$, $Y^1$ or $Y^2$ group is F, Cl, $CF_3$, or $OCF_3$.

33. A compound according to claim 14, wherein m is 1 and n is 0.

* * * * *

UNITED STATES PATENT AND TRADEMARK OFFICE
CERTIFICATE OF CORRECTION

PATENT NO. : 7,517,471 B2
APPLICATION NO. : 11/587433
DATED : April 14, 2009
INVENTOR(S) : Lietzau et al.

Page 1 of 1

It is certified that error appears in the above-identified patent and that said Letters Patent is hereby corrected as shown below:

IN THE CLAIMS:

Column 76, claim 20, line 28 reads "of $X^{21}$ and Xis other than hydrogen" should read -- of $X^1$ and $X^2$ is other than hydrogen --

Column 76, claim 23, line 63 reads "-Br, -I, -CN, -SCN, -NCS or -$SF_5$ 12" should read -- -Br, -I, -CN, -SCN, -NCS or -$SF_5$ --

Column 80, claim 32, line 42 reads "-CO-, -COO-, -OCO- or -OCO-O-O in" should read -- -CO-, -COO-, -OCO- or -OCO-O- --

Column 82, claim 32, line 11 reads "(a) $R^1$-[-$A^1$-$Z^1$-]$_m$ and -[-$Z^2$-$A^2$-]$_n$-$R^2$ are not simulta-" should read -- (a) $R^1$-[-$A^1$-$Z^1$-]$_m$- and -[-$Z^2$-$A^2$-]$_n$-$R^2$ are not simulta- --

Column 82, claim 32, line 13 reads "other of $X^1$ and $X^2$ Cl and at the same time both rings B" should read -- other of $X^1$ and $X^2$ is Cl and at the same time both rings B --

Signed and Sealed this
Third Day of May, 2011

David J. Kappos
*Director of the United States Patent and Trademark Office*